(12) United States Patent
Bisiules et al.

(10) Patent No.: US 11,677,139 B2
(45) Date of Patent: Jun. 13, 2023

(54) BASE STATION ANTENNAS HAVING ARRAYS OF RADIATING ELEMENTS WITH 4 PORTS WITHOUT USAGE OF DIPLEXERS

(71) Applicant: CommScope Technologies LLC, Hickory, NC (US)

(72) Inventors: Peter J. Bisiules, LaGrange Park, IL (US); Mohammad Vatankhah Varnoosfaderani, Richardson, TX (US); Sammit Patel, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 238 days.

(21) Appl. No.: 17/260,466

(22) PCT Filed: Feb. 7, 2020

(86) PCT No.: PCT/US2020/017162
§ 371 (c)(1),
(2) Date: Jan. 14, 2021

(87) PCT Pub. No.: WO2020/171976
PCT Pub. Date: Aug. 27, 2020

(65) Prior Publication Data
US 2021/0320399 A1    Oct. 14, 2021

Related U.S. Application Data

(60) Provisional application No. 62/966,312, filed on Jan. 27, 2020, provisional application No. 62/807,315, filed on Feb. 19, 2019.

(51) Int. Cl.
*H01Q 1/24*     (2006.01)
*H01Q 5/30*     (2015.01)
(Continued)

(52) U.S. Cl.
CPC ............... *H01Q 1/246* (2013.01); *H01Q 5/30* (2015.01); *H01Q 9/26* (2013.01); *H01Q 19/108* (2013.01); *H01Q 21/062* (2013.01); *H01Q 21/24* (2013.01)

(58) Field of Classification Search
CPC ........... H01Q 1/246; H01Q 5/30; H01Q 9/26; H01Q 19/108; H01Q 21/062; H01Q 21/24
See application file for complete search history.

(56) References Cited

U.S. PATENT DOCUMENTS

| | | |
|---|---|---|
| 2007/0205955 A1 | 9/2007 | Korisch et al. |
| 2009/0015498 A1 | 1/2009 | Deng et al. |

(Continued)

FOREIGN PATENT DOCUMENTS

| | | | | |
|---|---|---|---|---|
| WO | 2017215755 A1 | 12/2017 | | |
| WO | WO 2017/215755 | * 12/2017 | ........... | H04B 7/0491 |

OTHER PUBLICATIONS

"International Search Report and Written Opinion of the International Searching Authority", International Application No. PCT/US2020/017162, dated Jun. 12, 2020, 20 pp.

(Continued)

*Primary Examiner* — Joseph J Lauture
(74) *Attorney, Agent, or Firm* — Myers Bigel, P.A.

(57) ABSTRACT

Base station antennas include first through fourth radio frequency ("RF") ports, a plurality of first combiners that are coupled to the first and second RF ports, a plurality of second combiners that are coupled to the third and fourth RF ports, and an array that includes a plurality of radiating elements that have first through fourth radiators, where first and second radiators of each radiating element are coupled to a respective one of the first combiners, and third and fourth radiators of each radiating element are coupled to respective ones of the second combiners.

21 Claims, 36 Drawing Sheets

(51) Int. Cl.
*H01Q 9/26* (2006.01)
*H01Q 19/10* (2006.01)
*H01Q 21/06* (2006.01)
*H01Q 21/24* (2006.01)

(56) References Cited

U.S. PATENT DOCUMENTS

2017/0195018 A1  7/2017  Ma et al.
2018/0097290 A1  4/2018  Matitsine et al.
2019/0273315 A1  9/2019  Hu et al.

OTHER PUBLICATIONS

"Invitation to Pay Additional Fees and, Where Applicable, Protest Fee", International Application No. PCT/US2020/017162, dated Apr. 9, 2020, 2 pp.
Chiu, Jui-Chieh, et al., "A 3-dB Quadrature Coupler Suitable for PCB Circuit Design", IEEE Transactions on Microwave Theory and Techniques, vol. 54, No. 9, Sep. 2006, Aug. 28, 2006, pp. 3521-3525.
Haupt, Randy L., "Antenna Arrays: A Computation Approach", Wiley-IEEE Press. Hoboken, NJ, 2010, Title and copyright pages, pp. 165-173.

* cited by examiner

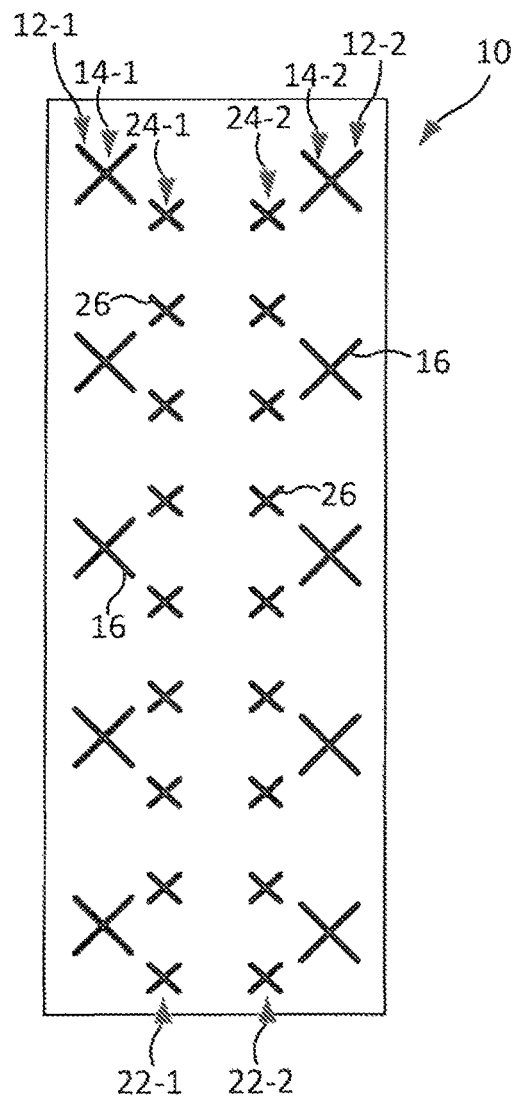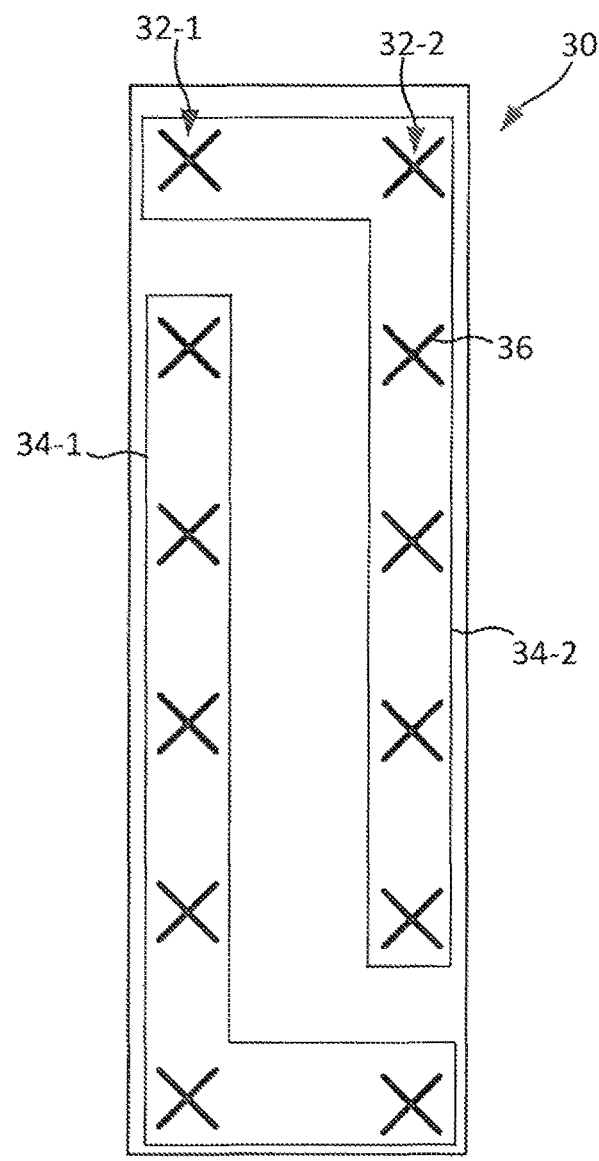
FIG. 1
(Prior Art)
FIG. 2A
(Prior Art)

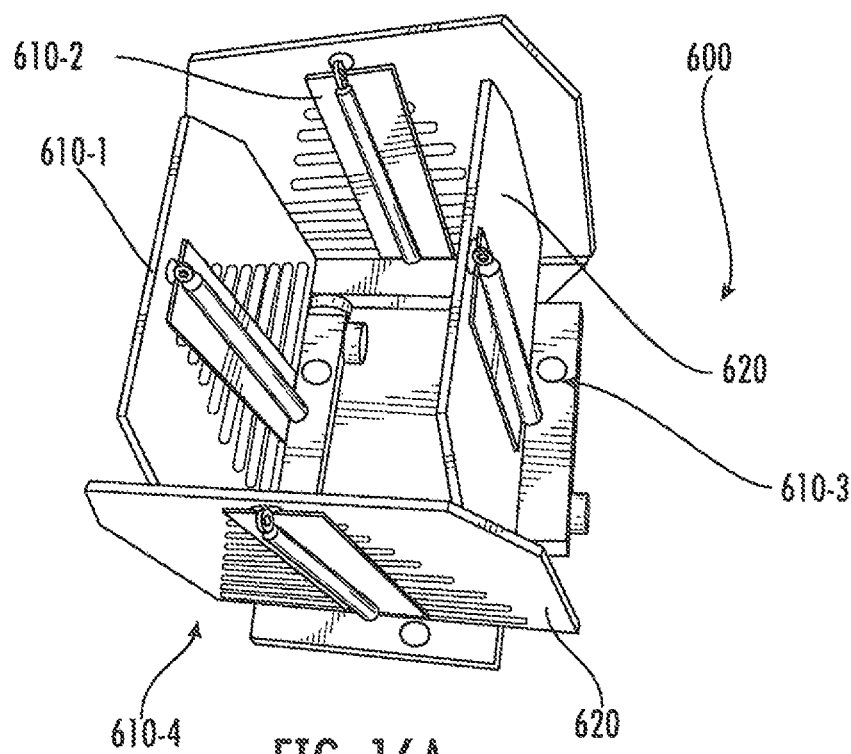
FIG. 16A
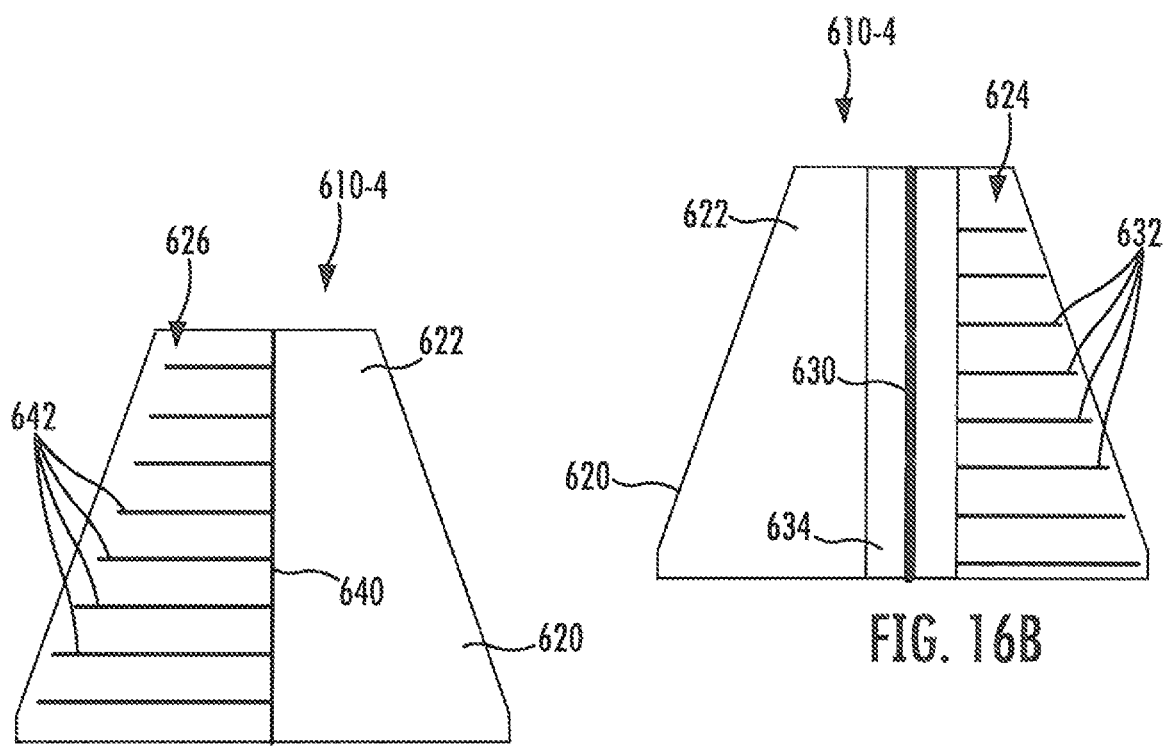
FIG. 16B
FIG. 16C

BASE STATION ANTENNAS HAVING ARRAYS OF RADIATING ELEMENTS WITH 4 PORTS WITHOUT USAGE OF DIPLEXERS

CROSS-REFERENCE TO RELATED APPLICATIONS

The present application is a 35 U.S.C. § 371 national stage application of PCT Application No. PCT/US2020/017162, filed Feb. 7, 2020, which itself claims priority to U.S. Provisional Patent Application Ser. No. 62/966,312, filed, Jan. 27, 2020, and to U.S. Provisional Patent Application Ser. No. 62/807,315, filed, Feb. 19, 2019, the contents of all of which are incorporated herein by reference in their entireties. The above-referenced PCT Application was published in the English language as International Publication No. WO 2020/171976 A1 on Aug. 27, 2020.

FIELD

The present invention relates to radio communications and, more particularly, to base station antennas for cellular communications.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular to the plane defined by the horizon. Reference will also be made to the azimuth plane, which is a plane that bisects the base station antenna that is parallel to the plane defined by the horizon, and to the elevation plane, which is a plane extending along the boresight pointing direction of the antenna that is perpendicular to the azimuth plane.

A very common base station configuration is a so-called "three sector" configuration in which the cell is divided into three 120° sectors in the azimuth plane. A base station antenna is provided for each sector. In a three sector configuration, the antenna beams generated by each base station antenna typically have a Half Power Beamwidth ("HPBW") in the azimuth plane of about 65° so that the antenna beams provide good coverage throughout a 120° sector. Three of these base station antennas will therefore provide full 360° coverage in the azimuth plane. Typically, each base station antenna will include a so-called linear array of radiating elements that includes a plurality of radiating elements that are arranged in a vertically-extending column. Each radiating element may have a HPBW of approximately 65°. By providing a column of radiating elements extending along the elevation plane, the elevation HPBW of the antenna beam may be narrowed to be significantly less than 65°, with the amount of narrowing increasing with the length of the column in the vertical direction.

As demand for cellular service has grown, cellular operators have upgraded their networks to increase capacity and to support new generations of service. When these new services are introduced, the existing "legacy" services typically must be maintained to support legacy mobile devices. Thus, as new services are introduced, either new cellular base stations must be deployed or existing cellular base stations must be upgraded to support the new services. In order to reduce cost, many cellular base stations support two, three, four or more different types or generations of cellular service. However, due to local zoning ordinances and/or weight and wind loading constraints, there is often a limit as to the number of base station antennas that can be deployed at a given base station. To reduce the number of antennas, many operators deploy antennas that communicate in multiple frequency bands to support multiple different cellular services.

There is considerable interest in base station antennas that include two linear arrays of "low-band" radiating elements that are used to support service in some or all of the 617-960 MHz frequency band. These antenna also typically include two linear arrays of "high-band" radiating elements that are used to provide service in some or all of the 1695-2690 MHz frequency band. The linear arrays of low-band and high-band radiating elements are typically mounted in side-by-side fashion. FIG. 1 is a schematic front view of a conventional base station antenna 10 that includes two columns 12-1, 12-2 of low-band radiating elements 16 and two columns 22-1, 22-2 of high-band radiating elements 26. Each radiating element is depicted in FIG. 1 (and other of the figures herein) as a large or small "X" to show that the radiating elements are dual-polarized cross-dipole radiating elements. Each column 12-1, 12-2 of low-band radiating elements 16 forms a respective linear array 14-1, 14-2 of low-band radiating elements 16, and each column 22-1, 22-2 of high-band radiating elements 26 forms a respective linear array 24-1, 24-2 of high-band radiating elements 26. It should be noted that herein, when multiple like or similar elements are provided, they may be labelled in the drawings using a two-part reference numeral (e.g., the linear arrays 14-1, 14-2). Such elements may be referred to herein individually by their full reference numeral (e.g., linear array 14-2) and may be referred to collectively by the first part of their reference numeral (e.g., the linear arrays 14).

Antennas having the configuration shown in FIG. 1 may be used in a variety of applications including 4×4 multi-input-multi-output ("MIMO") applications or as multi-band antennas that support cellular service in two different low-band frequency ranges (e.g., a 700 MHz low-band linear array 14-1 and an 800 MHz low-band linear array 14-2) and two different high-band frequency ranges (e.g., an 1800 MHz high-band linear array 24-1 and a 2100 MHz high-band linear array 24-2). These antennas, however, are challenging to implement in a commercially acceptable manner because achieving a 65° azimuth HPBW antenna beam in the low-band typically requires low-band radiating elements 16 that are at least 200 mm wide. Consequently, when two arrays 14-1, 14-2 of low-band radiating elements 16 are placed side-by-side with two linear arrays 24-1, 24-2 of high-band radiating elements 26 therebetween, as shown in FIG. 1, a base station antenna 10 having a width of nearly 500 mm may be required. Such large antennas may have high wind loading, may be heavy, and/or may be expensive to manufacture. Cellular operators would prefer base station antennas having widths of about 430 mm or less.

To narrow the width of the base station antenna 10 of FIG. 1, either the dimensions of the low-band radiating elements 16 and/or the lateral spacing between the linear arrays 14-1, 14-2 of low-band radiating elements 16 may be reduced. Unfortunately, as the linear arrays 14-1, 14-2 of low-band radiating elements 16 are moved closer together, the degree of signal coupling between the linear arrays 14-1, 14-2 can increase significantly and this "parasitic" coupling can lead to an undesired increase in the azimuth beamwidth. Similarly, any reduction in the dimensions of the low-band radiating elements 16 typically causes a corresponding increase in the azimuth beamwidth.

Various techniques have been suggested for narrowing the width of a base station antenna that includes two linear arrays 14-1, 14-2 of low-band radiating elements 16. FIGS. 2A-2C are schematic views of three base station antennas that each include two arrays of low-band radiating elements, where each antenna uses a different technique to narrow the azimuth beamwidth of the low-band linear arrays, which allows for the use of smaller low-band radiating elements in order to reduce the width of these antennas. The low-band arrays in these antennas include dual-polarized cross-dipole radiating elements that include first and second dipole radiators that transmit/receive signals at orthogonal (slant −45°/+45° polarizations. The base station antennas depicted in FIGS. 2A-2C may also include two linear arrays of high-band radiating elements that are positioned between the two arrays of low-band radiating elements (these high-band linear arrays may be identical to the high-band linear arrays 24-2, 24-2 depicted in FIG. 1). The linear arrays of high-band radiating elements, however, are omitted in FIGS. 2A-2C in order to simplify the drawings.

Referring first to FIG. 2A, a conventional base station antenna 30 is depicted that includes first and second columns 32-1, 32-2 of low-band radiating elements 36. The base station antenna 30 may be identical to the base station antenna 10 of FIG. 1, except that two additional low-band radiating elements 36 are added to antenna 30, and the radiating elements 36 are grouped differently to form the two arrays 34-1, 34-2. To help highlight which low-band radiating elements 36 are in each array 34-1, 34-2, polygons have been drawn around each array. As shown in FIG. 2A, the first and second arrays 34-1, 34-2 of low-band radiating elements 36 are so-called "L-shaped" arrays 34-1, 34-2. In particular, the first array 34-1 includes the bottom five radiating elements 36 in the left-hand column 32-1 as well as the bottom radiating element 36 in the right-hand column 32-2, while the second array 34-2 includes the top five radiating elements 36 in the right-hand column 32-2 as well as the top radiating element 36 in the left-hand column 32-1. Thus, the first array 34-1 has an upside-down L-shape and the second array 34-2 has an L-shape. Since each array 34-1, 34-2 includes a radiating element 36 that is in the opposite column 32-2, 32-1, respectively, the horizontal aperture of each array 34-1, 34-2 is increased, with a commensurate reduction in the azimuth beamwidth. One disadvantage, however, of this design is that it requires adding an extra radiating element 36 to each column 32-1, 32-2, which increases the length and cost of the antenna 30 without providing any reduction in the elevation beamwidth and/or any appreciable increase in the gain of the antenna 30.

FIG. 2B is a schematic front view of another conventional base station antenna 40 that increases the horizontal aperture without the need for adding an extra radiating element in each column. As shown in FIG. 2B, the base station antenna 40 includes two columns 42-1, 42-2 of low-band radiating elements 46. The radiating elements 46 form first and second so-called "Y-shaped" arrays 44-1, 44-2 (note that each array 44 is one radiating element short of actually having a "Y-shape"). The base station antenna 40 may be identical to the base station antenna 10 of FIG. 1, except that the bottom radiating element 46 in each column 42-1, 42-2 is switched to be part of the array 44 formed by the rest of the radiating elements 46 in the opposite column 42-1, 42-2. Since each array 44-1, 44-2 includes a radiating element 46 that is in the opposite column 42-1, 42-2, the horizontal aperture of each array 44-1, 44-2 is increased, with a commensurate reduction in the azimuth beamwidth. Moreover, the base station antenna 40 includes the same number of radiating elements 46 as does base station antenna 10, and hence does not suffer from the cost and size disadvantages associated with base station antenna 30. One disadvantage, however, of the design of base station antenna 40 is that the physical distance between the bottom two radiating elements 46 in each array 44-1, 44-2 is increased (since the physical distance is taken along a diagonal as opposed to simply being the vertical distance between the two radiating elements 46), and this results in off-axis grating lobes in the resultant radiation patterns formed by the first and second arrays 44-1, 44-2. These grating lobes reduce the gain of the antenna 40, and may also result in interference with neighboring base stations.

FIG. 2C is a schematic front view of another conventional base station antenna 50 that has low-band arrays with increased horizontal apertures. The base station antenna 50 is disclosed in U.S. Pat. No. 8,416,142 to Göttl. As shown in FIG. 2C, the base station antenna 50 includes first and second columns 52-1, 52-2 of dual-polarized cross-dipole low-band radiating elements 56. The radiating elements 56 in the left-hand column 52-1 are part of a first array 54-1, and the radiating elements 56 in the right-hand column 52-2 are part of a second array 54-2. The antenna 50 further includes first and second centrally located radiating elements 58-1, 58-2, which may be identical in design to the radiating elements 56. One dipole radiator of each centrally-located radiating element 58-1, 58-2 is part of the first array 54-1 and the other dipole radiator of each centrally-located radiating element 58-1, 58-2 is part of the second array 54-2. Thus, the first array 54-1 includes six dipole radiators for each polarization (namely the five dipole radiators at each polarization included in the radiating elements in the first column 52-1, the +45° dipole radiator of centrally-located radiating elements 58-1, and the −45° dipole radiator of centrally-located radiating element 58-2). Likewise, the second array 54-2 includes six dipole radiators for each polarization (namely the five dipole radiators at each polarization included in the radiating elements in the second column 52-2, the −45° dipole radiator of centrally-located radiating element 58-1, and the +45° dipole radiator of centrally-located radiating element 58-2). The centrally-located radiating element 58-1, 58-2 act to narrow the azimuth beamwidth by increasing the horizontal aperture of each array 54-1, 54-2. This may allow for reduction in the size of the individual radiating elements 56, 58, and hence may allow the overall width of the antenna 50 to be reduced.

BRIEF DESCRIPTION OF THE DRAWINGS

FIG. 1 is a schematic front view of a conventional base station antenna that includes two linear arrays of low-band radiating elements and two linear arrays of high-band radiating elements.

FIGS. 2A-2C are schematic front views of several conventional base station antennas that have arrays of dual-polarized cross-dipole radiating elements that have increased horizontal apertures that narrow the azimuth beamwidth.

FIG. 16A is a perspective view of a log periodic dipole box dipole radiating element according to embodiments of the present invention that may be used to implement the box dipole radiating elements included in the shared linear arrays according to embodiments of the present invention.

FIGS. 16B and 16C are top and bottom views, respectively of one of the log periodic dipole radiators included in the log periodic dipole box dipole radiating element of FIG. 16A.

DETAILED DESCRIPTION

Figure 2B:
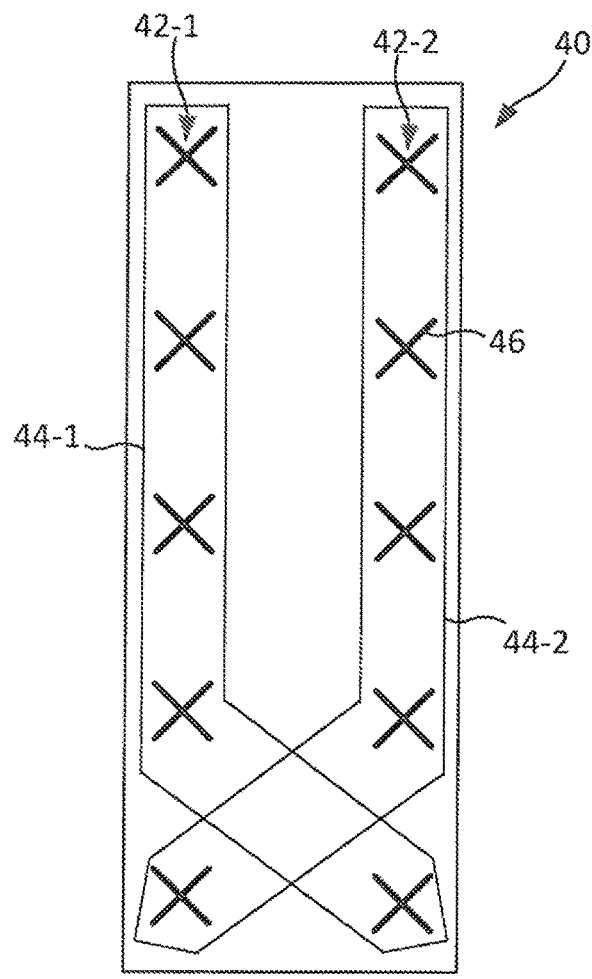
Figure 2C:
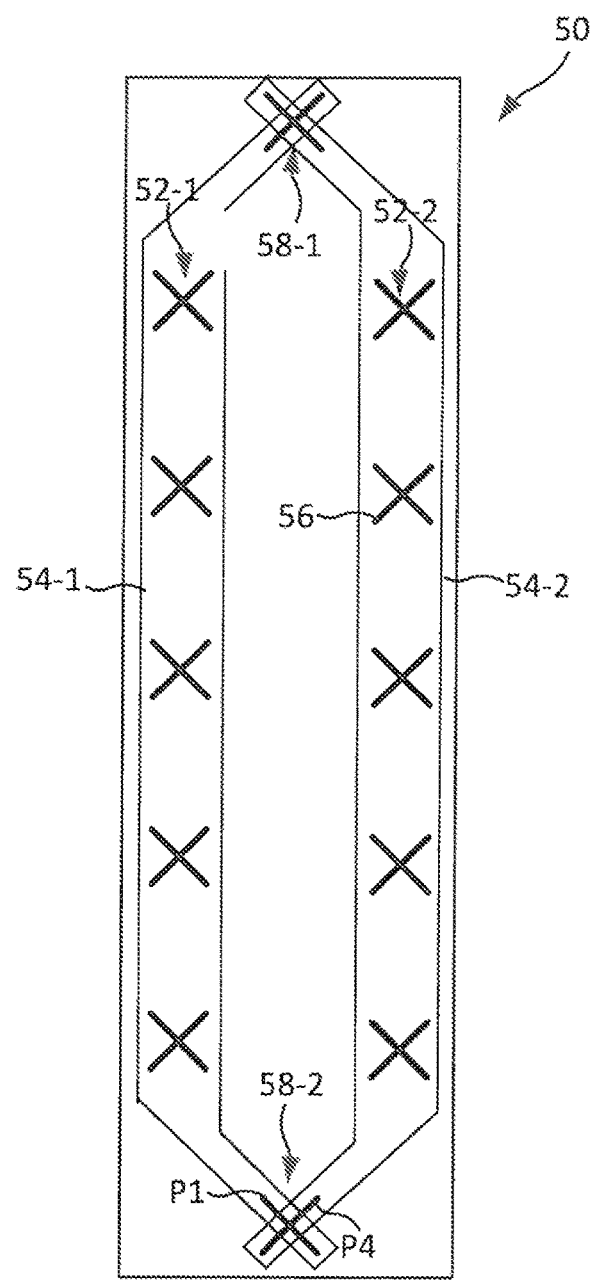

Pursuant to embodiments of the present invention, base station antennas are provided that include one or more linear arrays of shared radiating elements that may be used to replace wider conventional antennas while providing comparable functionality. The shared radiating elements included in the antennas according to embodiments of the present invention may comprise, for example, box dipole radiating elements that have four dipole radiators arranged to form a square, a rectangle or a generally circular shape, or variations thereof. A respective first four-port combiner may be used to feed first and second adjacent dipole radiators of each box dipole radiating element and a respective second four-port combiner may be used to feed third and fourth dipole radiators of each box dipole radiating element. Each first four-port combiner may be coupled to first and second RF ports of the antenna, and each second four-port combiner may be coupled to third and fourth RF ports of the antenna.

Conventional linear arrays of radiating elements typically either couple two RF ports to a linear array of dual-polarized radiating elements (thus requiring two linear arrays of dual-polarized radiating elements to support four RF ports) or couple four RF ports to a single linear array of wideband dual-polarized radiating elements through diplexers. The base station antennas according to embodiments of the present invention may provide the same functionality as conventional antennas using either half the number of linear arrays of radiating elements, or by using the same number of linear arrays without any need for diplexers. The base station antennas according to embodiments of the present invention may also be used in multibeam antennas and/or in beamforming antennas. Since the base station antennas according to embodiments of the present invention may, in some configurations, use a single linear array to provide the same functionality that requires two linear arrays in conventional antennas, the base station antennas according to embodiments of the present invention may have reduced widths, reduced weights and/or reduced manufacturing costs.

In some embodiments, base station antennas are provided that include first through fourth RF ports and a linear array of radiating elements, where each radiating element in the linear array includes first though fourth radiators. These antennas further include a plurality of first combiners and a plurality of second combiners. First and second of the radiators of each of the radiating elements are coupled to two of the first through fourth RF ports via a respective one of the first combiners, and third and fourth of the radiators of each of the radiating elements are coupled to two of the first through fourth RF ports via a respective one of the second combiners.

In other embodiments, base station antennas are provided that include a plurality of radiating elements that are arranged to form a linear array of radiating elements, where each radiating element in the array is responsive to first through fourth RF signals.

In still other embodiments, base station antennas are provided that include first through fourth RF ports and a plurality of radiating elements that each includes a first radiator, a second radiator, a third radiator and a fourth radiator. These antennas further include a first combiner having a first input that is coupled to the first RF port, a second input that is coupled to the second RF port, a first output that is coupled to the first radiator of a first of the radiating elements and a second output that is coupled to the second radiator of the first of the radiating elements. The antennas may also include a second combiner having a first input that is coupled to the third RF port, a second input that is coupled to the fourth RF port, a first output that is coupled to the third radiator of the first of the radiating elements and a second output that is coupled to the fourth radiator of the first of the radiating elements.

Pursuant to further embodiments of the present invention, base station antennas are provided that have linear arrays of shared box dipole radiating elements, where each box dipole radiating element includes a first dipole radiator unit and a second dipole radiator unit. Each dipole radiator unit may include first and second dipole radiators. The first dipole radiator and the second dipole radiator may be arranged in the same locations in each of the box dipole radiating elements in the linear array. However, some of the box dipole radiating elements in the linear array are fed differently from other of the box radiating elements. For example, a first RF port of the antenna may be coupled to the first dipole radiator units of some of the box dipole radiating elements but may be coupled to the second dipole radiator units of other of the box dipole radiating elements. Applicants have discovered that this technique may improve both the co-polarization and cross-polarization discrimination performance of the linear array and/or may narrow the azimuth beamwidth of the antenna beams that are generated by the linear array.

When shared box dipole radiating elements are used to support four RF ports of a base station antenna (without the use of diplexers), a left dipole radiator and one of a top dipole radiator and a bottom dipole radiator of each box dipole radiating elements together form a respective first dipole radiator unit, and a right dipole radiator and the other one of the top dipole radiator and the bottom dipole radiator of each box dipole radiating elements together form a respective second dipole radiator unit. Because the left dipole radiator and the right dipole radiator of each box dipole radiating element are horizontally spaced apart from each other, the respective phase centers of the first and second dipole radiator units are also horizontally spaced apart from each other. Likewise, because the top dipole radiator and the bottom dipole radiator of each box dipole radiating element are vertically spaced apart from each other, the respective phase centers of the first and second dipole radiator units are also vertically spaced apart from each other. If first and second RF ports of a base station antenna are coupled to the first dipole radiator units of each box dipole radiating element, the linear array will be unbalanced because each first dipole radiator unit will only have second dipole radiator units on one side thereof, and because each second dipole radiator unit will only have first dipole radiators on one side thereof. This unbalance may result in degraded co-polarization performance and/or in degraded cross-polarization discrimination performance for the linear array. By, for example, coupling the first and second RF ports to the first dipole radiator units of about half of the box dipole radiating elements in the linear array and to the second dipole radiator units of the remaining box dipole radiating elements in the linear array, balance may be restored. Thus, the linear arrays according to embodiments of the present invention may exhibit good co-polarization and cross-polarization performance.

Figure 12:
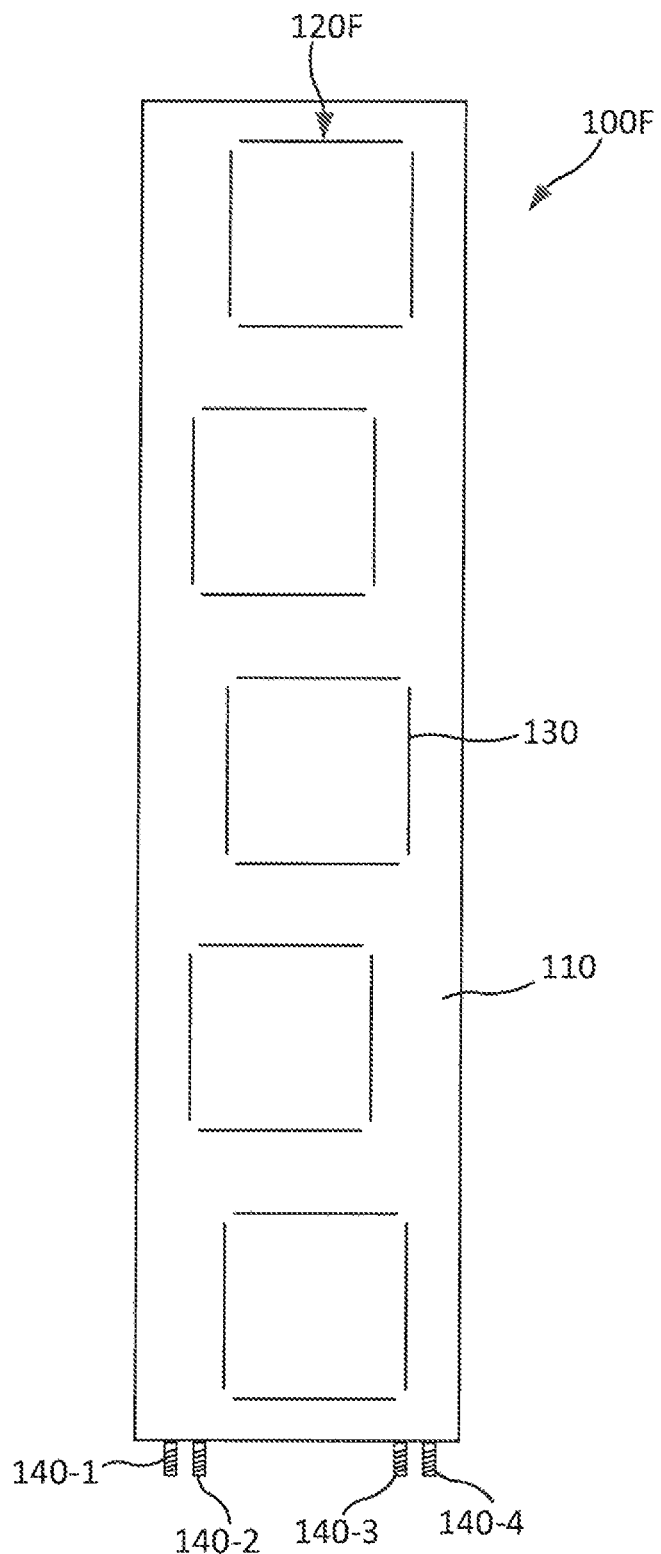
FIG. 12 is a schematic front view of a base station antenna according to embodiments of the present invention that includes a staggered array of shared radiating elements.

In addition, by feeding some of the box dipole radiating elements differently from other of the box dipole radiating elements the azimuth beamwidth of the antenna beams generated by the shared linear array may potentially be narrowed. This narrowing may be achieved because the respective phase centers for the first and second dipole radiator units of the box dipole radiating elements may be horizontally offset from each other. Consequently, if the first dipole radiator units of some of the box dipole radiating element in the linear array are coupled to a first pair of RF ports while the second dipole radiator units of other of the box dipole radiating elements in the linear array are coupled to the first pair of RF ports, then the array—which may have all of the box dipole radiating elements aligned a vertical axis—may effectively appear to be a staggered array. Moreover, if additional narrowing of the azimuth beamwidth is needed, then a physical stagger (as shown in FIG. 12 of the present application) may be added to the array (so that the radiating elements are no longer aligned along a vertical axis).

In some embodiments, the feed network for the box dipole radiating elements of the above-discussed shared linear arrays may be configured to couple a first RF source to the left dipole radiator of a first of the box dipole radiating elements and to couple the first RF source to the right dipole radiator of a second of the box dipole radiating elements. The feed network may further be configured to couple a second RF source to the left dipole radiator of the first of the box dipole radiating elements, and to couple the second RF source to the right dipole radiator of the second of the box dipole radiating elements. The feed network may also be further configured to couple the right dipole radiator of the first of the box dipole radiating elements to a third RF source, and to couple the left dipole radiator of the second of the box dipole radiating elements to the third RF source, and/or to couple the right dipole radiator of the first of the box dipole radiating elements to a fourth RF source, and to couple the left dipole radiator of the second of the box dipole radiating elements to the fourth RF source. Such feeding arrangements may reduce or eliminate unbalance in the shared linear array and improve the performance thereof.

In some embodiments, the feed network may be configured to couple the first RF source to the respective left dipole radiators of a first half of the box dipole radiating elements and to couple the first RF source to the right dipole radiators of a second half of the box dipole radiating elements. In such embodiments, each box dipole radiating element in the first half of the box dipole radiating elements is directly adjacent at least one of the box dipole radiating elements in the second half of the box dipole radiating elements.

While the above embodiments are implemented using box dipole radiating elements, as will be discussed in more detail herein, in other embodiments other types of box-style radiating elements may be used or radiating elements having other shapes (e.g., cross-shaped).

Pursuant to further embodiments of the present invention, base station antennas are provided that include first and second RF source and a linear array of radiating elements that includes a plurality of radiating elements that are aligned along a vertical axis. Each radiating element in the linear array includes a first radiator unit that has first and second radiators and a second radiator unit that includes third and fourth radiators. The first RF source is coupled to each of the radiating elements in the linear array, and a phase center of RF radiation emitted by a first of the radiating elements in response to the first RF source is horizontally offset from a phase center of RF radiation emitted by a second of the radiating elements in response to the first RF source. Each radiating elements may be a box dipole radiating element that includes a top dipole radiator, a bottom dipole radiator, a left dipole radiator and a right dipole radiator. In such embodiments, a feed network of the antenna may couple the first and second RF sources to the left dipole radiator of a first of the box dipole radiating elements and couple the first and second RF sources to the right dipole radiator of a second of the box dipole radiating elements. The feed network may further be configured to couple the right dipole radiator of the first of the box dipole radiating elements to a third RF source and to a fourth RF source, and to couple the left dipole radiator of the second of the box dipole radiating elements to the third and fourth RF sources.

Pursuant to still further embodiments of the present invention, box dipole radiating elements are provided that are suitable for use as the shared radiating elements according to embodiments of the present invention. In particular, in some embodiments, the box dipole radiating elements may be formed using log periodic dipole radiators. The log periodic dipole radiators may exhibit a relatively high level of directivity, which may reduce coupling between adjacent log periodic dipole radiators in each box dipole radiating element.

Embodiments of the present invention will now be discussed in more detail with reference to FIGS. 3A-17, which illustrate example base station antennas according to embodiments of the present invention as well as components that may be included in those base station antennas.

Figure 3A:
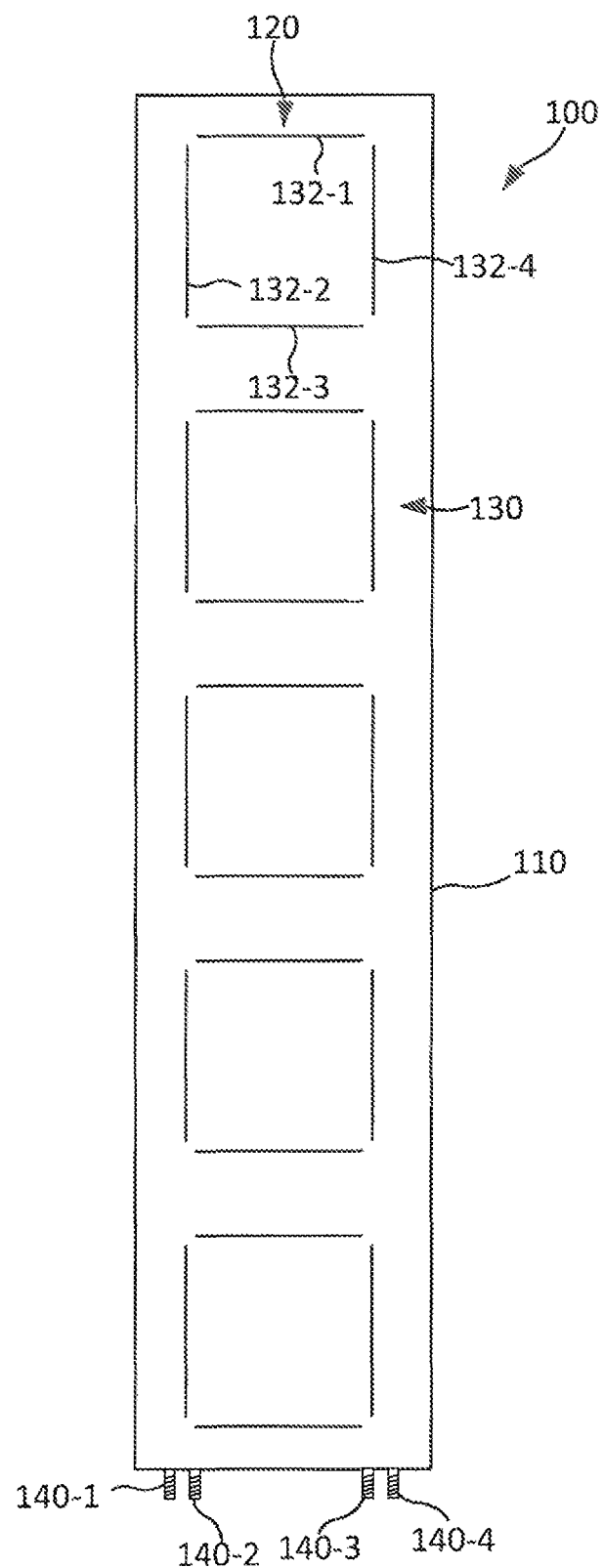
FIG. 3A is a schematic front view of a base station antenna according to embodiments of the present invention that includes an array of shared radiating elements that can be used in place of two conventional linear arrays of radiating elements.

FIG. 3A is a schematic front view of a base station antenna 100 according to embodiments of the present invention. As shown in FIG. 3A, the base station antenna 100 includes a linear array 120 of box dipole radiating elements 130 that are mounted to extend forwardly from a reflector 110. The antenna 100 includes a total of four RF ports 140-1 through 140-4. All four RF ports 140 may be coupled to the linear array 120 via a feed network (see FIG. 3B). While a total of five box dipole radiating elements 130 are shown in FIG. 3A, it will be appreciated that any appropriate number of radiating elements 130 may be included in the linear array 120. The number of box dipole radiating elements 130 included in the linear array 120 may be selected, for example, to meet specified gain and/or elevation beamwidth requirements. Moreover, while the base station antenna 100 is illustrated as having a single linear array 120 of radiating elements 130, it will be appreciated that additional arrays of radiating elements (not shown) may be included on the antenna 100. For example, one or more arrays of high-band radiating elements may be included in some embodiments.

Figure 3B:
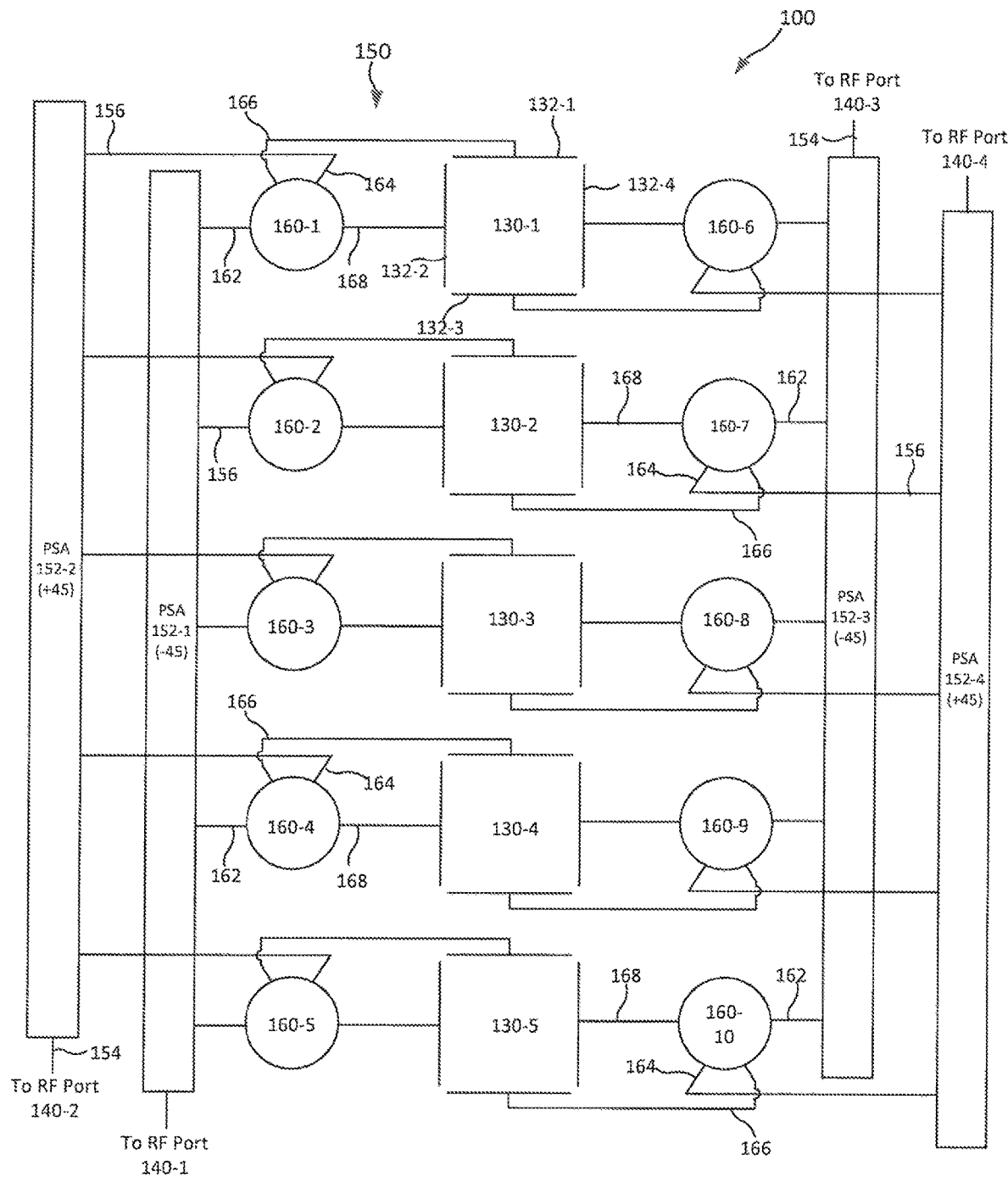
FIG. 3B is a schematic view of the base station antenna of FIG. 3A that illustrates the feed network for the antenna.

FIG. 3B is a schematic view of the base station antenna 100 of FIG. 3A that illustrates a feed network 150 thereof. As shown in FIG. 3B, the feed network 150 for linear array 120 includes four phase shifter assemblies ("PSA") 152-1 through 152-4 as well as ten four-port combiners 160-1 through 160-10. Each four-port combiner 160 includes the first and second input ports 162, 164 as well as first and second output ports 166, 168. In the description that follows, various ports of the phase shifter assemblies 152 and the combiners 160 are referred to as being "input ports" or "output ports." The "input" and "output" labels are made under the assumption that an RF signal that is to be transmitted by base station antenna 100 (a "transmit RF signal") is passing through the feed network 150. It will be appreciated that with respect to RF signals received by base station antenna 100 each "output port" will operate as an input port and each "input port" will operate as an output port due to the bidirectional nature of the RF signals passed through base station antenna 100.

Each RF port 140-1 through 140-4 is coupled to an input port 154 of a respective one of the phase shifter assemblies 152-1 through 152-4 by, for example, a coaxial cable (not shown). Intervening components such as, for example, diplexers, may be disposed between each RF port 140 and the input port 154 of its corresponding phase shifter assembly 152. Each phase shifter assembly 152 may include a power splitter/combiner and a phase shifter (not shown separately). The power splitter/combiner may be a component that divides an RF transmit signal into a plurality of sub-components and that combines a plurality of sub-components of a received signal into a single combined receive signal. The phase shifter may be a component that imparts a phase taper to the various components of the transmit and receive RF signals. The phase shifter may be an adjustable phase shifter that can be remotely controlled to vary the amount of phase taper applied to the transmit and receive RF signals in order to impart a desired amount of electrical downtilt to the antenna beam. Suitable phase shifter assemblies are disclosed, for example, in U.S. Patent Publication No. 2017/0365923, the entire content of which is incorporated herein by reference.

Each phase shifter assembly 152 also includes a plurality of "output" ports 156. The sub-components of a transmit RF signal may be output through the respective output ports 156 and the sub-components of a received RF signal may enter each phase shifter 152 through the respective output ports 156. As shown in FIG. 3B, the five output ports 156 of phase shifter assembly 152-1 are coupled to the respective first input ports 162 the four-port combiners 160-1 through 160-5. Likewise, the five output ports 156 of phase shifter assembly 152-2 are coupled to the respective second input ports 164 of four-port combiners 160-1 through 160-5. The five output ports 156 of phase shifter assembly 152-3 are coupled to the respective first input ports 162 of four-port combiners 160-6 through 160-10, and the five output ports 156 of phase shifter assembly 152-4 are coupled to the respective second input ports 164 of four-port combiners 160-6 through 160-10.

Each four-port combiner 160 may combine transmit RF signals that are input to the combiner 160 through its input ports 162, 164 and output the combined RF signals at its output ports 166, 168. In some embodiments, the four-port combiners 160 may be configured so that RF signals input at port 162 will be split equally and output as in-phase signals at ports 166, 168, while RF signals input at port 164 will be split equally and output as out-of-phase signals at ports 166, 168. It will also be appreciated that the four-port combiners 160 are bi-directional devices so that for received RF signals ports 166 and 168 operate as "input" ports and ports 162 and 164 operate as "output" ports.

As discussed above with reference to FIG. 3A, the base station antenna 100 further includes a linear array 120 of box dipole radiating elements 130. Each box dipole radiating element 130 may include four dipole radiators 132-1 through 132-4 that are arranged, for example, to form a rectangle when viewed from the front. As shown in FIG. 3B, the first output port 166 of each four-port combiner 160-1 through 160-5 is coupled to the first dipole radiator 132-1 of a respective one of the box dipole radiating elements 130, and the second output port 168 of each four-port combiner 160-1 through 160-5 is coupled to the second dipole radiator 132-2 of a respective one of the box dipole radiating elements 130, where the second dipole radiator 132-2 is adjacent the first dipole radiator 132-1. Likewise, the first output port 166 of each four-port combiner 160-6 through 160-10 is coupled to the third dipole radiator 132-3 of a respective one of the box dipole radiating elements 130, and the second output port 168 of each four-port combiner 160-6 through 160-10 is coupled to the fourth dipole radiator 132-4 of a respective one of the box dipole radiating elements 130, where the fourth dipole radiator 132-4 is adjacent the third dipole radiator 132-3. The first and second dipole radiators 132-1, 132-2 operate together to form a first dipole radiator unit, and the third and fourth dipole radiators 132-3, 132-4 operate together to form a second dipole radiator unit.

As shown in FIGS. 3A-3B, a total of four RF ports 140 are coupled to a single linear array 120 of "shared" radiating elements 130. As will be discussed in greater detail below, the linear array 120 may be used to transmit and receive RF signals coupled to all four RF ports 140, even when the RF signals are in the same frequency band, without unacceptable levels of interference. Thus, the linear array 120 may, for example, support so-called four transmit/four receive (4T/4R) multi-input-multi-output ("MIMO") operations using a single linear array 120, as the linear array 120 may be used to transmit (or receive) four separate RF signals at the same time in the same frequency band. In contrast, conventional 4T/4R MIMO antennas include at least two linear arrays of radiating elements that each transmit (or receive) two separate RF signals (namely one RF signal at each of two orthogonal polarizations).

Instead of operating as a 4T/4R MIMO antenna, the linear array 120 of shared radiating elements 130 may instead be used to transmit/receive two RF signals in each of two different frequency bands. For example, the shared radiating elements 130 may be designed to operate in a frequency range that spans at least two of the cellular frequency bands such as, for example, the 600 MHz and 700 MHz bands or the 700 MHz and 800 MHz bands.

Base station antennas are known in the art that include linear arrays of "wide-band" radiating elements that are capable of operating in two or more of the cellular frequency bands. For example, base station antennas are commercially available that include a linear array of dual-polarized radiating elements that can operate across the full 696-960 MHz frequency band, which includes a number of different cellular frequency bands. In some cases, diplexers are included in these antennas that allow a pair of first frequency band RF ports and a pair of second frequency band RF ports to be coupled to a single wideband linear array. The common ports of the diplexers are coupled to the radiating elements of the array while the frequency-selective ports of the diplexers are coupled to the RF ports. Typically, cellular operators want to be able to independently control the downtilt on both frequency bands, which means that the diplexers are typically located on the RF paths between the phase shifter assemblies and the radiating elements. Since the RF signals are split into a plurality of sub-components in each phase shifter assembly (see discussion above), this means a relatively large number of diplexers are required (e.g., ten diplexers). Unfortunately, the diplexers can be bulky, heavy and expensive to manufacture, and hence can significantly increase the cost, weight and size of the antenna.

As described above, the linear array 120 of base station antenna 100 can simultaneously transmit signals from four RF ports. As such, the linear array 120 can support transmission of RF signals at two different polarizations in two different frequency bands without any need for the diplexers that are included in conventional dual-band linear arrays. In such an arrangement, RF ports 140-1 and 140-2 of base station antenna 100 would be connected to respective first and second polarization ports on a first radio that operates in a first frequency band and RF ports 140-3 and 140-4 of base station antenna 100 would be connected to respective first and second polarization ports on a second radio that operates in a second, different frequency band. Thus, the linear arrays 120 of shared radiating elements 130 according to embodiments of the present invention may be used to either reduce the number of linear arrays in a base station antenna or to eliminate the need for diplexers, while still providing the same functionality as conventional base station antennas.

Operation of the base station antenna 100 will now be discussed in more detail with reference to FIGS. 4A and 4B, which show an example embodiment of one of the box dipole radiating elements 130. In particular, FIG. 4A is schematic perspective view of a shared box dipole radiating element 200 that may be used to implement the box dipole radiating elements 130 included in base station antenna 100, and FIG. 4B is a schematic front view of the shared box dipole radiating element 200 of FIG. 4A that illustrates how the shared box dipole radiating element 200 may be fed to generate a total of four slant polarized antenna beams.

Figure 4A:
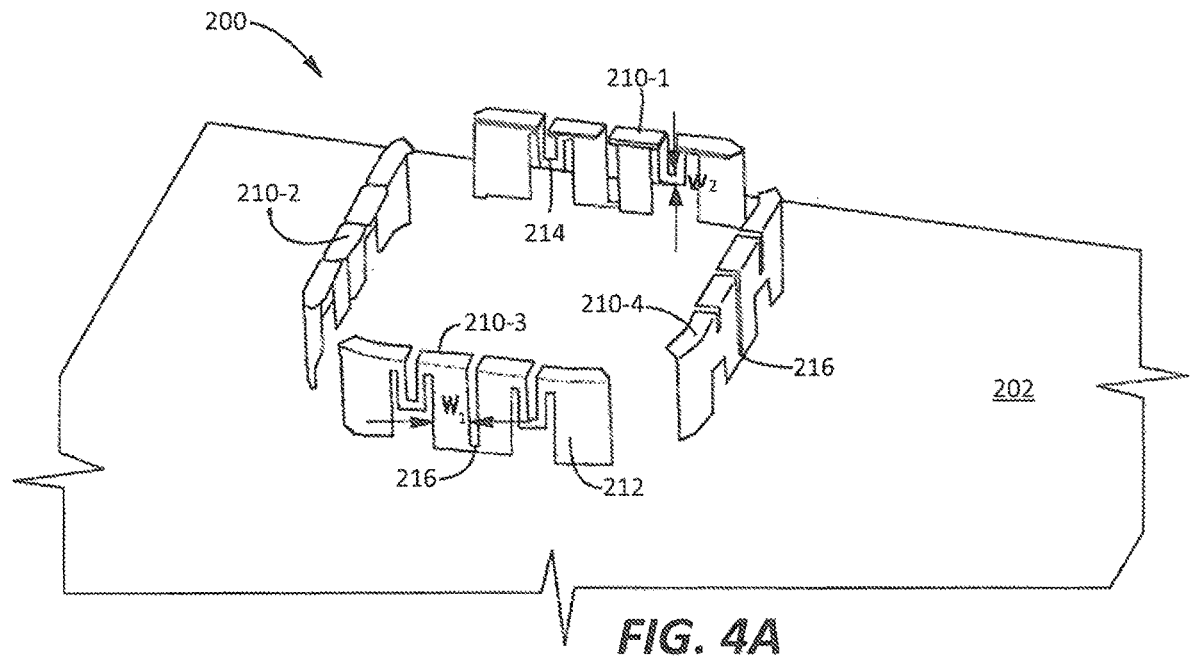
FIG. 4A is schematic perspective view of a shared box dipole radiating element that may be used in base station antennas according to embodiments of the present invention.
Figure 4B:
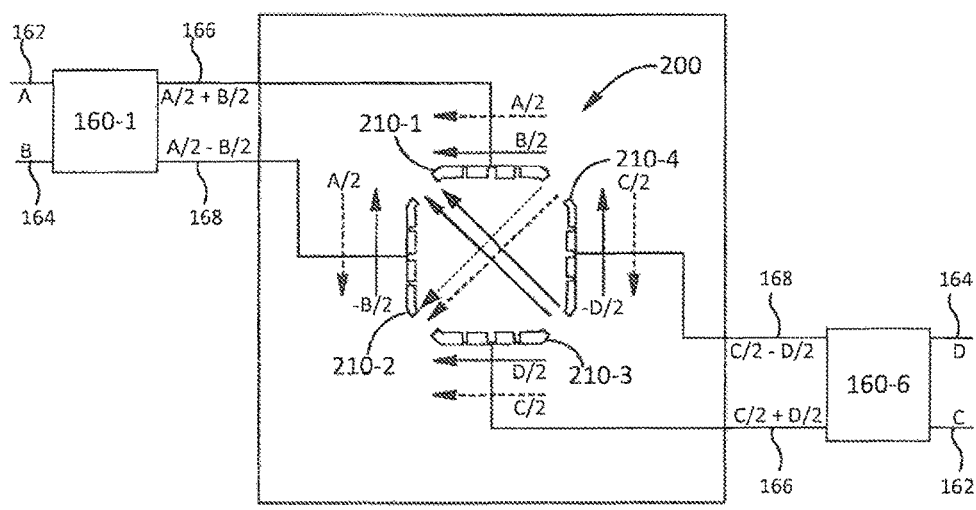
FIG. 4B is a front view of the shared box dipole radiating element of FIG. 4A that illustrates a method of feeding the shared box dipole to generate two slant +45° polarization antenna beams and two slant −45° polarization antenna beams.

Referring to FIG. 4A, the shared box radiating element 200 includes first through fourth dipole radiators 210-1 through 210-4 that are arranged to define a square. Each dipole radiator 210 may have a length that is, for example, a half wavelength or less, where the wavelength is the wavelength corresponding to the center frequency in the operating frequency band of the shared box dipole radiating element 200. The dipole radiators 210 are not electrically connected to each other. In the depicted embodiment, each dipole radiator 210 is implemented as a stamped metal dipole radiator that is formed into the shape shown in FIG. 4A. Each dipole radiator 210 may be mounted roughly one quarter wavelength (or less) in front of a conductive reflector 202 which may be, for example, the main reflector of base station antenna 100. While not shown in FIG. 4A, "stalk" printed circuit boards, metal RF transmission lines or other feed stalk structures may be used to mount each dipole radiator 210 at the appropriate distance in front of the reflector 202. Coaxial cables (not shown) or other RF transmission lines may connect the feed stalk to the feed network 150 to feed RF signals to and from the dipole radiators 210. Each dipole radiator 210 may be center fed by soldering a lower central portion 216 of each dipole radiator 210 to the stalk printed circuit board or other feed stalk (not shown).

Each dipole radiator 210 includes a plurality of widened conductive segments 212 that are electrically connected by at least one narrow conductive segment 214. Each widened conductive segment 212 may have a respective width $W_1$, where the width $W_1$ is measured in a direction that is generally perpendicular to the direction of current flow along the respective widened conductive segment 212. The width $W_1$ of each widened conductive segment 212 need not be constant. The narrow conductive segments 214 may similarly have a respective width $W_2$, where the width $W_2$ is measured in a direction that is generally perpendicular to the direction of instantaneous current flow along the narrow conductive segment 214. The width $W_2$ of each narrow conductive segment 214 also need not be constant.

The narrow conductive segments 214 may be implemented as meandered conductive traces. Herein, a meandered conductive trace refers to a conductive trace that follows a meandered path to at least twice the path length thereof (i.e., the length of the meandered path is at least twice the length of the most direct path). By meandering the conductive traces, the length of the narrow conductive segments 214 may be extended while still providing relatively compact narrow conductive segments 214. The meandered conductive traces 214 may act as inductors. The average width of each widened conductive segment 212 may be, for example, at least three times the average width of each narrow conductive segment 214 in some embodiments. In other embodiments, the average width of each widened conductive segment 212 may be at least five times the average width of each narrow conductive segment 214.

Implementing the dipole radiators 210 as a series of widened conductive segments 212 that are connected by narrow conductive segments 214 may improve the performance of other arrays of radiating elements that may be included in base station antenna 100 (as discussed above, these additional arrays are not shown in FIGS. 3A and 3B). For example, the base station antenna 100 may include one or more linear arrays of high-band radiating elements that may be identical to the linear arrays 24-1, 24-2 of high-band radiating elements 26 shown in FIG. 1. Since the high-band radiating elements 26 would typically be located in close proximity to the linear array 120 in order to reduce the dimensions of base station antenna 100, the RF signals transmitted and received by the high-band arrays 24-1, 24-2 may tend to induce currents on the dipole radiators 210 of the shared box dipole radiating elements 130. As a result, the radiation patterns generated by the array(s) 24-1, 24-2 of high-band radiating elements 26 may be distorted due to the currents induced on the low-band radiating elements 200. By forming the shared box dipole radiating elements 200 to have dipole radiators 210 that include widened sections 212 that are separated by narrow conductive segments 214, currents in the higher frequency range that otherwise could be induced on the dipole radiators 210 may be interrupted by the narrow conductive segments 214, which act as high impedance sections. As a result, the high-band RF signals tend to not induce currents on the dipole radiators 210. The narrow conductive segments 214 are designed, however, to appear as a relatively low impedance at the low-band frequencies so that they do not significantly impact the ability of the low-band currents to flow on the dipole radiators 210. In other words, the narrow conductive segments 214 may reduce induced high-band currents on the dipole radiators 210 and consequent disturbance to the antenna pattern of the higher band array without significantly impacting the low-band antenna patterns.

FIG. 4B illustrates one technique for feeding and phasing RF signals to the dipole radiators 210 so that the shared box dipole radiating element 200 will radiate RF energy at slant +45°/−45° polarizations. Referring to FIG. 4B, a technique for feeding each shared box dipole radiating element 200 is shown that allows the shared box dipole radiating elements 200 to generate a total of four slant polarized antenna beams. In particular, FIG. 4B shows how the first shared radiating element 130-1 of FIG. 3B (implemented as the box dipole radiating element 200 of FIG. 4A) may be fed by the first and sixth four-port combiners 160-1, 160-6 of FIG. 3B.

As shown in FIGS. 3B and 4B, the first input port 162 of four-port combiner 160-1 is coupled to an output port 156 of the first phase shifter assembly 152-1 and the second input port 164 of four-port combiner 160-1 is coupled to an output port 156 of the second phase shifter assembly 152-2, while the first input port 162 of four-port combiner 160-6 is coupled to an output port 156 of the third phase shifter assembly 152-3 and the second input port 164 of four-port combiner 160-6 is coupled to an output port 156 of the fourth phase shifter assembly 152-4. As is further shown in FIGS. 3B and 4B, the first output port 166 of four-port combiner 160-1 is coupled to center feed the first dipole radiator 210-1, the second output port 168 of four-port combiner 160-1 is coupled to center feed the second dipole radiator 210-2, the first output port 166 of four-port combiner 160-6 is coupled to center feed the third dipole radiator 210-3, and the second output port 168 of four-port combiner 160-6 is coupled to center feed the fourth dipole radiator 210-4.

In FIG. 4B, the dotted arrows beside dipole radiators 210-1, 210-2 illustrate the direction of current flow along those dipole radiators in response to a feed signal "A" input to the first input port 162 of four-port combiner 160-1, while the dotted arrows beside dipole radiators 210-3, 210-4 illustrate the direction of current flow along those dipole radiators in response to a feed signal "B" input to the second input port 164 of four-port combiner 160-2. Similarly, the solid arrows beside dipole radiators 210-3, 210-4 illustrate the direction of current flow along those dipole radiators in response to a feed signal "C" input to the first input port 162 of four-port combiner 160-6, while the solid arrows beside dipole radiators 210-3, 210-4 illustrate the direction of current flow along those dipole radiators in response to a feed signal "D" input to the second input port 164 of four-port combiner 160-6.

As shown in FIG. 4B, the four-port combiner 160-1 generates a pair of signals that are output at ports 166, 168 in response to RF signals "A" or "B" being input to input ports 162, 164. The resultant signal output at output port 166 may have a value A/2+B/2, and the resultant signal output at output port 168 may have a value A/2 or −B/2, where the minus sign indicates that the signal "B/2" output at port 168 is 180 degrees out-of-phase with the signal "B/2" output at port 166. The signal output at port 166 is fed to dipole radiator 210-1 and generates a first current corresponding to component "A/2" that passes from right to left along dipole radiator 210-1 or a second current corresponding to component "B/2" that also passes from right to left along dipole radiator 210-1. The signal output at output port 168 is fed to dipole radiator 210-2 and generates a first current corresponding to component "A/2" that passes from top to bottom along dipole radiator 210-2 or a second current corresponding to component "−B/2" that passes from bottom to top along dipole radiator 210-2.

Similarly, the four-port combiner 160-6 generates a pair of signals that are output at ports 166, 168 in response to RF signals "C" or "D" being input to input ports 162, 164. The resultant signal output at port 166 may have a value C/2 or D/2 and the resultant signal output at output port 168 may have a value C/2 or −D/2, where the minus sign indicates that the signal "D/2" output at port 168 is 180 degrees out-of-phase with the signal "D/2" output at port 166. The signal output at output port 166 is fed to dipole radiator 210-3 and generates a first current corresponding to component "C/2" that passes from right to left along dipole radiator 210-3 or a second current corresponding to component "D/2" that also passes from right to left along dipole radiator 210-3. The signal output at output port 168 is fed to dipole radiator 210-4 and generates a first current corresponding to component "C/2" that passes from top to bottom along dipole radiator 210-4 or a second current corresponding to component "−D/2" that passes from bottom to top along dipole radiator 210-4.

As shown by the dotted arrow in the middle of shared box dipole radiating element 200, the currents induced along dipole radiators 210-1 and 210-2 in response to the signal "A" input at input port 162 of four-port combiner 160-1 will radiate from dipole radiators 210-1, 210-2 at a slant +45° polarization to generate an antenna beam having a +45° polarization. As shown by the solid arrow in the middle of shared box dipole radiating element 200, the currents induced along dipole radiators 210-1 and 210-2 in response to the signal "B" input at input port 164 of four-port combiner 160-1 will radiate from dipole radiators 210-1, 210-2 at a slant −45° polarization to generate an antenna beam having a −45° polarization.

Signals input from four-port combiner 160-6 to the shared box dipole radiating element 200 act in a similar fashion. In particular, as shown by the dotted arrow in the middle of shared box dipole radiating element 200, the currents induced along dipole radiators 210-3 and 210-4 in response to the signal "C" input at input port 162 of four-port combiner 160-6 will radiate from dipole radiators 210-3, 210-4 at a slant +45° polarization to generate an antenna beam having a +45° polarization. As shown by the solid arrow in the middle of shared box dipole radiating element 200, the currents induced along dipole radiators 210-3 and 210-4 in response to the signal "D" input at input port 164 of four-port combiner 160-6 will radiate from dipole radiators 210-3, 210-4 at a slant −45° polarization to generate an antenna beam having a −45° polarization.

Thus, as shown in FIG. 4B, in response to RF signals "A" or "B" input to four-port combiner 160-1, the first and second dipole radiators 210-1, 210-2 generate a first slant +45° polarization antenna beam and a second slant −45° polarization antenna beam, while in response to RF signals "C" or "D" input to four-port combiner 160-6, the third and fourth dipole radiators 210-3, 210-4 generate a third slant +45° polarization antenna beam and a fourth slant −45° polarization antenna beam. The first and second RF signals are isolated from one another based on the isolation provided by the four-port combiner 160-1, and the third and fourth RF signals are likewise isolated from one another based on the isolation provided by the four-port combiner 160-6. The first and second antenna beams are isolated from the third and fourth antenna beams by the spatial separation between the dipole radiators 210. Thus, the above description shows how a single box dipole radiating element 200 may be configured so that four different RF ports may "share" this one radiating element. Each of the remaining box dipole elements 130 in base station antenna 100 may be configured in the same fashion to provide a linear array 120 of shared radiating elements 130 that supports four RF ports.

In some embodiments of the present invention, it may be advantageous to feed some of the radiating elements 130 in a linear array differently than other of the radiating elements 130. For example, in FIG. 3B, phase shifter assemblies 152-1 and 152-2 are coupled to dipole radiators 132-1 and 132-2 for each radiating element 130. Pursuant to further embodiments of the present invention, some of the outputs 156 of phase shifter assemblies 152-1 and 152-2 may instead be coupled to dipole radiators 132-3 and 132-4 (and likewise some of the outputs 156 of phase shifter assemblies 152-3 and 152-4 would instead be coupled to dipole radiators 132-1 and 132-2). Such an approach could be taken, for example, with respect to every other radiating element 130 in a linear array 120.

Since the amount of isolation between the first and second antenna beams, on the one hand, and the third and fourth antenna beams, on the other hand, is a function of the amount of spatial separation between the dipole radiators 210, it will be appreciated that the isolation may be "tuned" by moving the dipole radiators 210 in the shared box dipole radiating element 200 (or the radiators in the other shared radiating elements according to embodiments of the present invention) either closer together or farther apart in the horizontal and/or vertical directions. It will also be appreciated that the dipole radiators 210 do not all have to have the same length in some embodiments.

Figure 5A:
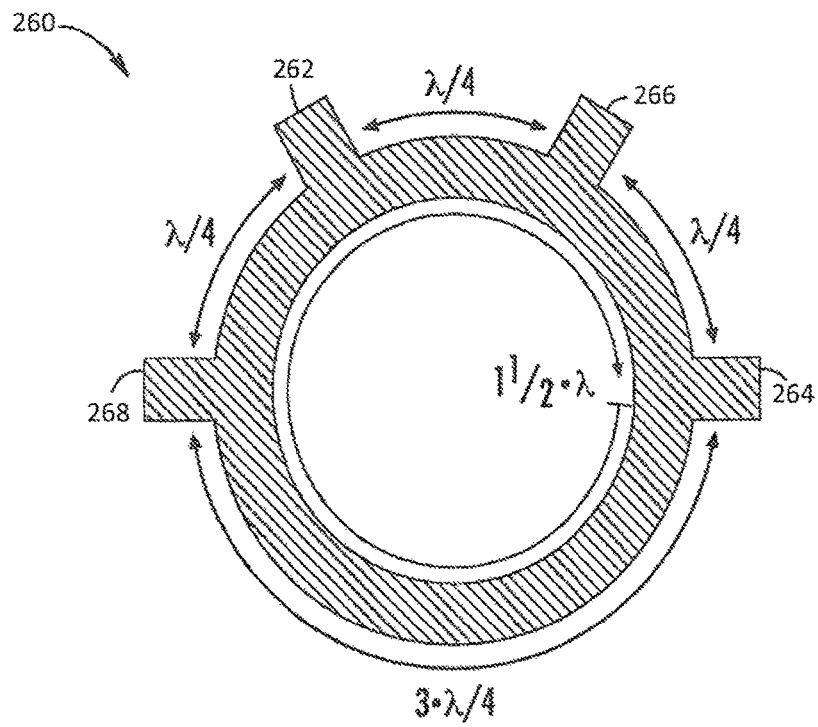
FIG. 5A is a schematic diagram illustrating the circuit design of a rat race coupler that may be used to feed the shared box dipole radiating element of FIG. 4A with four independent RF signals.

As described above, the base station antenna 100 includes two four-port combiners 160 per shared radiating element 130/200. The four-port combiners 160 may comprise four-port hybrid couplers in some embodiments. FIG. 5A is a schematic diagram illustrating the circuit design of a four-port coupler in the form of a rat race coupler that may be used to implement the four-port combiners shown in FIGS. 3B and 4B.

Rat race couplers are a known type of hybrid coupler that may be used to equally split an RF signal applied to a first input port thereof into two equal and in-phase output signals, and to equally split an RF signal applied to a second input port thereof into two equal and out-of-phase output signals. FIG. 5A is a schematic diagram of a rat race coupler 260 that may be used to implement hybrid couplers 160-1 through 160-10 in FIG. 3B. Referring to FIG. 5A, an RF signal input at port 262 will travel in both directions along the rat race coupler 260, and half of the energy of the RF signal will be output at port 266 and the other half of the energy of the RF signal will be output at port 268. As a result of superposition of signals from different directions arriving at ports 266 and 268, the RF signals output at ports 266 and 268 will be in-phase with each other. Portions of the RF signal input at port 262 that arrive at port 264 from both directions would cancel each other and port 264 therefore is electrically isolated from port 262. In contrast, an RF signal input at port 264 will travel in both directions along the rat race coupler 260, and half of the energy of the RF signal will be output at port 268 and the other half of the energy of the RF signal will be output at port 266. As a result of superposition of signals from different directions arriving at ports 266 and 268, the RF signals output at ports 266 and 268 will be out-of-phase with each other. Portions of the RF signal input at port 264 arriving at port 262 from both directions would cancel each other and port 262 therefore is electrically isolated from port 264. Thus, the rat race coupler 260 may provide the proper splitting and phasing of the RF signals passed to the shared box dipole radiating element 200 of FIG. 4A-4B so that the shared box dipole radiating element 200 will generate antenna beams having slant +45° and slant −45° polarizations.

Figure 5B:
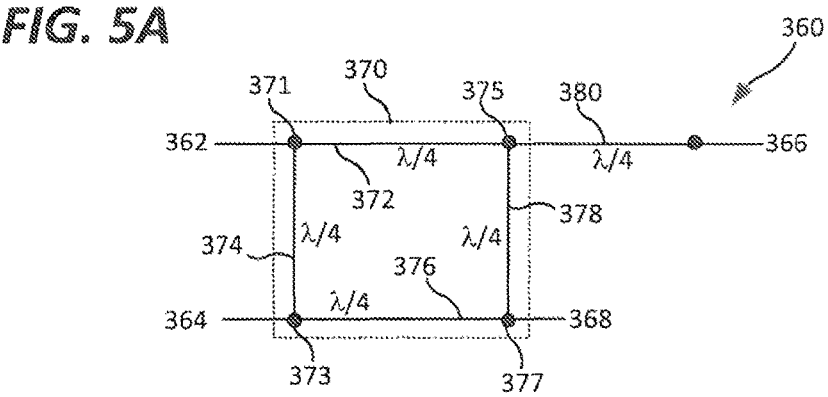
FIG. 5B is a schematic diagram illustrating the circuit design of a modified branch line coupler that may be used to feed the shared box dipole radiating element of FIG. 4A with four independent RF signals.

FIG. 5B is a schematic diagram illustrating the circuit design of another four-port combiner 360 that includes a branch line coupler that may be used to implement the four-port combiners 160. As shown in FIG. 5B, the four-port combiner 360 includes a branch line coupler 370 and an additional quarter-wavelength transmission line segment 380. The branch line coupler 370 includes four quarter-wavelength transmission line segments 372, 374, 376, 378 that are electrically coupled to each other as shown. The four locations 371, 373, 375, 377 where the quarter-wavelength transmission line segments 372, 374, 376, 378 intersect form the four ports of the branch line coupler 370. Ports 371 and 373 of branch line coupler 370 act as the first and second input ports 362, 364 of four-port combiner 360. One end of quarter-wavelength transmission line segment 380 is connected to port 375. The opposite end of quarter-wavelength transmission line segment 380 acts as the first output port 366 of four-port combiner 360, and port 377 of branch line coupler 370 acts as the second output port 368 of four-port combiner 360. The four-port combiner 360 will operate in the exact same manner as rat race coupler 260 with respect to RF signals input at the ports thereof.

Figure 5C:
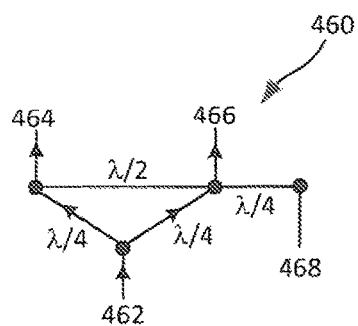
FIG. 5C is a schematic diagram illustrating the circuit design of a Wilkinson-style four-port combiner that may be used to feed the shared box dipole radiating element of FIG. 4A with four independent RF signals.

While FIGS. 5A and 5B illustrate two example ways of implementing the four-port combiners 160 illustrated in FIG. 3B, it will be appreciated that embodiments of the present invention are not limited thereto. For example, in other embodiments, 90° hybrid couplers or other couplers could be used. Likewise, FIG. 5C illustrates a "Wilkinson-style" four-port combiner 460 having input ports 462, 464 and output ports 466, 468 that will also operate in the same manner as rat race coupler 260. A signal input, for example, at port 462 of four-port combiner 460 splits with half the energy passing to port 464 and the other half passing to port 466. Port 468 is isolated from port 462 because the energy passing to port 468 via port 464 is 180° out-of-phase with respect to the energy passing to port 468 via port 466 and hence the signals cancel at port 468. Similar operation will occur with respect to signals input at port 468 so that port 462 is isolated from port 468.

Figure 6A:
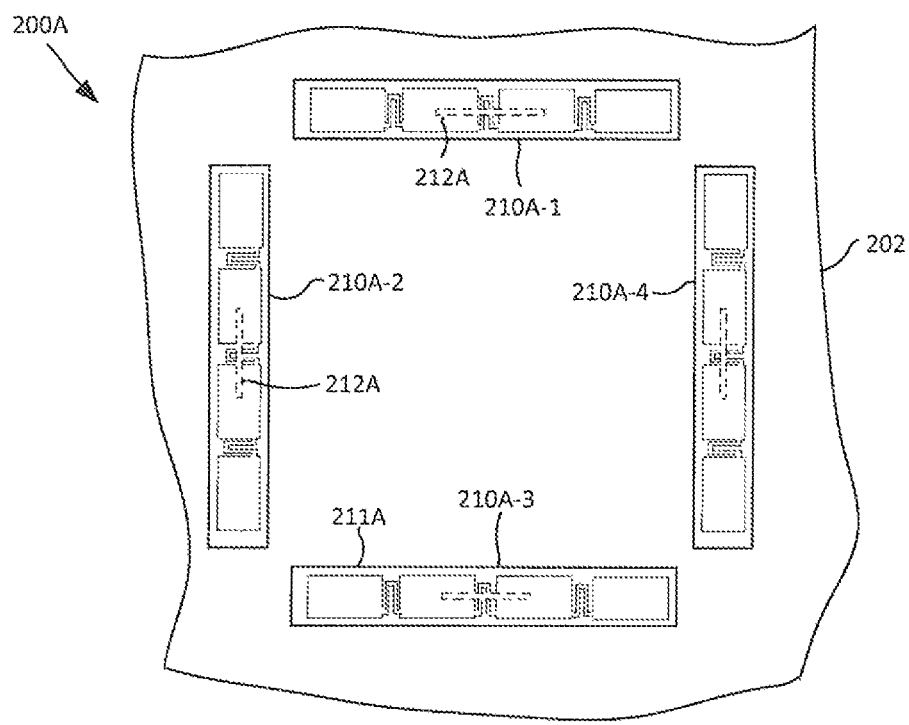
FIGS. 6A-6C are schematic views of additional shared box dipole radiating elements that may be used in the base station antennas according to embodiments of the present invention.
Figure 6B:
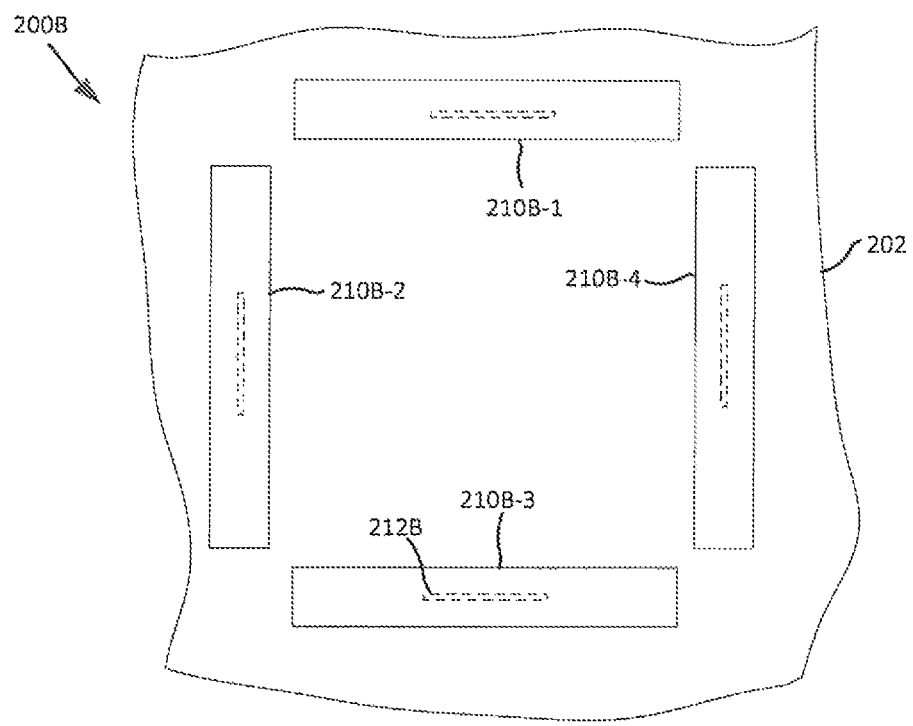
Figure 6C:
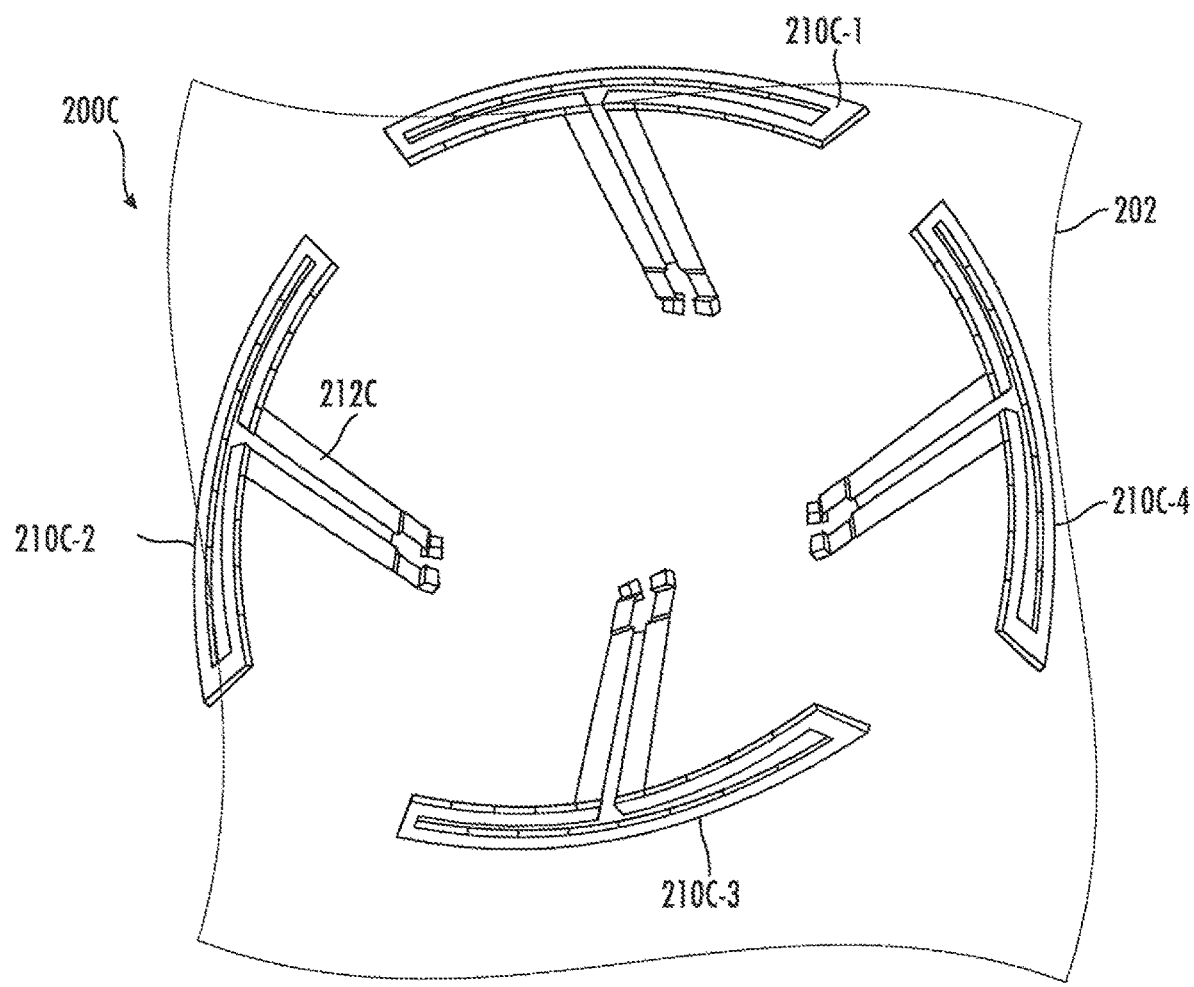

While FIG. 4A illustrates one example of a shared box dipole radiating element that may be used in the base station antennas according to embodiments of the present invention, it will be appreciated that a wide variety of different box elements may be used. FIGS. 6A-6C are various views of additional shared box dipole radiating elements that may be used in base station antennas according to embodiments of the present invention.

For example, FIG. 6A illustrates a box dipole radiating element 200A that may be used in place of the box dipole radiating element 200 as the shared radiating elements included in base station antennas according to embodiments of the present invention. As shown in FIG. 6A, the box dipole radiating element 200A has four dipole radiators 210A that are formed on printed circuit boards 211A and feed stalks 212A (the feed stalks 212A may also be implemented as printed circuit boards and are shown using dotted lines in FIG. 6A as they are hidden by the dipole radiators 210A) that are used to pass RF signals between the dipole radiators 210A and a feed network (not shown). The feed stalks 212A may be used to mount the printed circuit boards 211A so that they extend forwardly of a reflector 202 of a base station antenna and so that the printed circuit boards 211A are generally coplanar with the reflector 202.

FIG. 6B illustrates a box dipole radiating element 200B that may alternatively be used as the shared radiating elements in base station antennas according to embodiments of the present invention. As shown in FIG. 6B, the box dipole radiating element 200B has four dipole radiators 210B which are mounted forwardly of a reflector 202 of a base station antenna by respective feed stalks 212B. The dipole radiators 210B may be formed of sheet metal like the dipole radiators 210 of FIG. 4A or may be formed on a printed circuit board like the dipole radiators 210A of FIG. 6A. The primary difference between the box dipole radiating element 200B and the above described box dipole radiating elements 200, 200A is that the dipole radiators 210B are not implemented as cloaked dipole radiators that include widened conductive segments that are separated by narrowed trace segments. The box dipole radiating element 200B may provide a cheaper radiating element option in, for example, base station antennas that do not include linear arrays operating in other frequency bands.

FIG. 6C schematically illustrates a box dipole radiating element 200C that may alternatively be used as the shared radiating elements in base station antennas according to embodiments of the present invention. As shown in FIG. 6C, the box dipole radiating element 200C has four dipole radiators 210C-1 through 210C-4 which are mounted by feed stalks (not shown) forwardly of a reflector 202. As can be seen, the dipole radiators 210C are formed as center-fed folded dipole radiators.

Figure 7A:
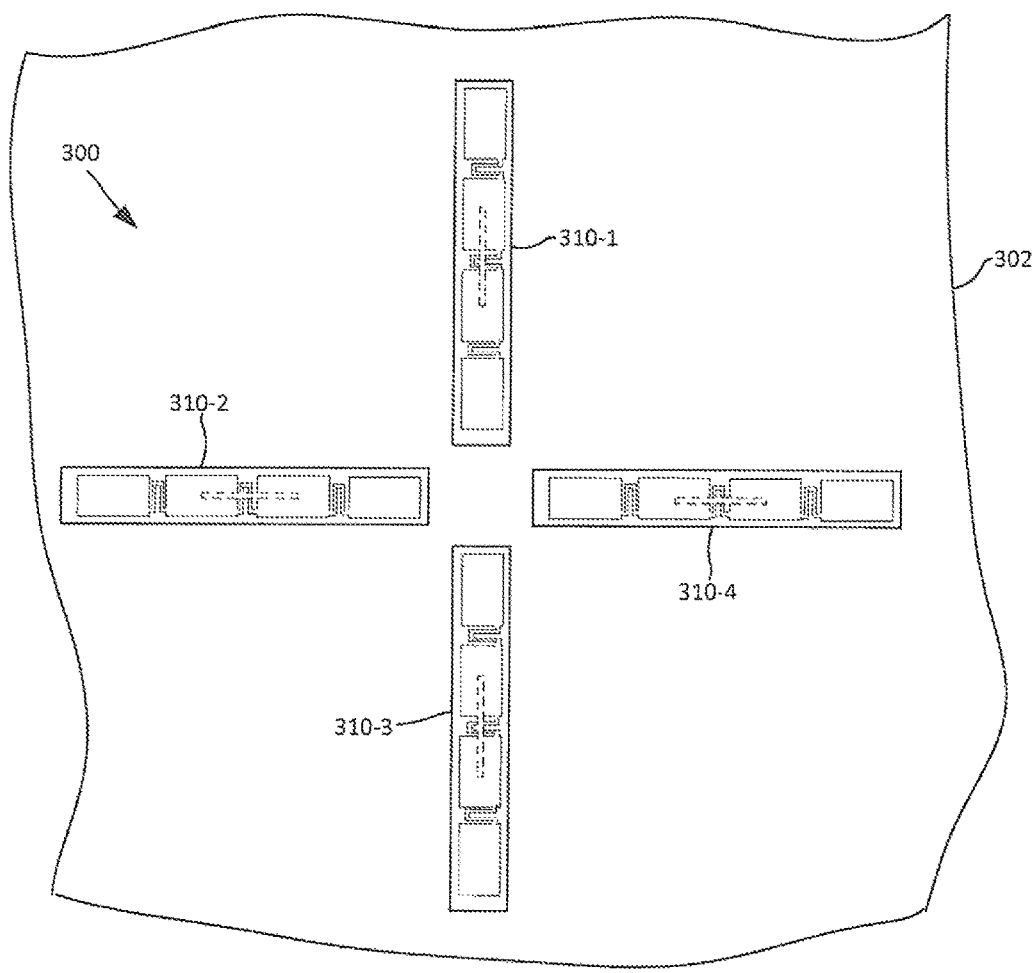
FIGS. 7A-7C are various views of other shared radiating elements that may be used in the base station antennas according to embodiments of the present invention.
Figure 7B:
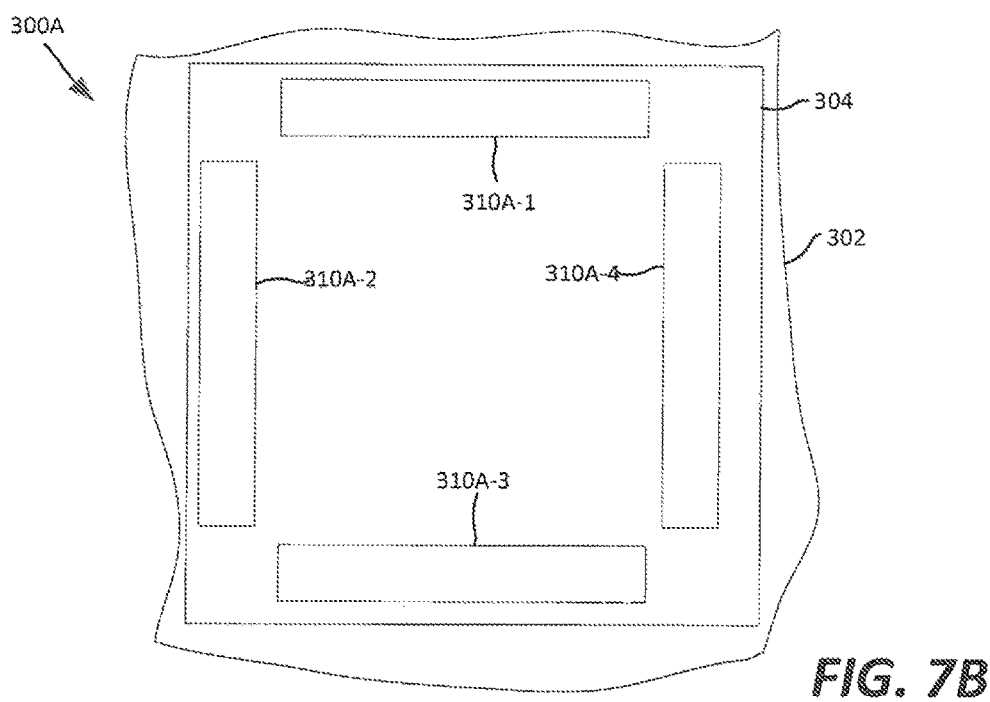
Figure 7C:
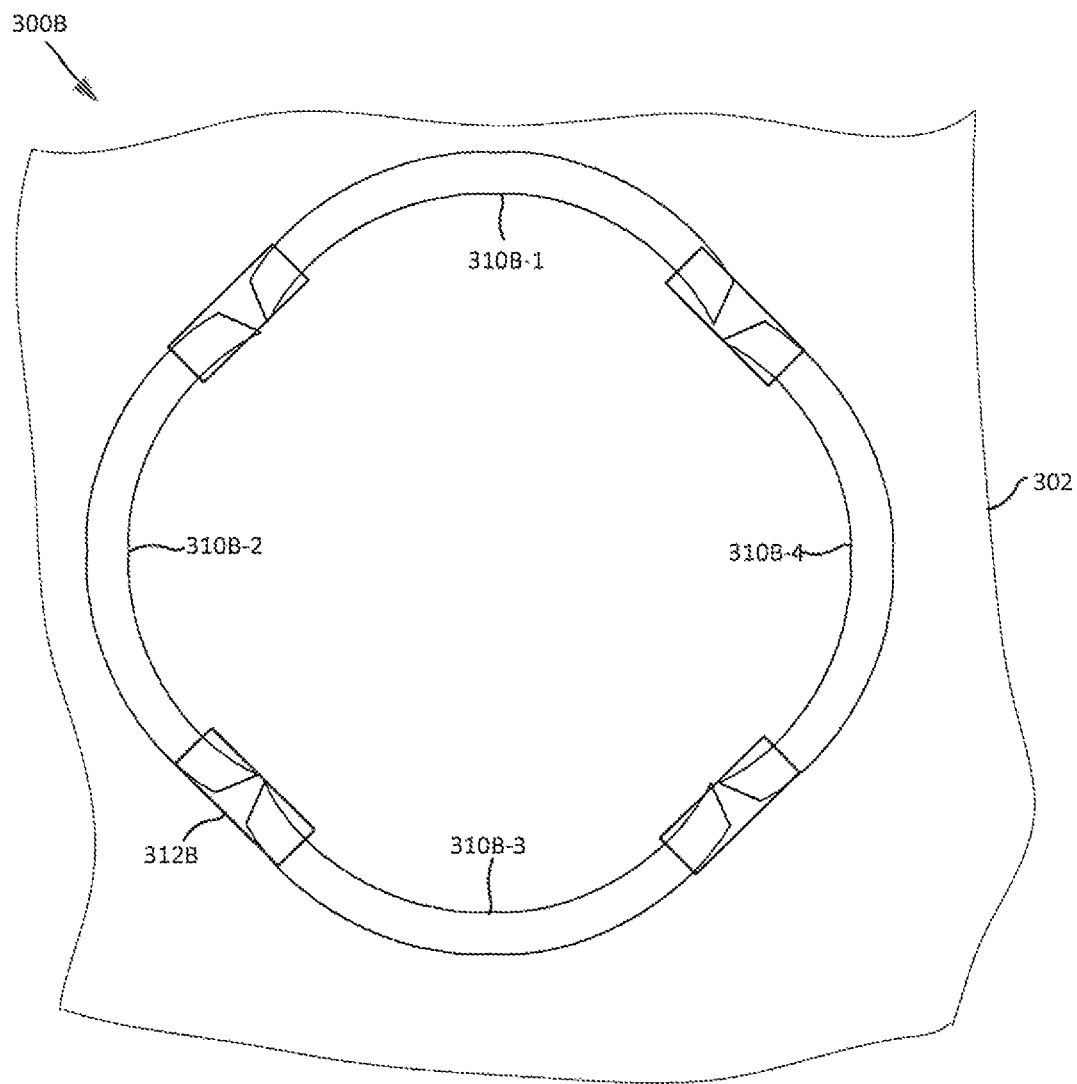

It will also be appreciated that the shared radiating elements that are used in the base station antennas according to embodiments of the present invention do not have to be box dipole radiating elements. FIGS. 7A-7C are various views of other shared radiating elements that may be used in base station antennas according to embodiments of the present invention.

Referring first to FIG. 7A, a shared radiating element 300 is depicted that includes four dipole radiators 310-1 through 310-4 that are mounted on feed stalks 312 to extend forwardly from a reflector 302 of a base station antenna. As shown in FIG. 7A, each dipole radiator 310 has the same design as the dipole radiators 210A of the box radiating element 200A of FIG. 6A. It will be appreciated that any appropriate dipole radiator design may be used, including the other dipole radiator designs shown in FIGS. 4A and 6B-6C. In FIG. 7A, the dipole radiators 310 are no longer disposed to form a box, but instead are arranged in the shape of a cross. As will be understood by those of skill in the art, if the RF signals input to the dipole radiators 310 are phased appropriately, the radiating element 310 may be designed to form the same four antenna beams as the box dipole radiating element 200 discussed above. The radiating element 300 may be fed by a pair of four-port combiners in the same general fashion as box dipole radiating element 200. FIG. 7A illustrates that the shared radiating elements need not be box radiating elements, but may be any radiating element that may be fed so as to generate four independent antenna beams.

FIG. 7B is a schematic front view of a box radiating element 300A that is formed using slot radiators rather than dipole radiators. As shown in FIG. 7B, the box radiating element 300A may comprise a printed circuit board 304 that is mounted on a front surface of a reflector 302. Slot radiators 310A are formed in the printed circuit board 304. The slot radiators 310A may be arranged to form a box. The box radiating element 300A illustrates that radiators other than dipole radiators may be used in the shared radiating elements used in the base station antennas according to embodiments of the present invention.

FIG. 7C is a schematic front view of a loop radiating element 300B that may be used to implement an array of shared radiating elements. Loop radiating elements are another known type of radiating element that have dipole (or other) radiators arranged generally in a square of a loop. The radiators, however, are typically fed at the corners as opposed to being center-fed as in the case of, for example, the shared box radiating element 200 described above. As shown in FIG. 7B, the loop radiator includes four dipoles 310B-1 through 310B-4 that are mounted forwardly of a reflector 302 by four feed stalks 312B. Each feed stalk may include RF transmission lines that are used to feed the four dipoles 310B. Thus, it will be appreciated that loop radiators may also be used as the shared radiating elements in the base station antennas according to embodiments of the present invention.

Base station antenna 100 of FIGS. 3A-3B is one example embodiment of a base station antenna according to embodiments of the present invention. The use of shared radiating elements to reduce the width of a base station antenna and/or to increase the capabilities thereof has broad applicability to a wide range of different types and implementations of base station antennas, and thus it will be appreciated that the present invention is not limited to the example embodiment illustrated in FIGS. 3A-3B. Examples of other types and styles of base station antennas that can benefit by using the linear arrays of shared radiating elements according to embodiments of the present invention will now be discussed with reference to FIGS. 8A-12. It will be appreciated, however, that these figures simply illustrate additional example implementations, and are not to be construed as limiting as to the scope of the present invention.

Figure 8A:
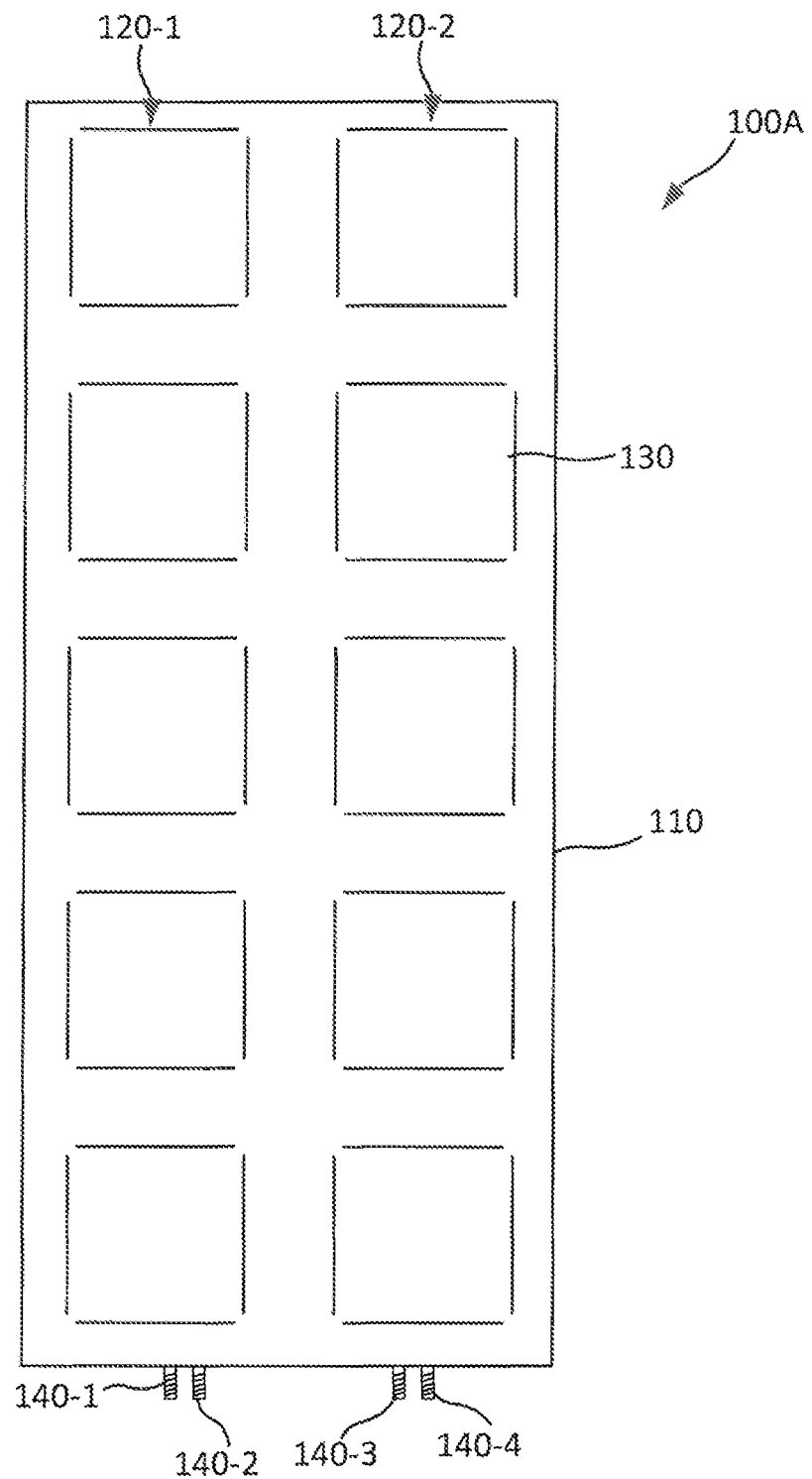
FIG. 8A is a schematic front view of a base station antenna according to embodiments of the present invention that is suitable for use in a four-sector base station.

FIG. 8A is a schematic front view of a base station antenna 100A that includes two linear arrays of shared radiating elements that are suitable for use in four-sector base station arrangements. As shown in FIG. 8A, the base station antenna 100A includes first and second linear arrays 120-1, 120-2 of shared box dipole radiating elements 130 that are mounted to extend forwardly from a reflector 110. Each linear array 120-1, 120-2 may be identical to the linear array 120 discussed above with reference to FIGS. 3A and 3B, and hence further description thereof will be omitted here. The antenna 100A further includes four RF ports 140-1 through 140-4. The antenna may be configured to generate a total of four antenna beams that have narrowed azimuth HPBWs such as, for example, azimuth HPBW values of about 45°. In a conventional antenna, normally a total of four linear arrays of radiating elements would be required to form four such antenna beams having narrowed azimuth beamwidths or, alternatively, RF lenses would be required.

Figure 8B:
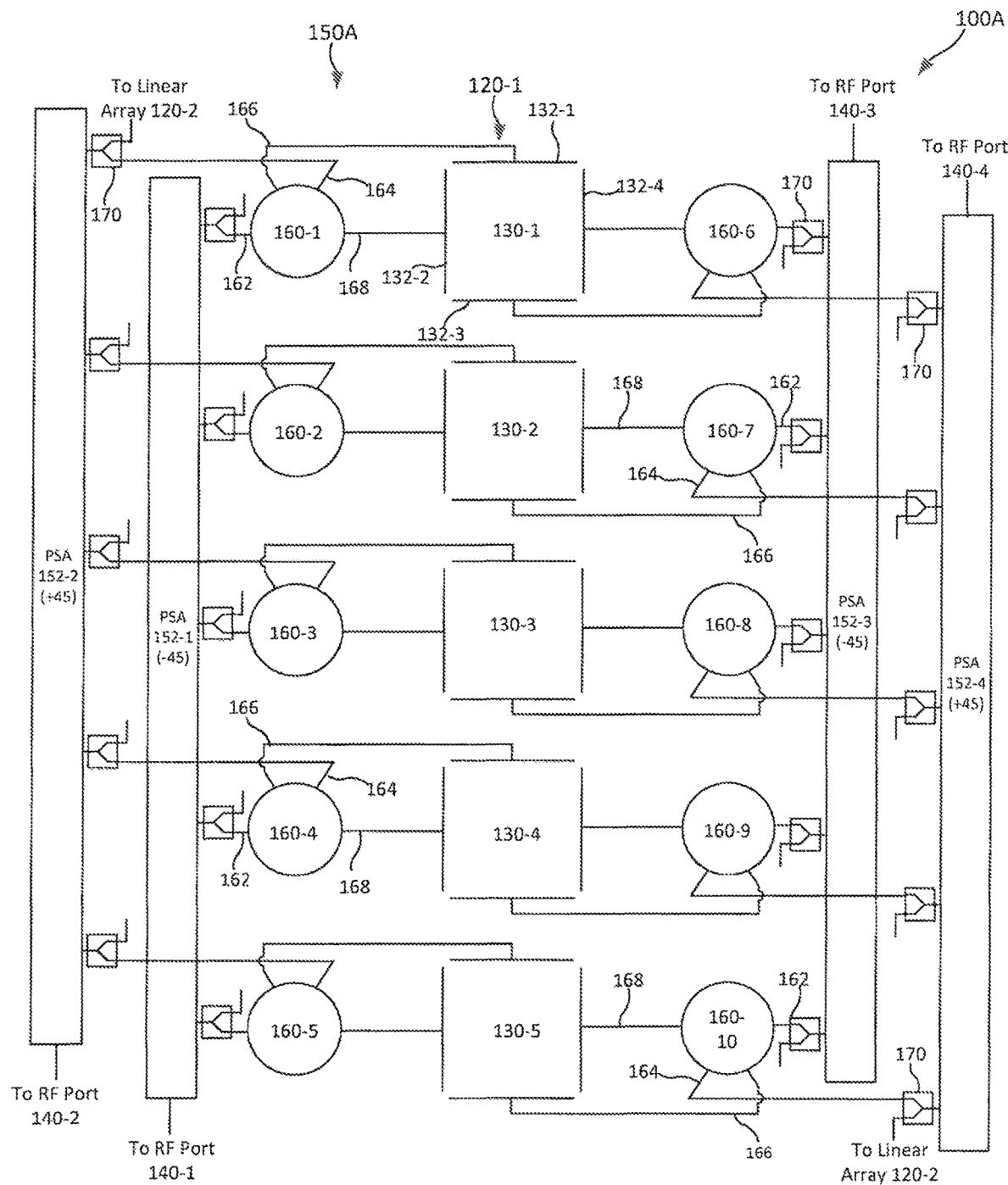
FIGS. 8B and 8C are schematic diagrams illustrating two possible feed networks for the base station antenna of FIG. 8A.

Various options exist for configuring the feed network of base station antenna 100A that is used to feed RF signals between the RF ports 140 and the linear arrays 120. FIG. 8B, which is similar to FIG. 3B, shows a portion of a feed network 150A that illustrates one such option. As shown in FIG. 8B, a 1×2 power splitter/combiner 170 is coupled between each output 156 of the four phase shifter assemblies 152 and the respective input ports 162, 164 of the four-port combiners 160. Each 1×2 power splitter/combiner 170 may, when operating in transmit mode, split the RF signals that are input thereto from the phase shifter assemblies 152 into two sub-components, each of which may have, for example, about 50% of the power of the RF signal input thereto. The first sub-component that is output by each 1×2 power splitter/combiner 170 is then input to a respective input 162, 164 of one of the ten four-port combiners 160 associated with the first linear array 120-1. The second sub-component that is output by each 1×2 power splitter/combiner 170 is input to a respective input of one of the ten four-port combiners 160 associated with the second linear array 120-2. The second linear array 120-2 and the ten four-port combiners 160 associated therewith are not depicted in FIG. 8B to simplify the drawing, but may be configured identically to the first linear array 120-1 and its associated four-port combiners that are shown in FIG. 8B.

The base station antenna 100A of FIGS. 8A-8B will generate antenna beams having narrowed azimuth beamwidths as the RF signals are transmitted through two linear arrays 120-1, 120-2 of shared radiating elements 130 as opposed to a single linear array, and hence the horizontal aperture of the array is increased. The azimuth beamwidth may be adjusted by, for example, varying the horizontal distance between the first and second linear arrays 120-1, 120-2 or by varying the split of the power between the two arrays (e.g., by using 1×2 power splitter/combiners 170 that unequally split the power).

Figure 8C:
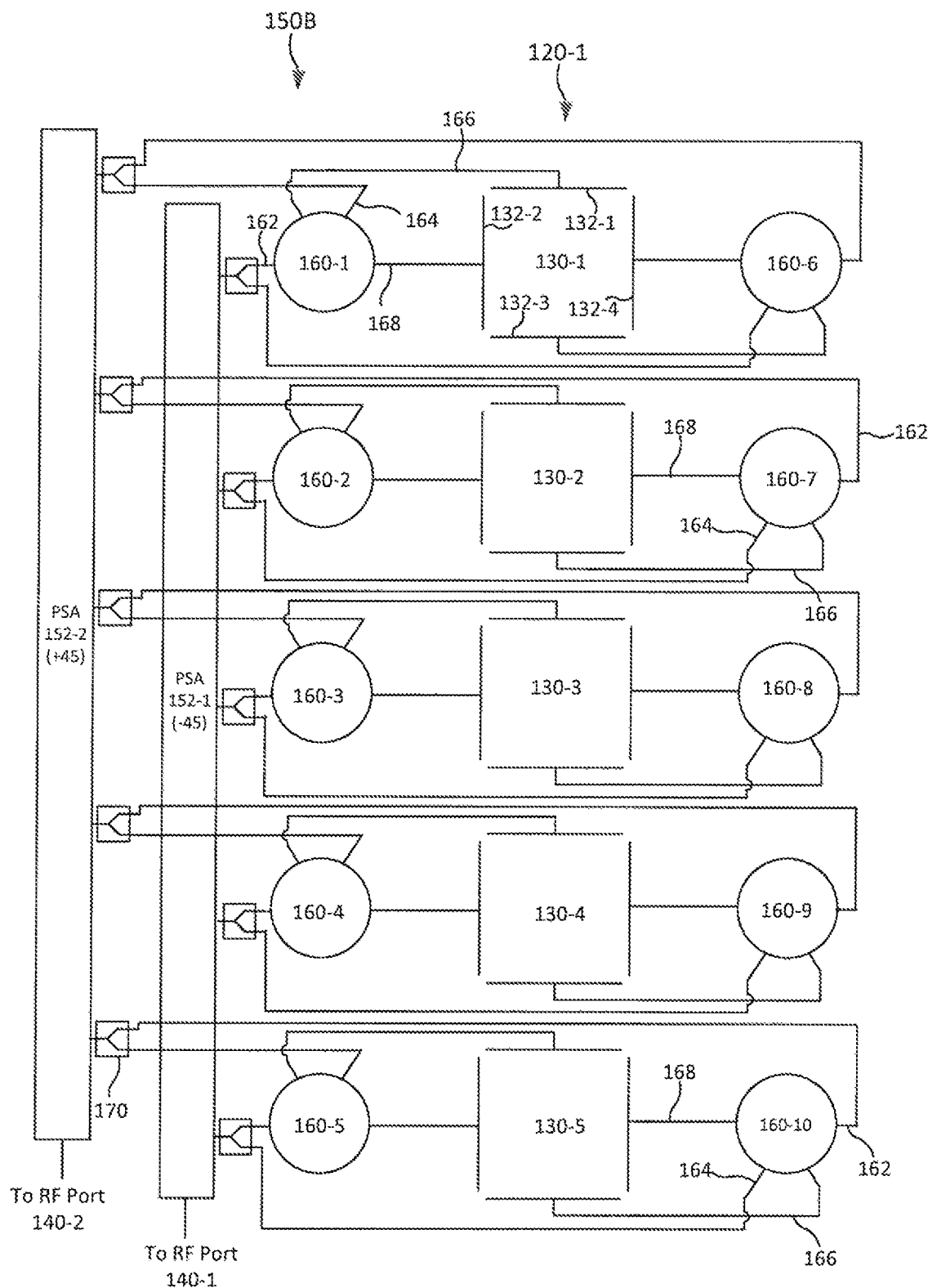

While FIG. 8B illustrates one possible feed network 150A for the base station antenna 100A of FIG. 8A, it will be appreciated that other feed configurations are possible. For example, as shown in FIG. 8C, in other embodiments, the four dipole radiators 132 of each shared radiating element 130 may be fed by the two outputs of each 1×2 power splitter/combiner 170 so that each linear array 120-1, 120-2 forms a pair of antenna beams having narrowed azimuth beamwidths. This is possible because the phase center for dipole radiators 132-1, 132-2 will be offset in the horizontal direction from the phase center for dipole radiators 132-3, 132-4, and hence each shared radiating element 130 may appear as two horizontally spaced-apart radiating elements. This horizontal spacing results in an increase in the horizontal aperture of the array (as compared, for example, to a conventional cross-dipole radiating element) and hence narrows the azimuth beamwidth. The extent to which the azimuth beamwidth is narrowed depends on, among other things, the horizontal distance between the above-discussed phase centers for the two pairs of dipole radiators 132, which in turn is a function of the relative placement of the four dipole radiators 132 with respect to each other. While the feed network 150B illustrated in FIG. 8C will only generate two antenna beams having narrowed (e.g., 45°) azimuth HPBWs, it will be appreciated that the structure could be replicated to provide an antenna that generates four antenna beams having narrowed azimuth HPBWs.

Figure 9:
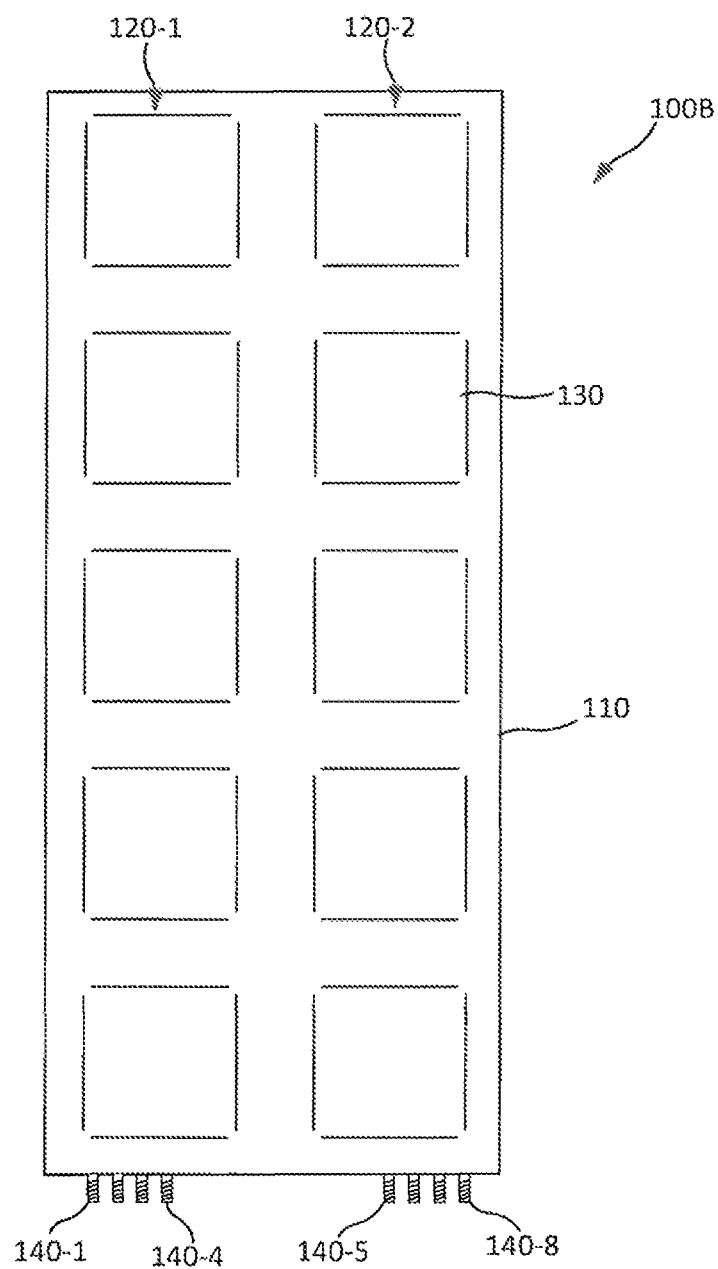
FIG. 9 is a schematic front view of a base station antenna according to embodiments of the present invention that can be used in place of a conventional base station antenna having four linear arrays of radiating elements.

FIG. 9 is a schematic front view of a base station antenna 100B according to further embodiments of the present invention that includes two linear arrays 120-1, 120-2 of shared radiating elements that can be used in place of four conventional linear arrays of radiating elements. The base station antenna 100B may be identical to the base station antenna 100 of FIGS. 3A-3B, except a second linear array 120-2 and a second feed network 150-2 are added so that the base station antenna will support an additional four RF ports (ports 140-5 through 140-8). Thus, while the base station antenna 100 of FIGS. 3A-3B generates four independent 65° azimuth HPBW antenna beams, the base station antenna 100B of FIG. 9 can generate eight independent 65° azimuth HPBW antenna beams. The base station antenna 100B may, therefore, support eight transmit/eight receive ("8T/8R") MIMO operations or may support 4T/4R MIMO operations in two separate frequency bands (e.g., in the 700 MHz and 800 MHz frequency bands) without any need for diplexers.

The base station antenna 100B of FIG. 9 may also be used as a beamforming antenna pursuant to further embodiments of the present invention. A beamforming antenna refers to an antenna that has multiple columns of radiating elements that are each fed by a respective one of a plurality of ports of a radio. The radio may modulate an RF signal and then send it to transceivers for each output port. The amplitude and phase of the RF signal for each port may be set by the radio so that the columns of radiating elements work together to form a more focused, higher gain antenna beam that has a narrowed beamwidth in the azimuth plane. In other cases the antenna may be arranged so that there are multiple input ports for sub-arrays in the elevation direction as well as azimuth direction so that the antenna beam may be narrowed in both the azimuth and elevation planes, although for ease of explanation the description below will focus on a beamforming antenna in which each radio port is coupled to a "column" of radiating elements.

As explained above, the base station antenna 100B of FIG. 9 includes two linear arrays (columns) 120-1, 120-2 of shared radiating elements 130 that may be used to support eight RF ports. Antennas having the design of antenna 100B thus could alternatively be used as eight-port beamforming antennas, although the horizontal spacing between the two linear arrays 120, 120-2, perhaps as well as the spacing between the dipole radiators 132 in each shared radiating element 130 may be reduced, as beamforming antennas typically perform better with increased correlation between the columns which may be achieved by tighter physical spacing. Thus, it will be appreciated that narrow width beamforming antennas may be provided pursuant to embodiments of the present invention by using the linear arrays of shared radiating elements disclosed herein.

One current challenge for base station antenna manufactures is providing base station antennas that support four low-band RF ports (e.g., ports that transmit in some portion of the 617-960 MHz frequency band) and eight high-band RF ports (e.g., ports that transmit in some portion of the 1696-2690 MHz frequency band) in a base station antenna having a standard width (e.g., 430 mm). These antennas are often referred to as "two-low, four-high" antennas, as the conventional implementations of these antennas include two linear arrays of low-band radiating elements and four linear arrays of high-band radiating elements. Due to the physical size of the low-band arrays, and the need to provide four high-band linear arrays, it is difficult to fabricate such antennas with widths under 500 mm. However, using the techniques of the present invention, narrower width two-low, four-high band antennas may be provided since the use of linear arrays of shared radiating elements may reduce the total number of linear arrays required in the antenna.

Figure 10A:
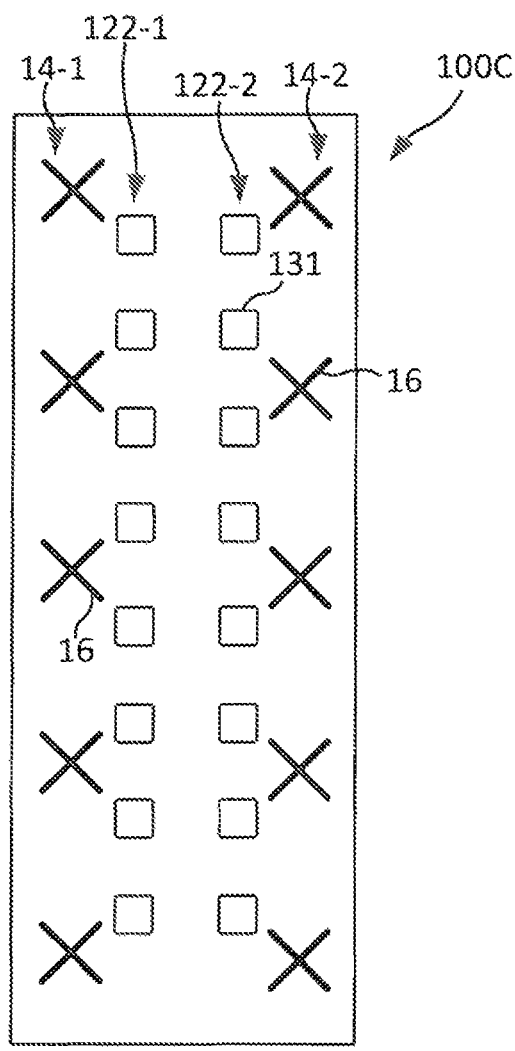
FIG. 10A is a schematic front view of a base station antenna according to embodiments of the present invention that includes two arrays of conventional low-band radiating elements and two arrays of shared high-band radiating elements.

For example, reference is first made to FIG. 10A, which is a schematic front view of a base station antenna 100C according to further embodiments of the present invention. As shown in FIG. 10A, the base station antenna 100C includes two linear arrays 14-1, 14-2 of conventional dual-polarized cross-dipole low-band radiating elements 16 and two linear arrays 122-1, 122-2 of shared high-band radiating elements 131. Each linear array 122-1, 122-2 may be identical to the linear array 120 discussed above with reference to FIGS. 3A-3B, except that the low-band radiating elements 130 included in linear array 120 are replaced with smaller high-band radiating elements 131 in the linear arrays 122-1, 122-2, where the dipole radiators of radiating elements 131 are sized for operation in the 1696-2690 MHz frequency band or a portion thereof. While not shown in FIG. 10A to simplify the drawing, the base station antenna 100C may include a total of twelve RF ports 140, namely four low-band RF ports and eight high-band RF ports. Since the base station antenna 100C only includes four columns of radiating elements as compared to the six columns of radiating elements included in conventional two-low, four-high base station antennas, base station antenna 100C may have a reduced width.

Figure 10B:
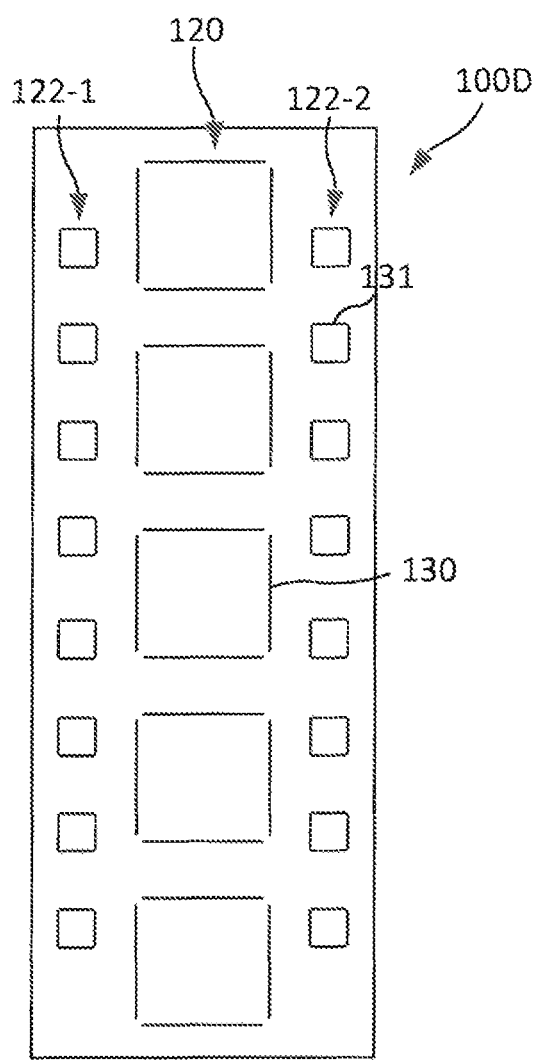
FIG. 10B is a schematic front view of a base station antenna according to embodiments of the present invention that includes one array of shared low-band radiating elements and two arrays of shared high-band radiating elements.

FIG. 10B is a schematic front view of a two-low, four-high base station antenna 100D according to still further embodiments of the present invention that may have an even further reduced width. As shown in FIG. 10B, the base station antenna 100D is similar to base station antenna 100C, except that the two conventional low-band linear arrays 14-1, 14-2 included in base station antenna 100C are replaced with a single linear array 120 of shared low-band radiating elements 130 in base station antenna 100D. The linear array 120 of shared low-band radiating elements 130 is positioned between the two linear arrays 122-1, 122-2 of shared high-band radiating elements 131 in order to further reduce the width of the antenna.

It will also be appreciated that the linear arrays of shared radiating elements that are disclosed herein can be used in so-called "sector-splitting" antennas that sub-divide a 120° degree sector in the azimuth plane into (typically) two 60° sub-sectors. These antennas generate narrower antenna beams that provide coverage for each sub-sector. While sectors may be split into more than two sub-sectors, for ease of explanation the description below will focus on sector splitting antennas that divide a 120° degree sector in the azimuth plane into two 60° sub-sectors.

Sector-splitting antennas are typically implemented using one of two approaches. In the first approach, a base station antenna is provided that includes two linear arrays, where the first linear array has an azimuth boresight pointing direction that is pointed at the center of the first sub-sector, and the second linear array has an azimuth boresight pointing direction that is pointed at the center of the second sub-sector. Each linear array may have, for example, as azimuth HPBW of about 65°. One or more RF lenses are placed in front of the first and second linear arrays that narrow the azimuth HPBW of the antenna beams from 65° to about 33° so that a high gain, narrow beamwidth antenna beams are generated that provide coverage to each sub-sector. In the second approach, a base station antenna is again provided that includes two linear arrays, where both linear arrays have an azimuth boresight pointing direction that is pointed at the center of the sector. A Butler Matrix is included in the feed network of the antenna, and the RF ports for both sub-sectors are coupled to both linear arrays through the Butler Matrix in a manner that is well understood by those of ordinary skill in the art. The antenna will generate two antenna beams (at each supported polarization), where the first antenna beam points to the left of the azimuth boresight pointing direction of the antenna toward the center of the first sub-sector, and the second antenna beam points to the right of the azimuth boresight pointing direction of the antenna toward the center of the second sub-sector.

Figure 11A:
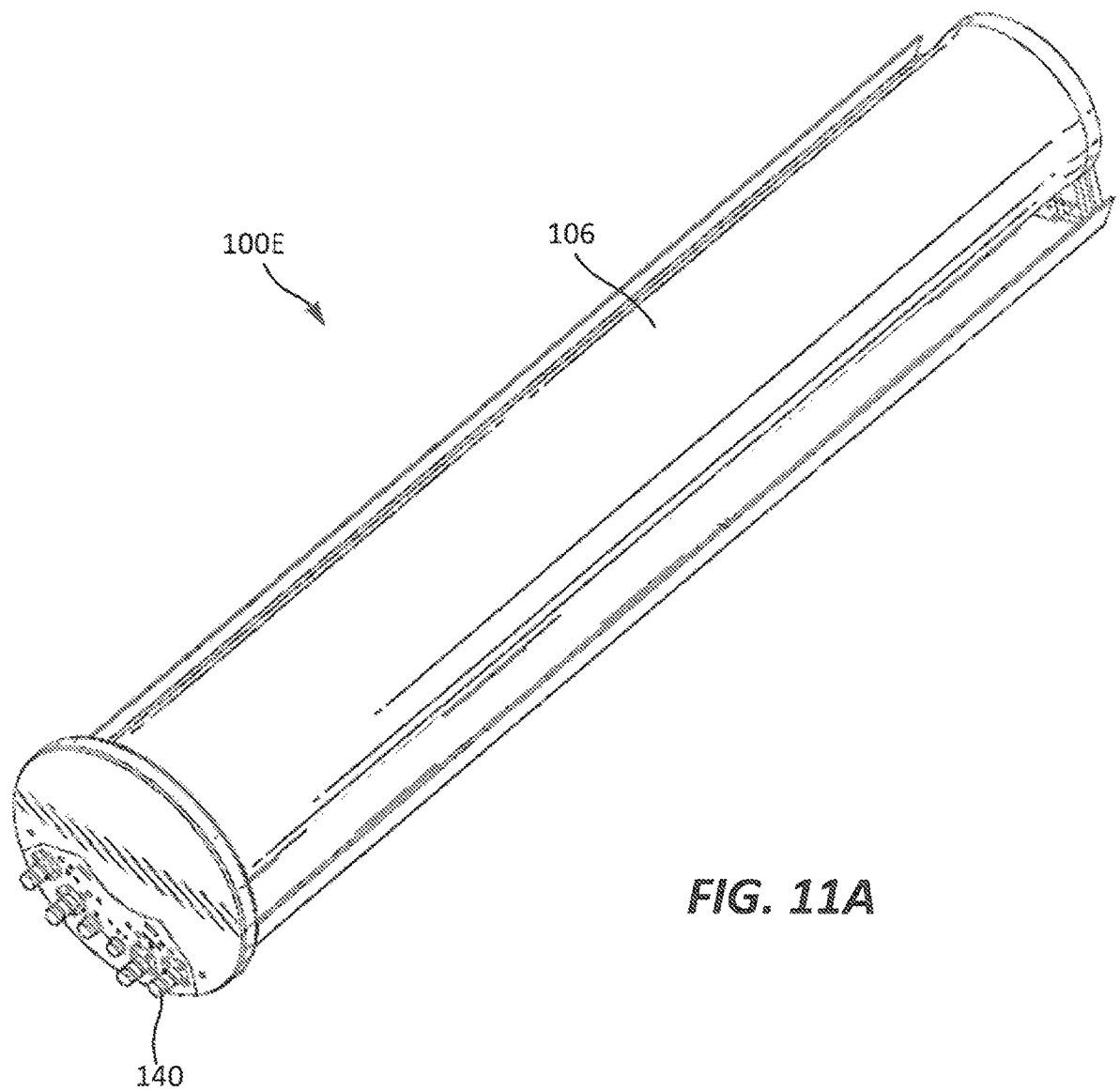
FIGS. 11A and 11B are perspective views of a lensed multibeam antenna according to embodiments of the present invention that includes two arrays of shared radiating elements.
Figure 11B:
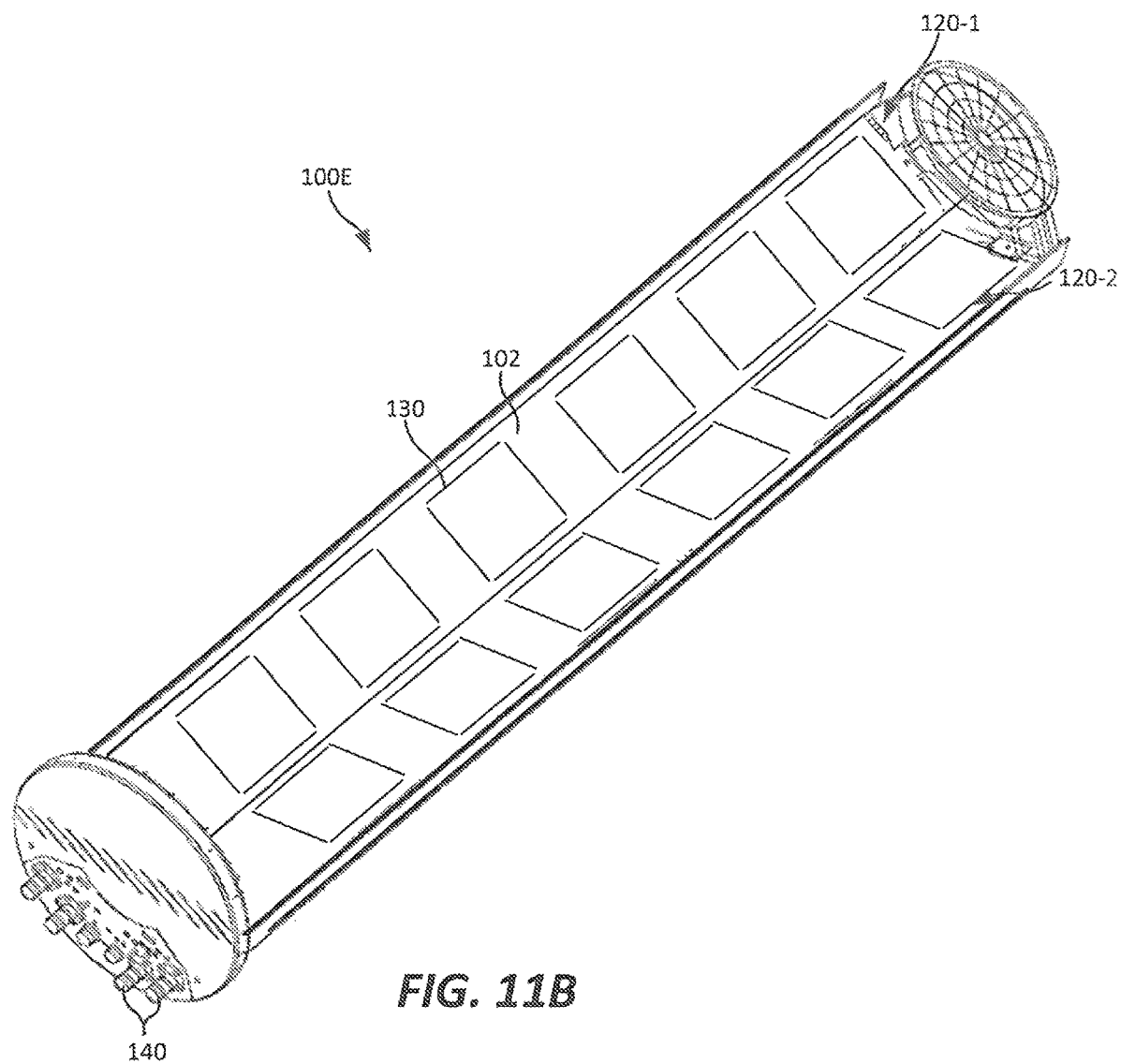

As discussed in detail above, the linear arrays of shared radiating elements according to embodiments of the present invention may have reduced azimuth beamwidths. As such, the linear arrays of shared radiating elements may be used in lensed base station antennas for sector-splitting applications in conjunction with smaller RF lenses that provide less focusing of the antenna beams. For example, as discussed above with reference to FIGS. 8A and 8C, in some embodiments of the present invention, a total of two RF ports may be coupled to a linear array of shared radiating elements according to embodiments of the present invention in order to produce a pair of antenna beams that have reduced azimuth beamwidths (e.g., a 45° azimuth HPBW). Two such linear arrays of shared radiating elements may be included in a lensed base station antenna, with each linear array having an azimuth boresight pointing direction that is pointed at the center of a respective sub-sector. FIGS. 11A and 11B are schematic perspective views of a lensed sector-splitting multibeam antenna 100E according to embodiments of the present invention that includes two linear arrays of shared radiating elements. FIG. 11A pictures the antenna 100E with the radome thereof removed but the lens 106 of the antenna in place, while FIG. 11B pictures the antenna 100E with both the radome and the lens 106 removed to illustrate the two linear arrays 120 of shared radiating elements 130. Since the linear arrays 120-1, 120-2 may have azimuth beamwidths that are less than 65° (e.g., 45° or 50°), a smaller RF lens 106 may be used to provide the additional narrowing of the azimuth beamwidth necessary for sector-splitting.

It will also be appreciated that each linear array 120-1, 120-2 may be replaced with a pair of linear arrays in the manner discussed above with reference to FIGS. 8A and 8B. This approach may provide a greater reduction in the azimuth beamwidth allowing for use of a smaller RF lens 106. When this approach is used, the base station antenna would include a total of four linear arrays (two per sub-sector) and hence could support 4T/4R MIMO in each sub-sector.

It will also be appreciated that the linear arrays 120 of shared radiating elements 130 that are discussed above may also be used in sector splitting base station antennas that are implemented using a Butler Matrix. In particular, as described above with reference to FIGS. 3A-4B, dipole radiators 210-1, 210-2 of each radiating element 200 in a linear array 120 of shared radiating elements 200 may generate a first pair of antenna beams at two orthogonal polarizations and hence may effectively act as a first conventional linear array, and dipole radiators 210-3, 210-4 of each radiating element 200 in the linear array 120 of shared radiating elements 200 may generate a second pair of antenna beams at two orthogonal polarizations and hence may effectively act as a second conventional linear array. As such, a single array 120 of shared radiating elements may be fed by any conventional Butler Matrix feed network to provide a sector-splitting antenna.

FIG. 12 is a schematic diagram of a base station antenna 100F according to still further embodiments of the present invention. As can be seen from FIG. 12, the base station antenna 100F is similar to the base station antenna 100 discussed above with reference to FIGS. 3A-3B, except that in base station antenna 100F some of the radiating elements 130 included in the linear array 120F of radiating elements 130 are staggered in the horizontal direction with respect to other of the radiating elements 130. Staggering some of the radiating elements 130 in the horizontal direction may increase the horizontal aperture of the linear array 120F and/or may help improve the stability of the azimuth beamwidth as a function of frequency, as discussed in more detail in U.S. Provisional Patent Application Ser. No. 62/722,238, filed Aug. 24, 2018, the entire content of which is incorporated herein by reference. It will be appreciated that any of the linear arrays discussed herein may be implemented as such a "staggered" linear array of shared radiating elements.

FIGS. 13A-13K are schematic block diagrams illustrating base station antennas according to embodiments of the present invention that provide additional examples as to how arrays of shared radiating elements may be configured. These figures are provided to illustrate how the configurations of the antennas according to embodiments of the present invention may be changed while still obtaining the numerous advantages provided by the use of shared radiating elements.

Figure 13A:
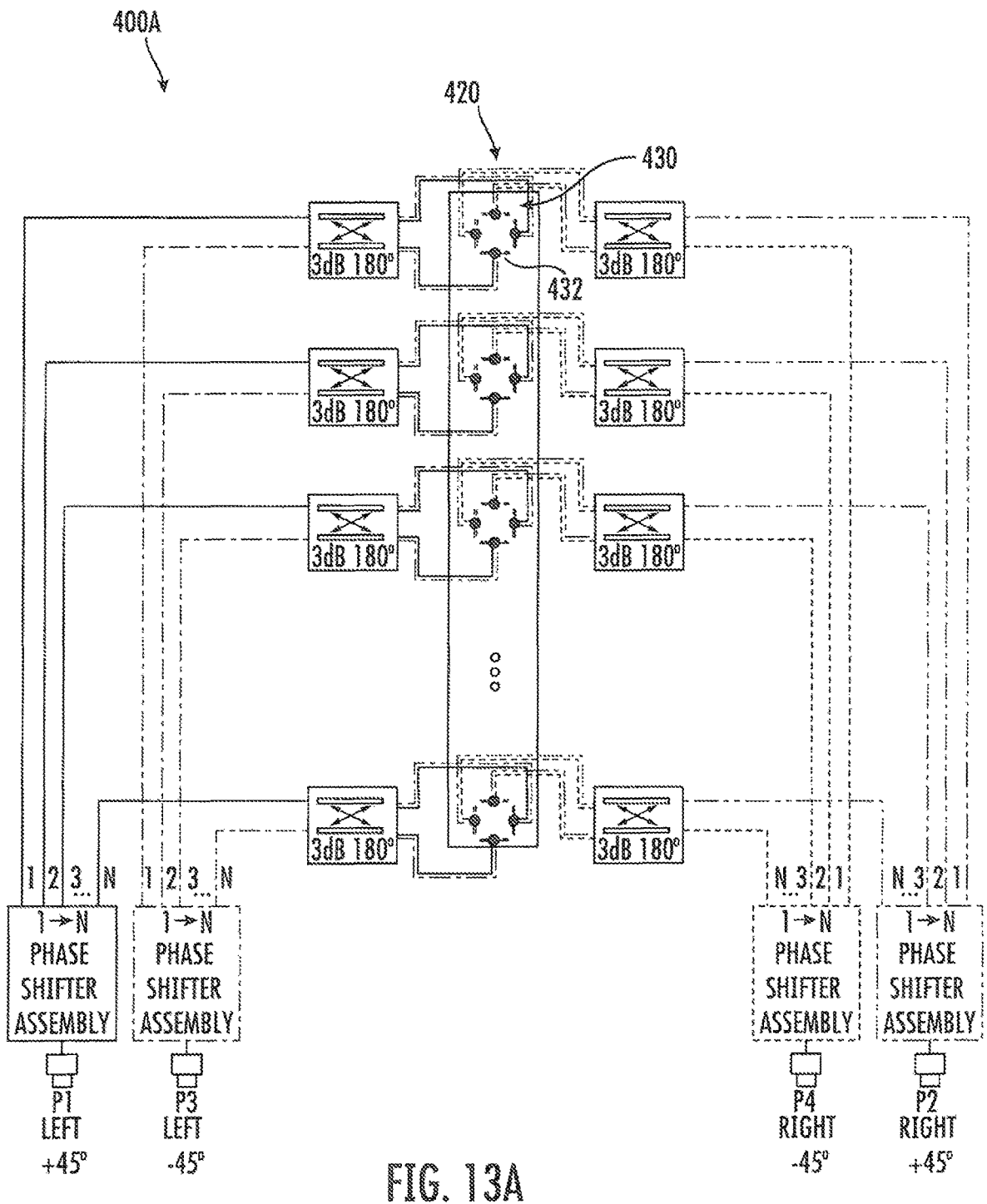
FIGS. 13A-13K are schematic block diagrams illustrating base station antennas according to further embodiments of the present invention.
Figure 13B:
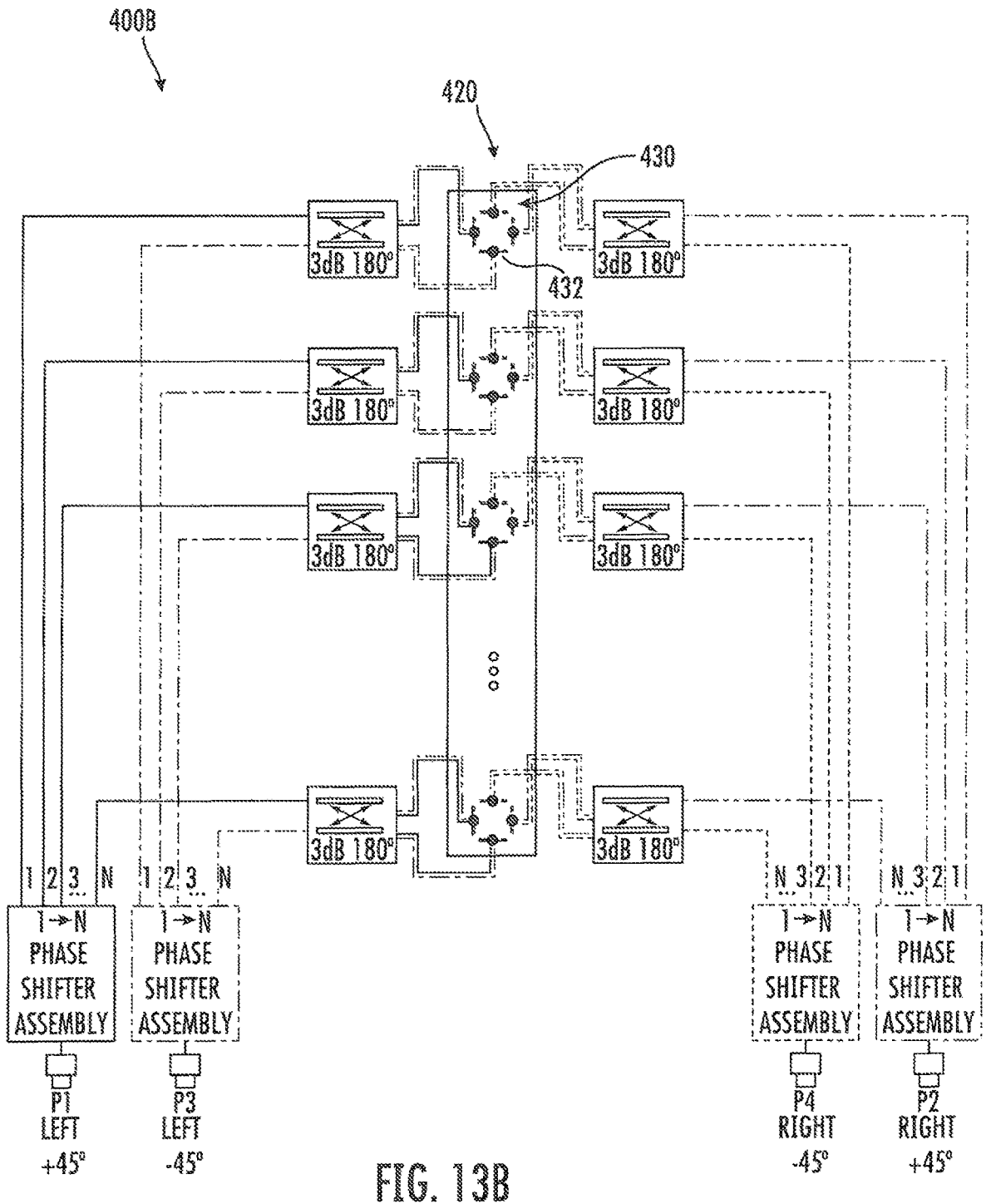
Figure 13C:
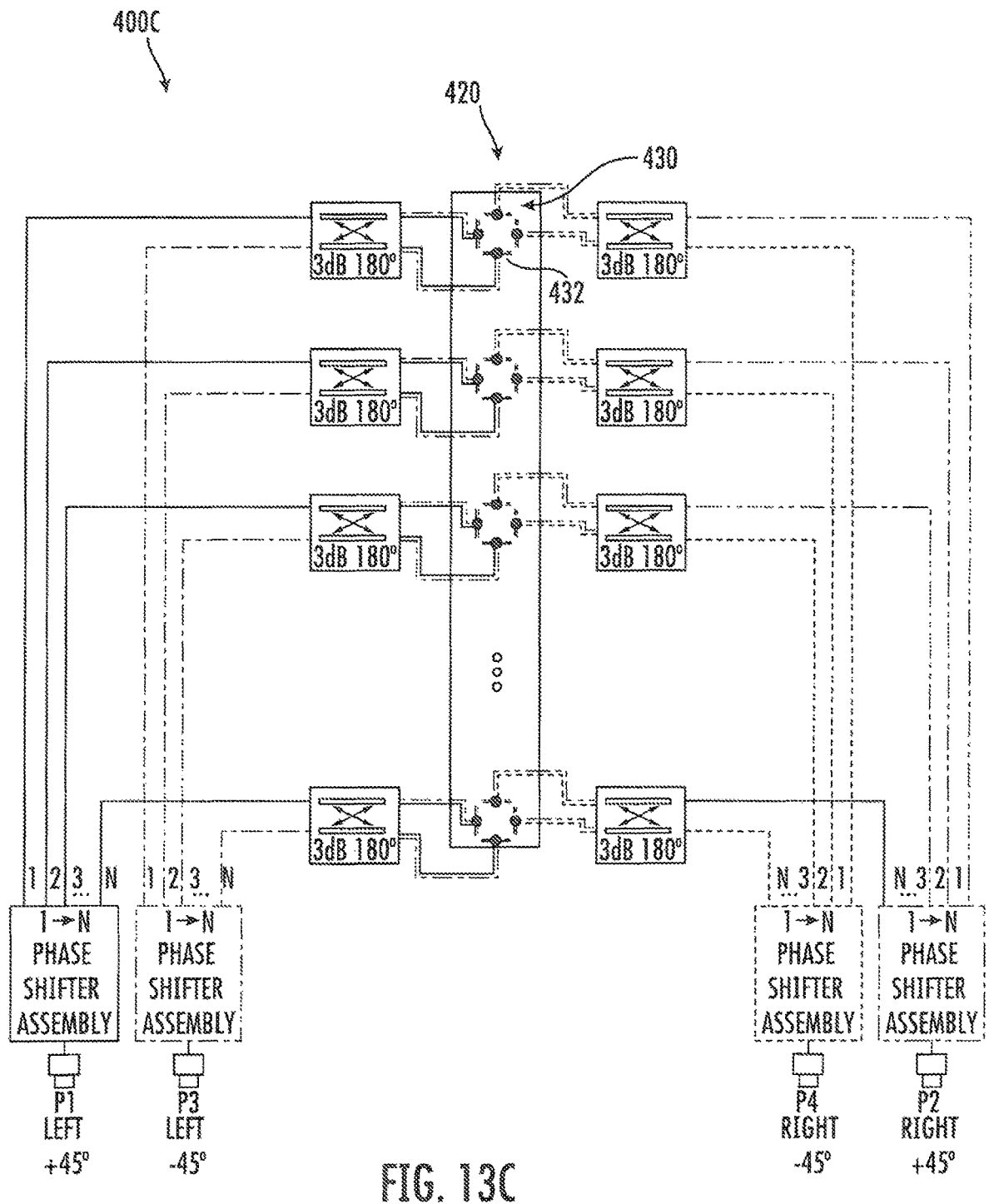

FIGS. 13A-13C schematically illustrate three base station antennas 400A-400C that each include an array 420 of shared radiating elements 430 that can generate four independent antenna beams having, for example, a nominal azimuth HPBW of about 65°. FIGS. 13A-13C illustrate that the rat race couplers 160 that are shown, for example, in the embodiments of FIGS. 3B and 8B-8C above may be replaced with 3 dB 180° hybrid couplers. The embodiments shown in these figures also generalize the number of "output" ports on each phase shifter assembly to be an arbitrary number of ports. The specific examples of FIGS. 13A-13C illustrate three different ways that the outputs of the hybrid couplers may be coupled to the dipole radiators 432 of the shared radiating elements 430.

Figure 13D:
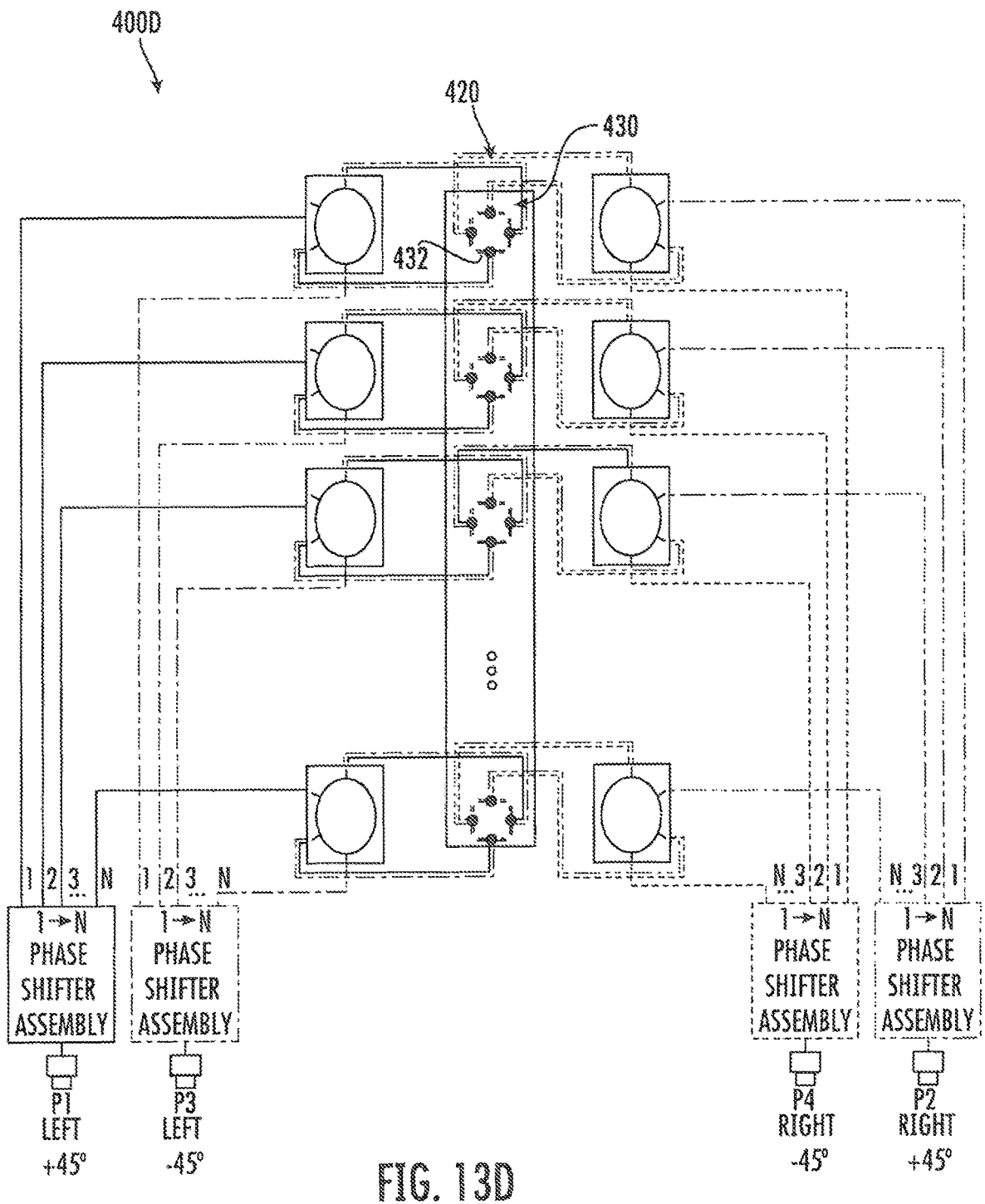
Figure 13E:
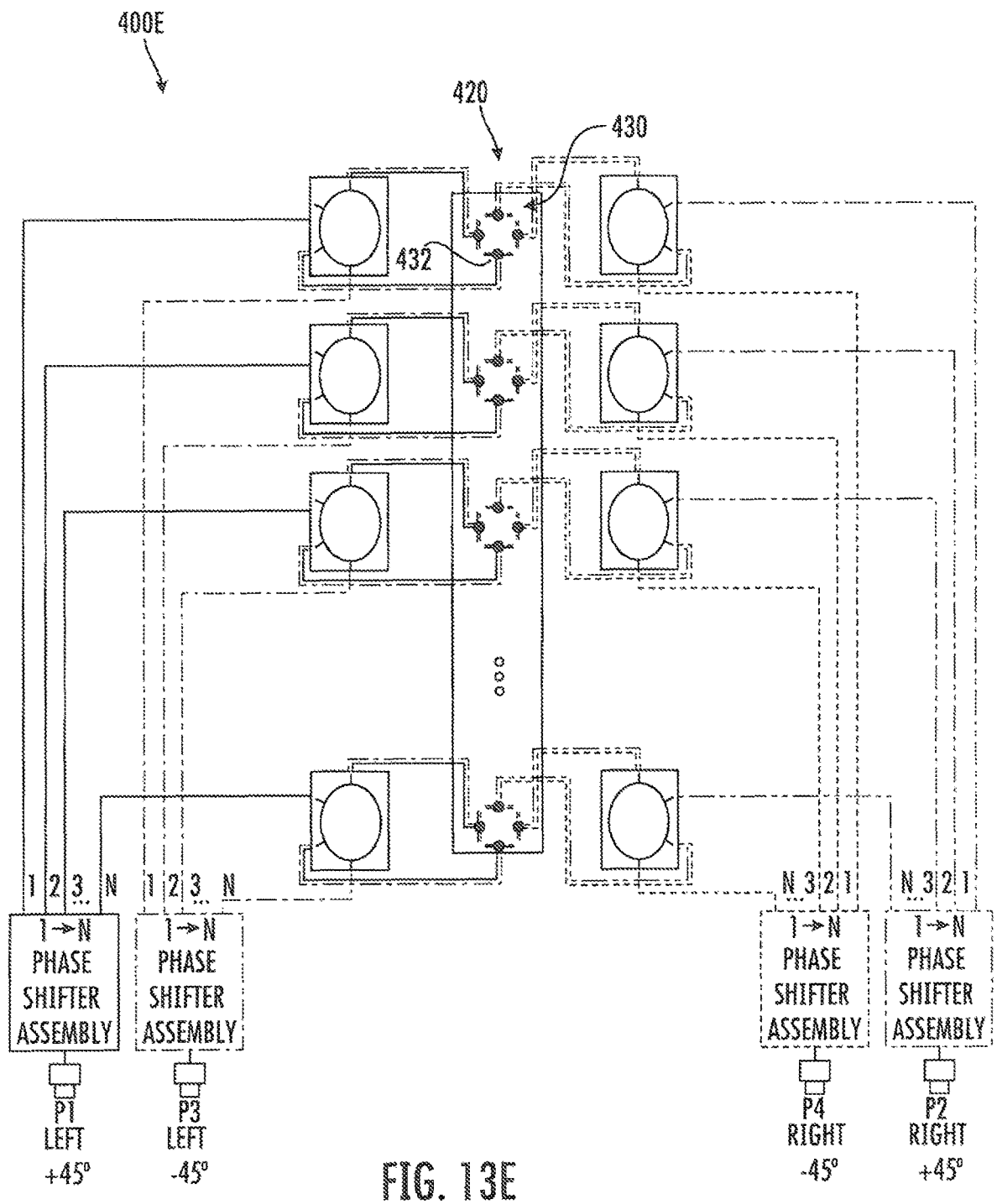
Figure 13F:
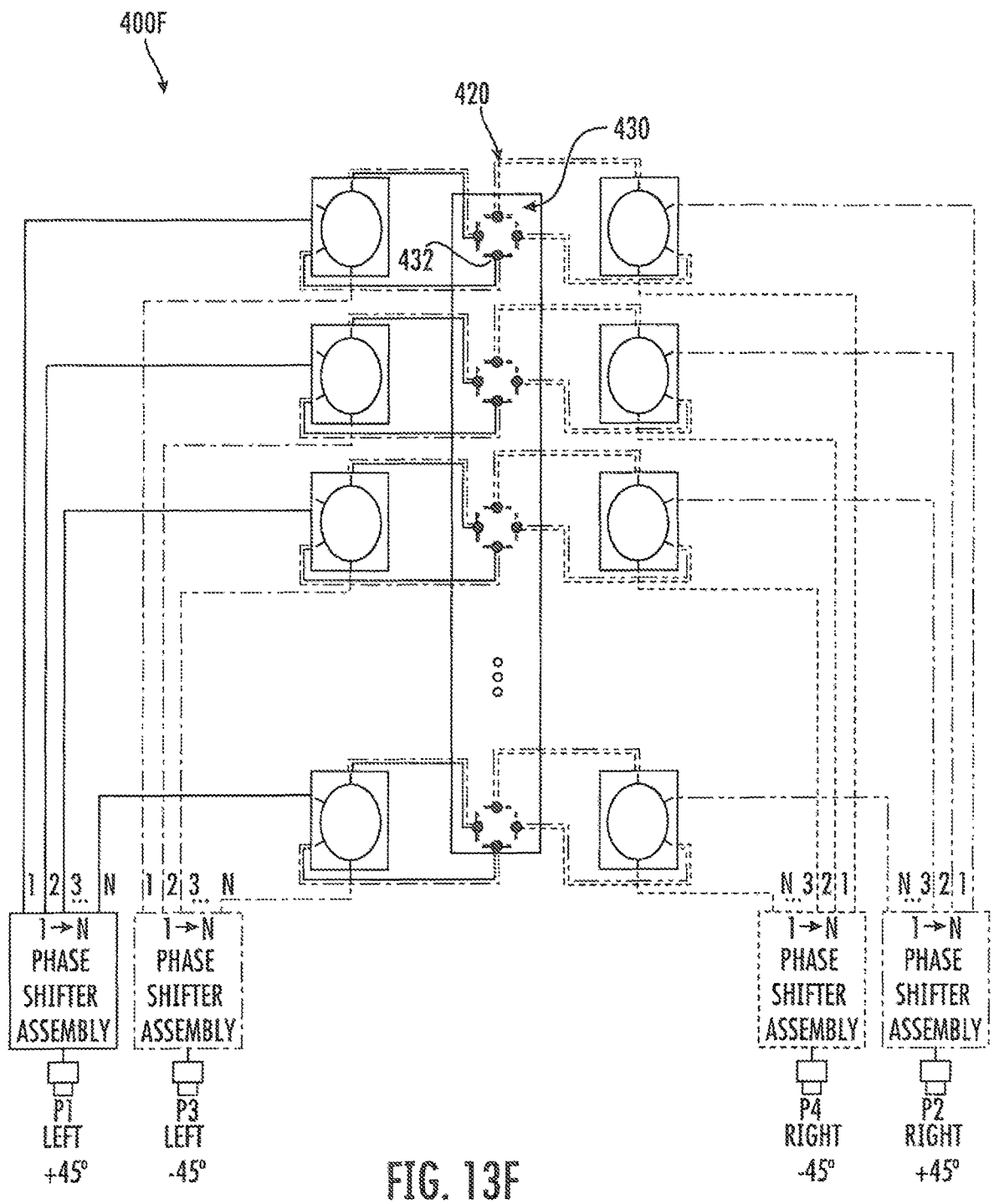

FIGS. 13D-13F schematically illustrate three base station antennas 400D-400F that each include an array 420 of shared radiating elements 430 that can generate four independent antenna beams having, for example, a nominal azimuth HPBW of about 65°. In the embodiments of FIGS. 13D-13F, the four-port combiners are implemented using rat race couplers, and the number of "output" ports on each phase shifter assembly is again generalized to be an arbitrary number or ports. The specific examples of FIGS. 13D-13F illustrate three different ways that the outputs of the rat race couplers may be coupled to the dipole radiators 432 of the shared radiating elements 430.

Figure 13G:
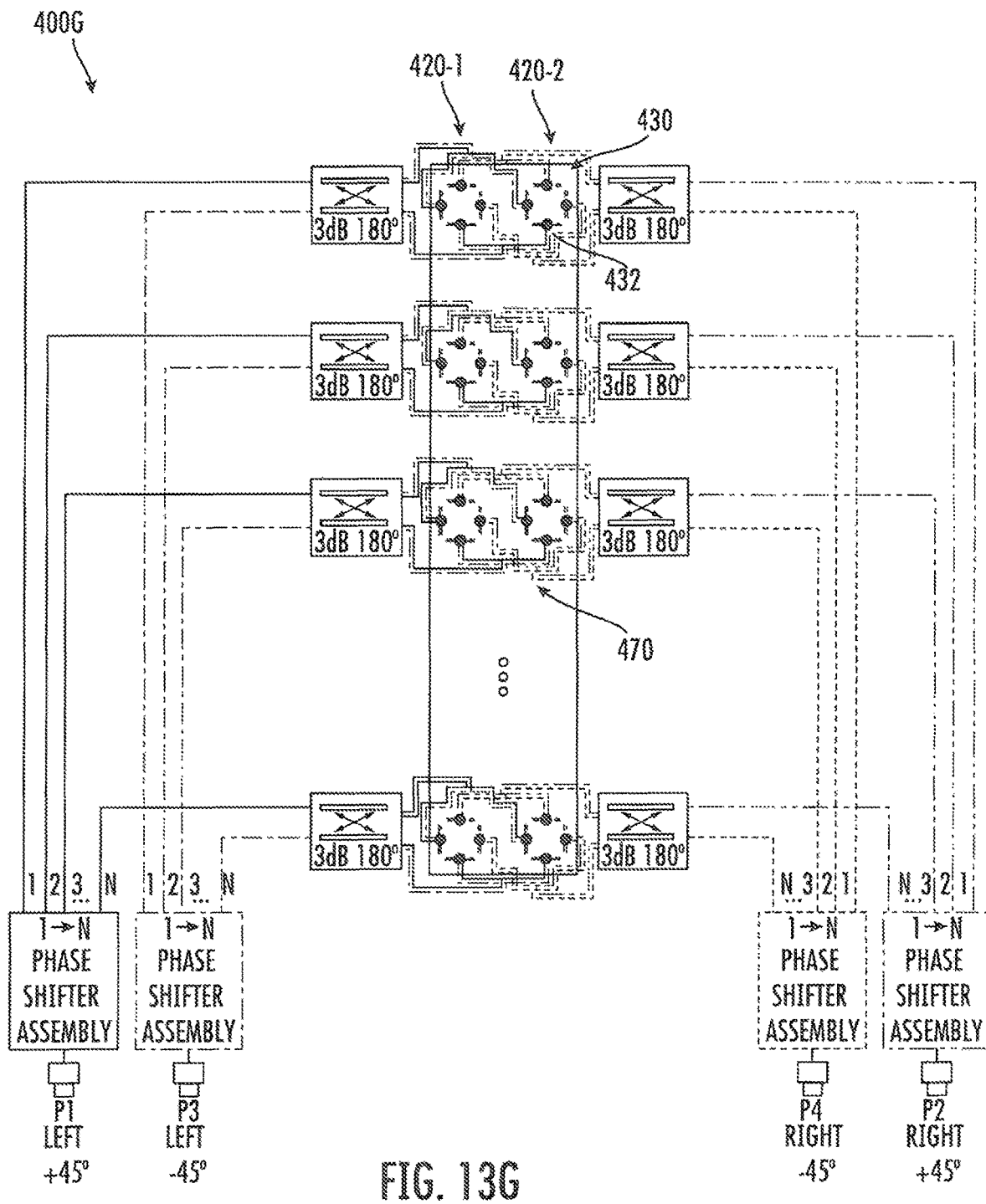
Figure 13H:
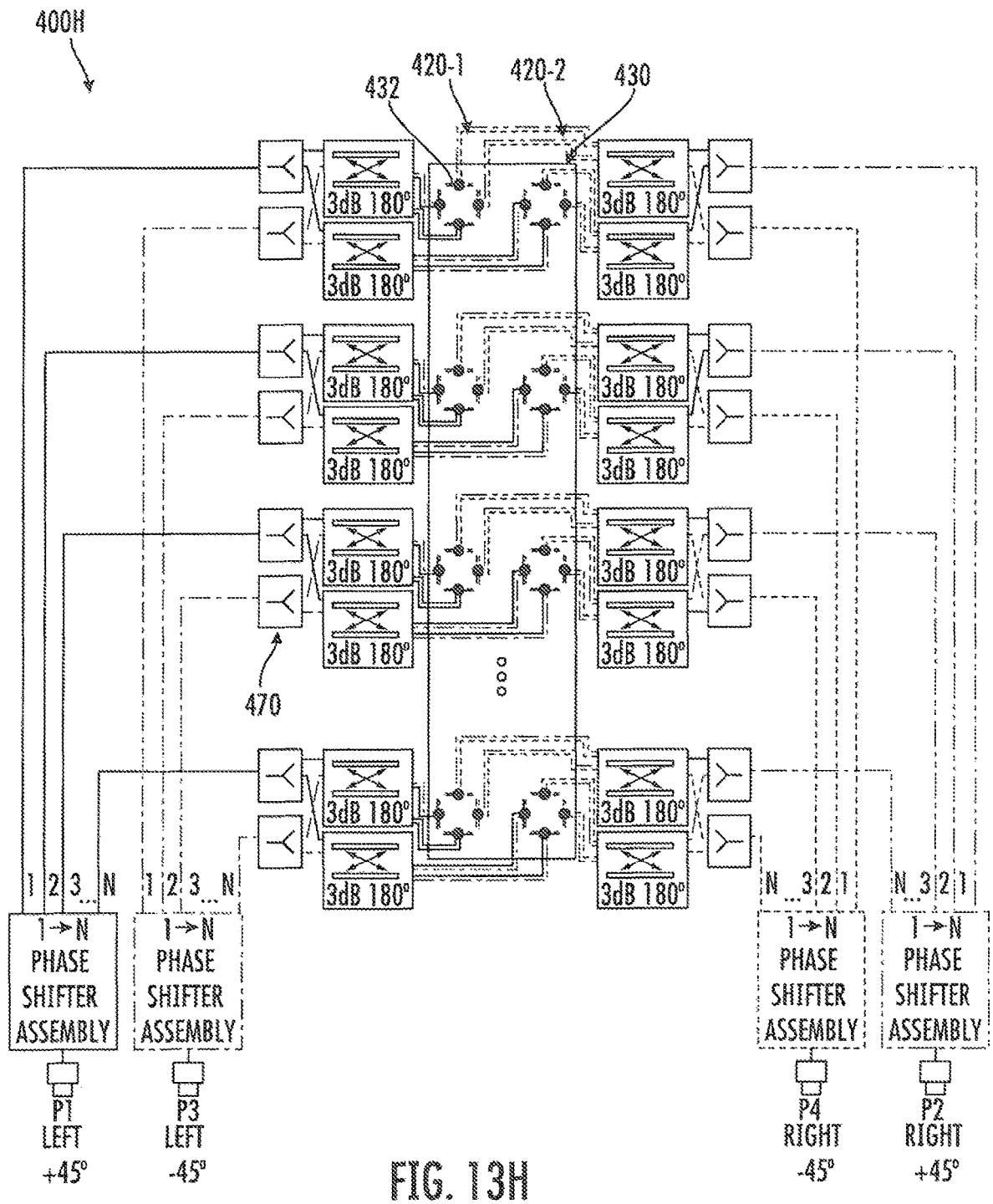

FIGS. 13G and 13H schematically illustrate base station antennas 400G and 400H that each include a pair of arrays 420-1, 420-2 of shared radiating elements 430 that can generate four independent antenna beams having, for example, a nominal azimuth HPBW of about 45°. In the embodiment of FIG. 13G, the 1×2 power splitter/combiners 470 are located between the 3 dB 180° hybrid couplers and the shared radiating elements 430, while in the embodiment of FIG. 13H, the 1×2 power splitter/combiners 470 are located between the phase shifter assemblies and the 3 dB 180° hybrid couplers (similar to the embodiment of FIG. 8B).

Figure 13I:
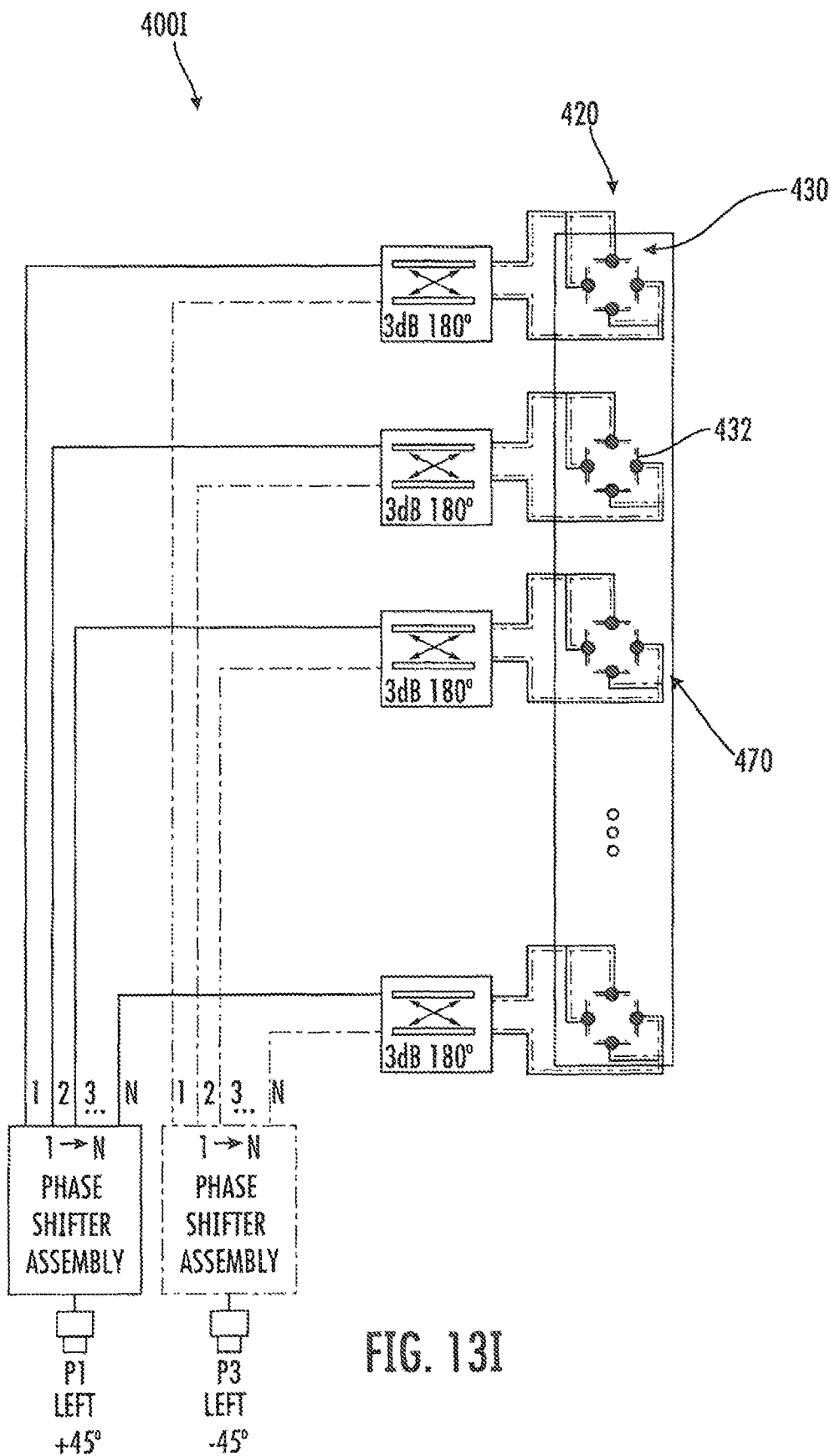
Figure 13J:
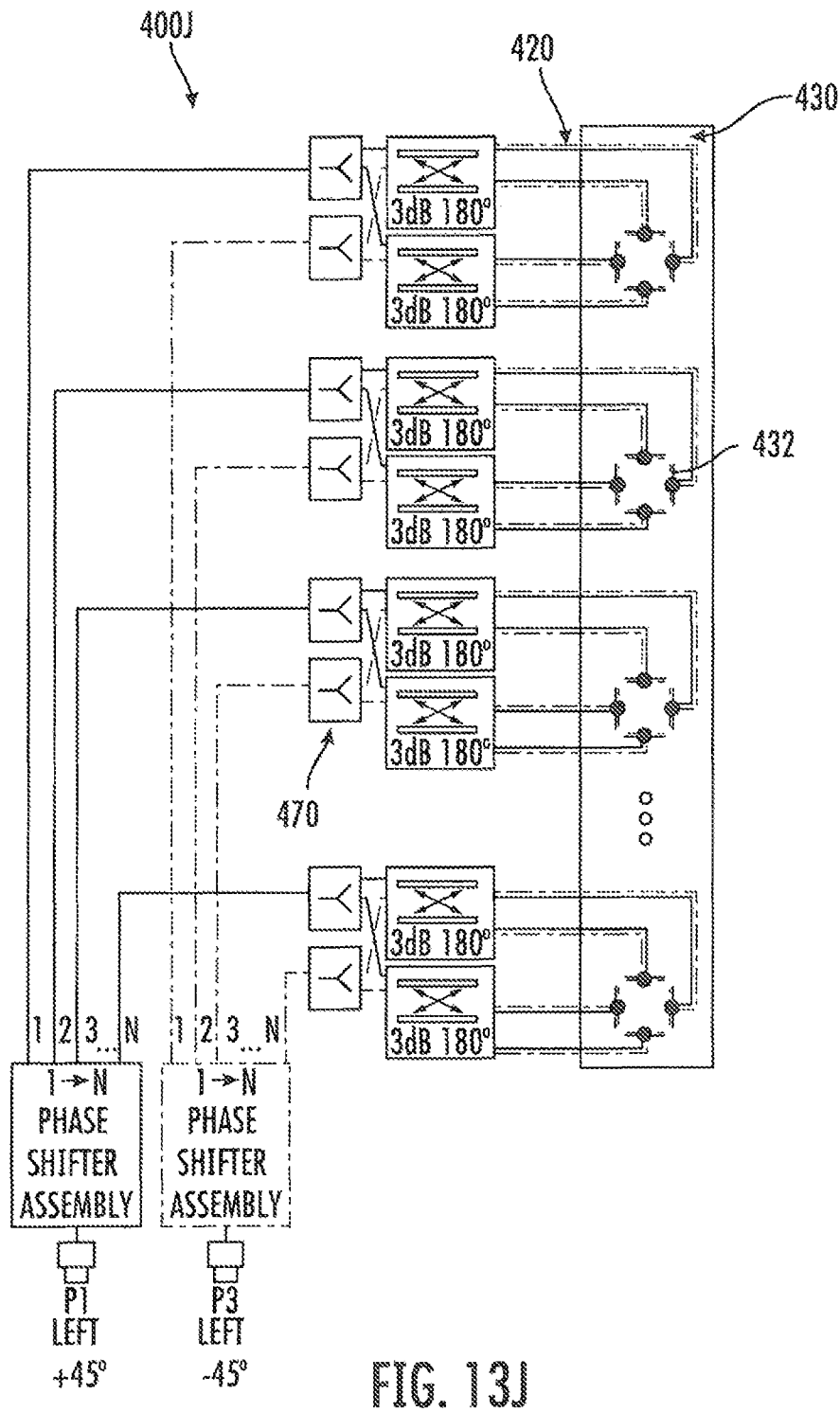

FIGS. 13I and 13J schematically illustrate base station antennas 400I and 400J that each include a single array 420 of shared radiating elements 430 that can generate two independent antenna beams having, for example, a nominal azimuth HPBW of about 45°. In the embodiment of FIG. 13I, the 1×2 power splitter/combiners 470 are located between the 3 dB 180° hybrid couplers and the shared radiating elements 430, while in the embodiment of FIG. 13J, the 1×2 power splitter/combiners 470 are located between the phase shifter assemblies and the 3 dB 180° hybrid couplers (similar to the embodiment of FIG. 8C).

Figure 13K:
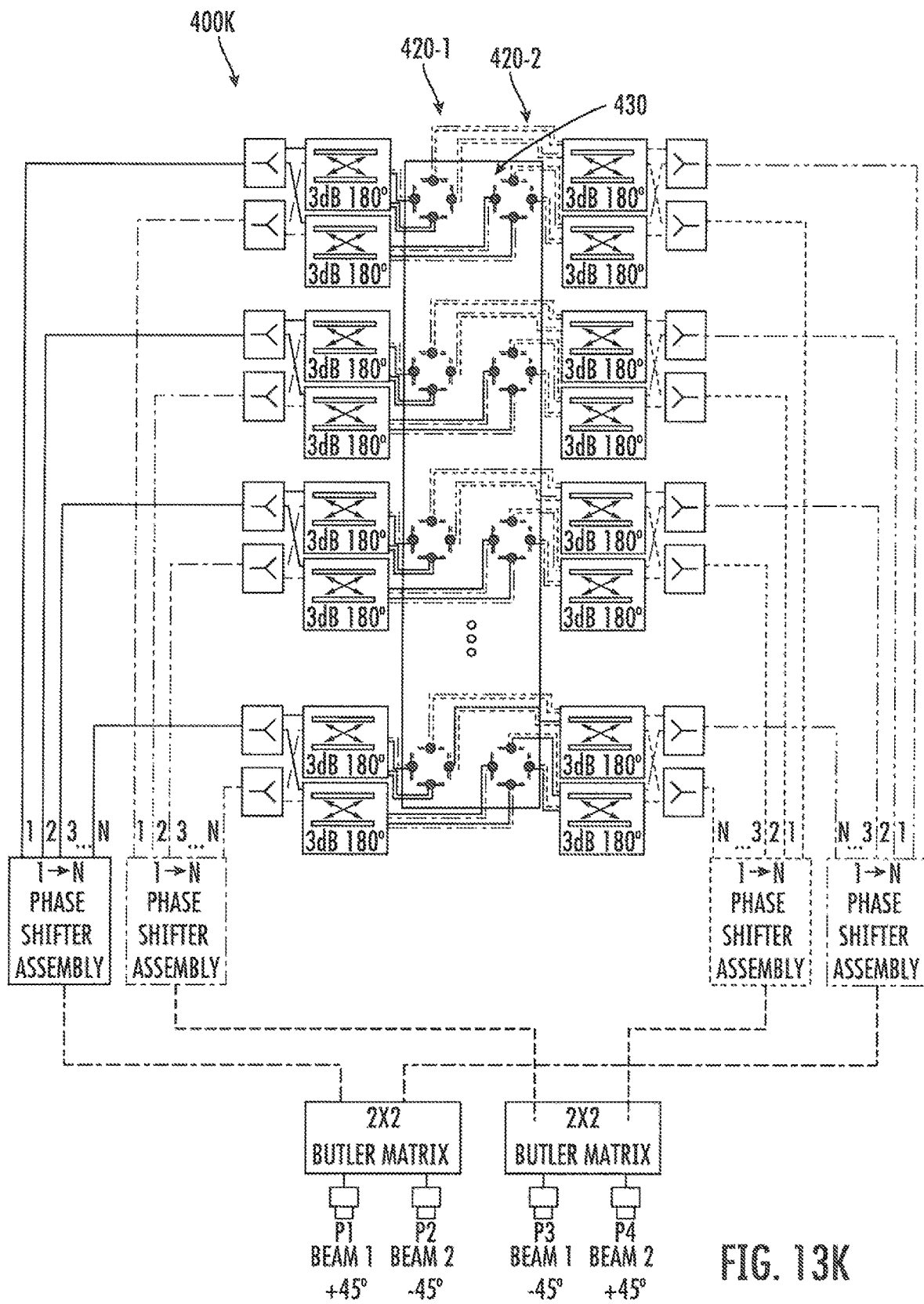

FIG. 13K schematically illustrates a base station antenna 400K that is a four-port sector-splitting antenna that includes two arrays 420-1, 420-2 of shared radiating elements 430. The base station antenna 400K may generate a first pair of antenna beams at two orthogonal polarizations that have, for example, a nominal azimuth HPBW of about 45° and that point in a first pointing direction as well as a second pair of antenna beams at two orthogonal polarizations that have, for example, a nominal azimuth HPBW of about 45° and that point in a second pointing direction that is different than the first pointing direction.

Figures 14A, 14D:
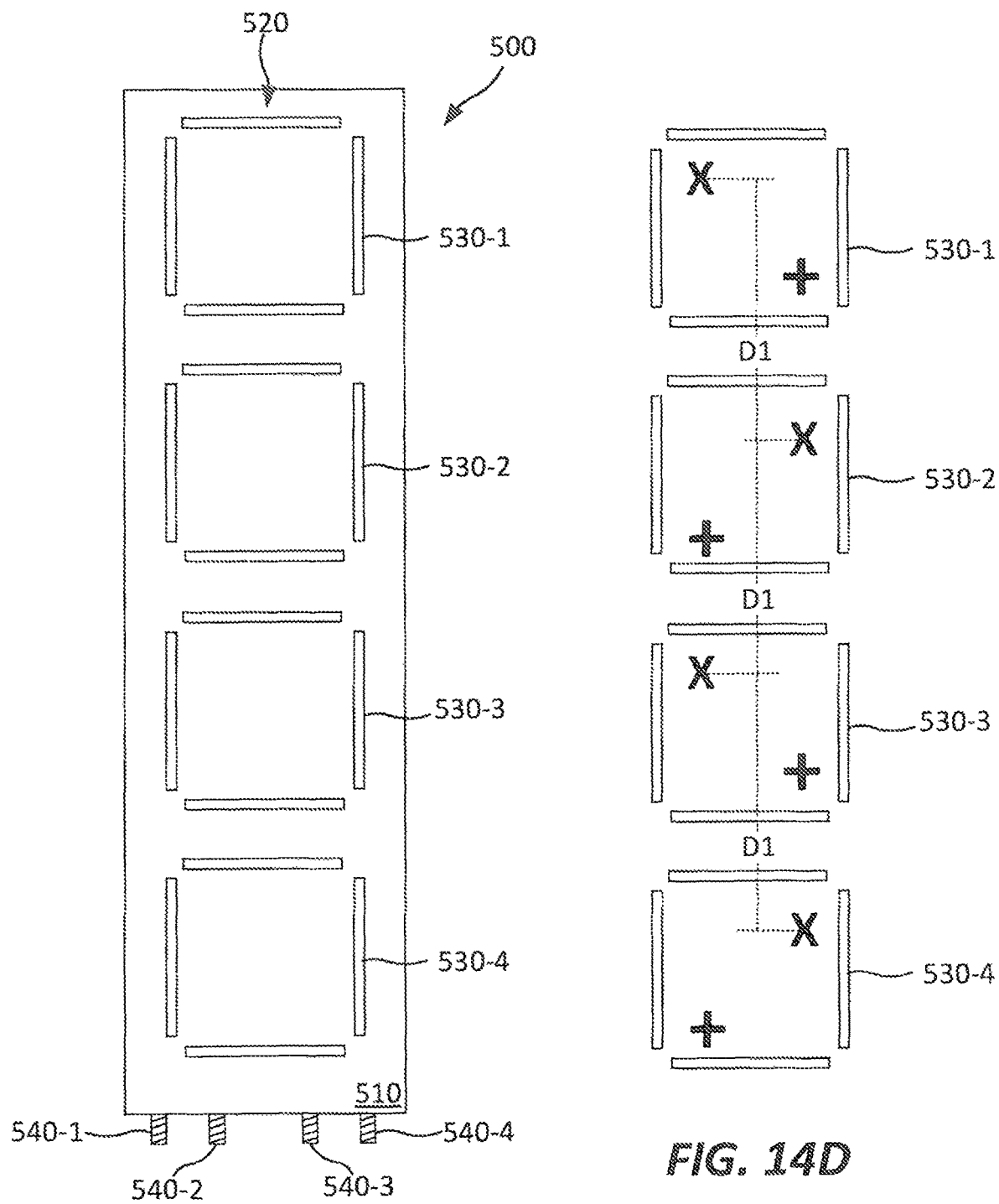
FIG. 14A is a schematic front view of a base station antenna according to further embodiments of the present invention that includes a shared linear array of radiating elements.
FIG. 14D is a schematic diagram that illustrates the phase centers for the radiating units of each box dipole radiating element in the shared linear array of the base station of FIGS. 14A-14B.
Figure 14B:
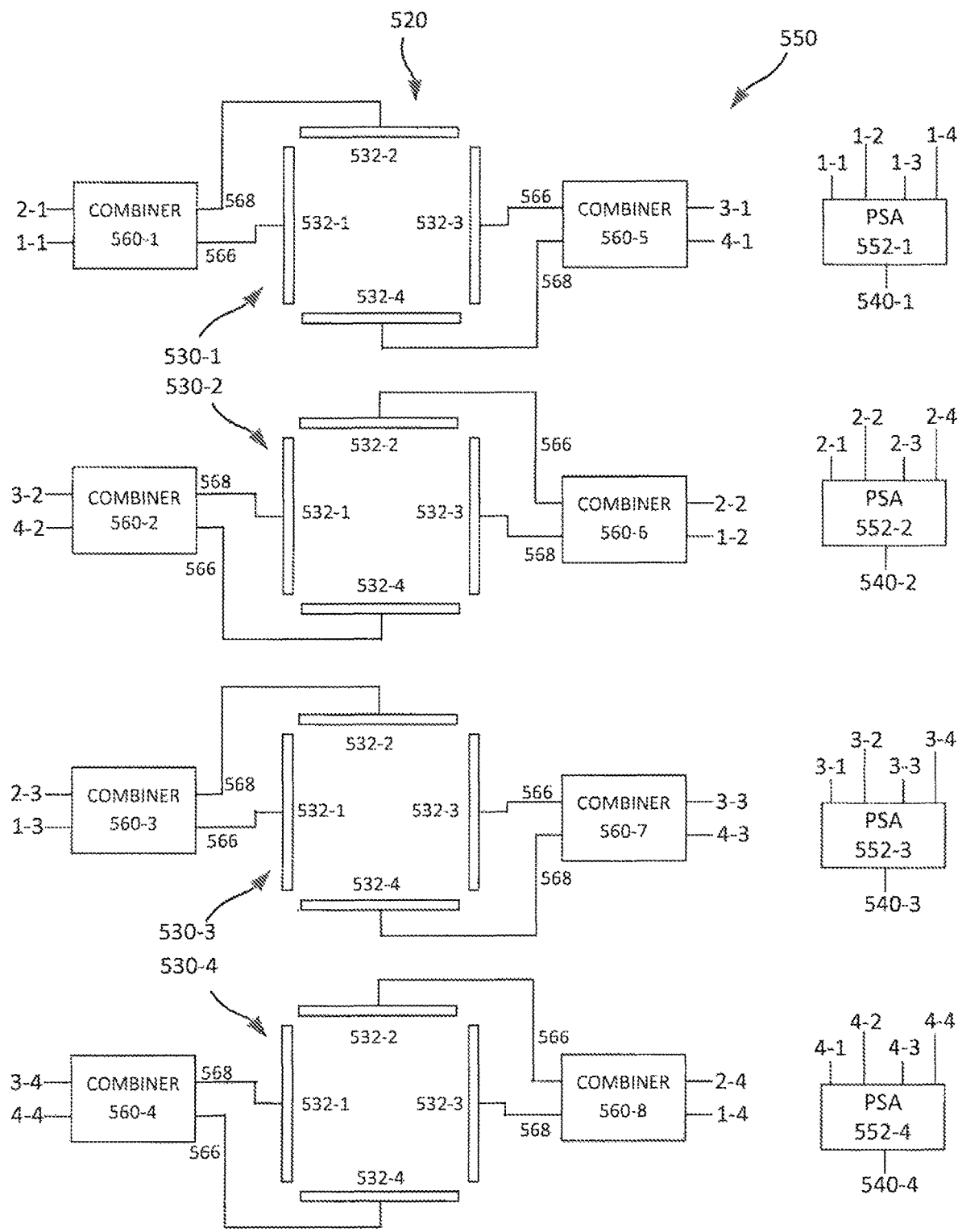
FIG. 14B is a block diagram of a feed network of the base station antenna of FIG. 14A.
Figure 14C:
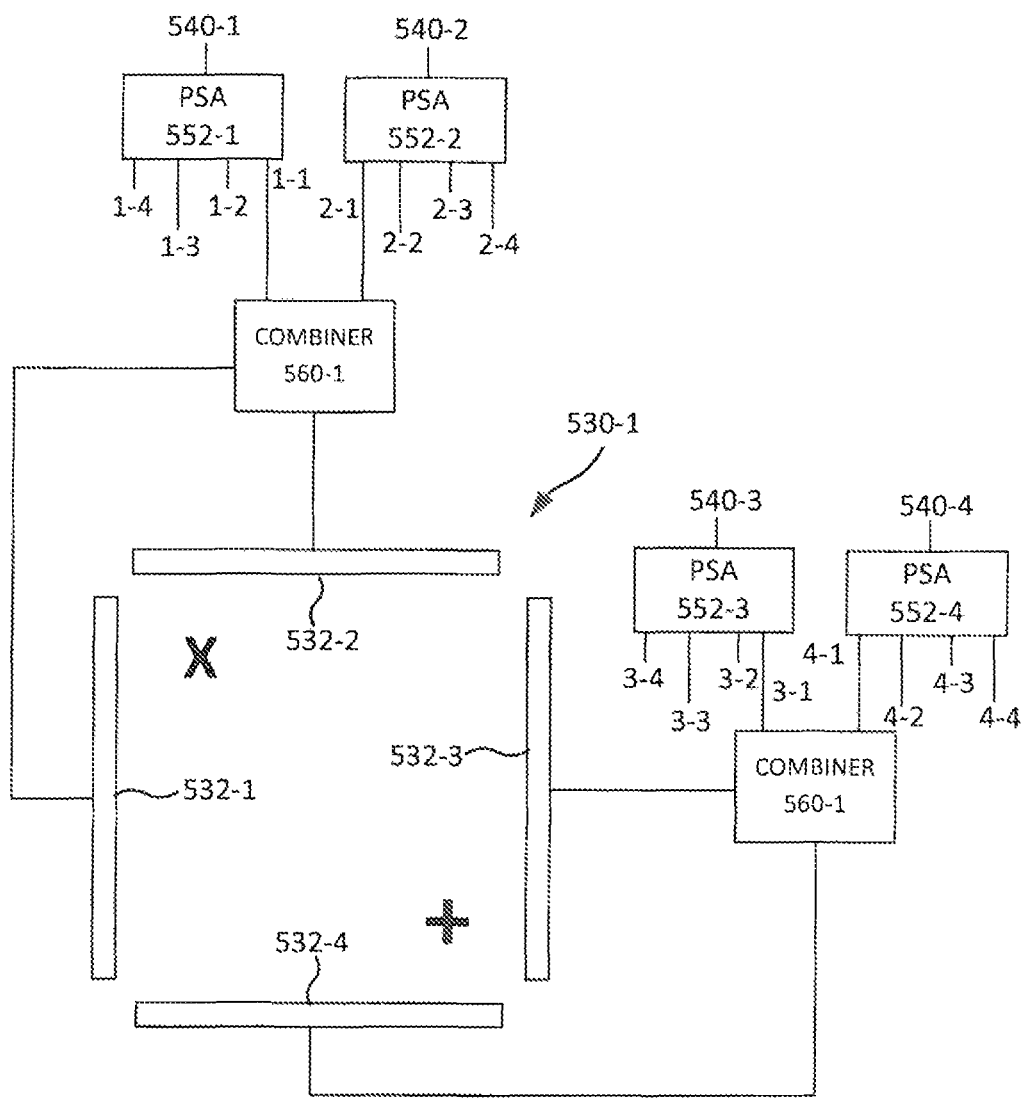
FIG. 14C is an enlarged front view of one of the box dipole radiating elements of the shared linear array of the base station antenna of FIGS. 14A-14B.

FIG. 14A is a schematic front view of a base station antenna 500 according to further embodiments of the present invention that includes a shared linear array 520 of box dipole radiating elements 530. FIG. 14B is a block diagram that illustrates a feed network 550 of the base station antenna 500 of FIG. 14A. FIG. 14C is an enlarged front view of one of the box dipole radiating elements 530 that is included in the shared linear array 520 of base station antenna 500 along with its associated feed elements. FIG. 14D is a schematic diagram that illustrates the phase centers for the radiating units of each box dipole radiating element 530 in the shared linear array 520 of base station 500. While the base station antenna 500 is illustrated as including a single shared linear array 520 of radiating elements 530, it will be appreciated that in other embodiments additional linear and/or planar arrays of radiating elements may be included in base station antenna 500. It will also be appreciated that box-style radiating elements other than box dipole radiating elements may be used to form the shared linear array 520 in other embodiments, and that shared radiating elements other than box-style radiating elements may be used (e.g., loop radiating elements).

The base station antenna 500 includes a linear array 520 of box dipole radiating elements 530 that are mounted to extend forwardly from a reflector 510. A total of four RF ports 540-1 through 540-4 are provided that are used to feed RF signals to and from the linear array 520. The RF ports 540-1 through 540-4 are coupled to the linear array 520 via a feed network (see FIG. 14B). While a total of four box dipole radiating elements 530 are shown in FIG. 14A, it will be appreciated that any number of radiating elements 530 may be included in the linear array 520. The number of box dipole radiating elements 530 included in the linear array 520 may be selected, for example, to meet specified gain and/or elevation beamwidth requirements.

FIG. 14B is a schematic view of the shared linear array 520 of base station antenna 500 of FIG. 14A that illustrates a feed network 550 thereof. As shown in FIG. 14B, the feed network 550 for linear array 520 includes four phase shifter assemblies ("PSA") 552-1 through 552-4 as well as eight four-port combiners 560-1 through 560-8. The phase shifter assemblies 552-1 through 552-4 and the four-port combiners 560-1 through 560-8 may be identical to the phase shifter assemblies 152-1 through 152-4 and the four-port combiners 160-1 through 160-8 that are discussed above with reference to FIG. 3B. As such, further description of these components and description as to how the RF ports 540, the phase shifter assemblies 552 and the four-port combiners are inter-connected will be omitted. It will be appreciated that any appropriate four-port combiner can be used to implement the four-port combiners 160, including any of the four-port combiners discussed above. The connection scheme used to couple the four-port combiners 560-1 through 560-8 to the radiating elements 530 of linear array 520 differs, however, from the connection scheme used in the base station antenna 100 of FIGS. 3A-3B.

In particular, each box dipole radiating element 530 includes four dipole radiators 532-1 through 532-4 that are arranged to form a generally rectangular shape when viewed from the front. In the particular embodiment shown, the four dipole radiators 532-1 through 532-4 are arranged to form a square. In some embodiments, the left and right dipole radiators 532-1, 532-3 may be moved inwardly (i.e., toward the center of each respective box dipole radiating element 530) from the positions shown in FIGS. 14A-14B while the top and bottom dipole radiators 532-2, 532-4 are maintained in their positions as shown, so that the dipole radiating elements do not form a true rectangle or square but instead only have a generally square or rectangular shape. In other embodiments, the top and bottom dipole radiators 532-2, 532-4 may be moved inwardly (i.e., toward the center of each respective box dipole radiating element 530) from the positions shown in FIGS. 14A-14B while the left and right dipole radiators 532-1, 532-3 are maintained in their positions as shown.

As shown in FIG. 14B, the first output port 566 of four-port combiner 560-1 is coupled to the first dipole radiator 532-1 (i.e., the "left" dipole radiator) of box dipole radiating element 530-1, and the second output port 568 of four-port combiner 560-1 is coupled to the second dipole radiator 532-2 (i.e., the "top" dipole radiator) of box dipole radiating element 530-1. Likewise, the first output port 566 of four-port combiner 560-5 is coupled to the third dipole radiator 532-3 of box dipole radiating element 530-1 (i.e., the "right" dipole radiator), and the second output port 568 of four-port combiner 560-5 is coupled to the fourth dipole radiator 532-4 of box dipole radiating element 530-1 (i.e., the "bottom" dipole radiator). As can also be seen from FIG. 14B, four-port combiners 560-3 and 560-7 are coupled to the dipole radiators 532 of box dipole radiating element 530-3 in the same manner as four-port combiners 560-1 and 560-5, respectively.

As is further shown in FIG. 14B, the first output port 566 of four-port combiner 560-2 is coupled to the fourth dipole radiator 532-4 (i.e., the "bottom" dipole radiator) of box dipole radiating element 530-2, and the second output port 568 of four-port combiner 560-2 is coupled to the first dipole radiator 532-1 (i.e., the "left" dipole radiator) of box dipole radiating element 530-2. Likewise, the first output port 566 of four-port combiner 560-5 is coupled to the second dipole radiator 532-2 of box dipole radiating element 530-2 (i.e., the "top" dipole radiator), and the second output port 568 of four-port combiner 560-5 is coupled to the third dipole radiator 532-3 of box dipole radiating element 530-2 (i.e., the "right" dipole radiator). As can also be seen from FIG. 14B, four-port combiners 560-4 and 560-8 are coupled to the dipole radiators 532 of box dipole radiating element 530-4 in the same manner as four-port combiners 560-2 and 560-6, respectively.

Thus, as shown in FIG. 14B, some of the radiating elements 530 are fed differently than other of the radiating elements 530 in linear array 520. This may improve the performance of the shared linear array 520 as compared to, for example, the shared linear array 120 discussed above. One of the reasons that this performance improvement may be achieved can be seen with reference to FIG. 14C, which is an enlarged schematic front view of box dipole radiating element 530-1 and the feed elements associated therewith. As shown in FIG. 14C, dipole radiators 532-1 and 532-2 are coupled to RF ports 540-1 and 540-2 (through four-port combiner 560-1), and thus together act as a radiator unit to radiate the RF signals input at RF ports 540-1 and 540-2 at respective −45° and +45° polarizations in the manner discussed above with reference to FIG. 4B. As shown by the large "x" in FIG. 14C, the phase center for the RF signals radiated by dipole radiators 532-1 and 532-2 is near the upper left corner of box dipole radiating element 530-1. Similarly, dipole radiators 532-3 and 532-4 are coupled to RF ports 540-3 and 540-4, and thus together act to radiate the RF signals input at RF ports 540-3 and 540-4 at respective −45° and +45° polarizations. As shown by the large "+" in FIG. 14C, the phase center for the RF signals radiated by dipole radiators 532-3 and 532-4 is near the lower right corner of box dipole radiating element 530-1.

As is readily apparent from FIG. 14C, the phase center for the radiator unit composed of dipole radiators 532-1 and 532-2 is offset from the phase center for the radiator unit composed of dipole radiators 532-3 and 532-4 in the horizontal direction (i.e., the "x" is to the left of the "+" in FIG. 14C). As a result, by coupling, for example, RF ports 540-1 and 540-2 to dipole radiators 532-1 and 532-2 for some of the box dipole radiating elements 530 in linear array 520 (e.g., to box dipole radiating element 530-1) and to dipole radiators 532-3 and 532-4 for others of the box dipole radiating elements 530 in linear array 520 (e.g., to box dipole radiating element 530-2), the horizontal aperture of linear array 520 may be increased, which in turn may act to narrow the azimuth beamwidth of the antenna beams generated in response to RF signals that are input at RF ports 540-1 and 540-2. The same narrowing of the azimuth beamwidth of the antenna beams generated in response to RF signals that are input at RF ports 540-3 and 540-4 may also occur. Thus, by feeding the box dipole radiating elements 530 of shared array 520 in the "snake" pattern shown in FIG. 14B it may be possible to generate antenna beams having narrowed azimuth beamwidths.

FIG. 14D is a schematic diagram that illustrates the phase centers for RF signals that are coupled to linear array 520 from RF ports 540-1 and 540-2 (which are shown by an enlarged "x" in each box dipole radiating element 530), and the phase centers for RF signals that are coupled to linear array 520 from RF ports 540-3 and 540-4 (which are shown by an enlarged "+" in each box dipole radiating element 530). As shown in FIG. 14D with respect to the dipole radiators that are connected to RF ports 540-1 and 540-2, the vertical separation between the phase centers of adjacent box dipole radiating elements 530 is the same distance, namely distance D1, so long as the box dipole radiating elements 530 are spaced apart from each other in the vertical direction at equal intervals. Similarly, with respect to the dipole radiators that are connected to RF ports 540-3 and 540-4, the vertical separation between the phase centers of adjacent box dipole radiating elements 530 is again the same distance so long as the box dipole radiating elements 530 are spaced apart from each other in the vertical direction at equal intervals. The arrangement of the phase centers shown in FIG. 14D may provide improved radiation patterns as compared to arrangements where the vertical distance between phase centers of adjacent radiating elements 530 is not maintained at constant (or near constant) intervals.

While in the embodiment of FIGS. 14A-14D every other box dipole radiating element 530 is fed differently, it will be appreciated that embodiments of the present invention are not limited thereto. As another example, box dipole radiating elements 530-1 and 530-2 could be "fed" in a first way (e.g., both box dipole radiating elements 530-1 and 530-2 could be coupled to RF ports 540-1 through 540-4 in the way that box dipole radiating element 530-1 is coupled to the RF ports 540-1 through 540-4 in FIG. 14B), while box dipole radiating elements 530-3 and 530-4 could be "fed" in a second, different way (e.g., box dipole radiating elements 530-3 and 530-4 could be coupled to RF ports 540-1 through 540-4 in the way that box dipole radiating element 530-4 is coupled to the RF ports 540-1 through 540-4 in FIG. 14B). It will be apparent that many different configurations are possible, and that in some embodiments more box dipole radiating elements 530 may be fed in the first manner than in the second manner, or vice versa.

Figure 15:
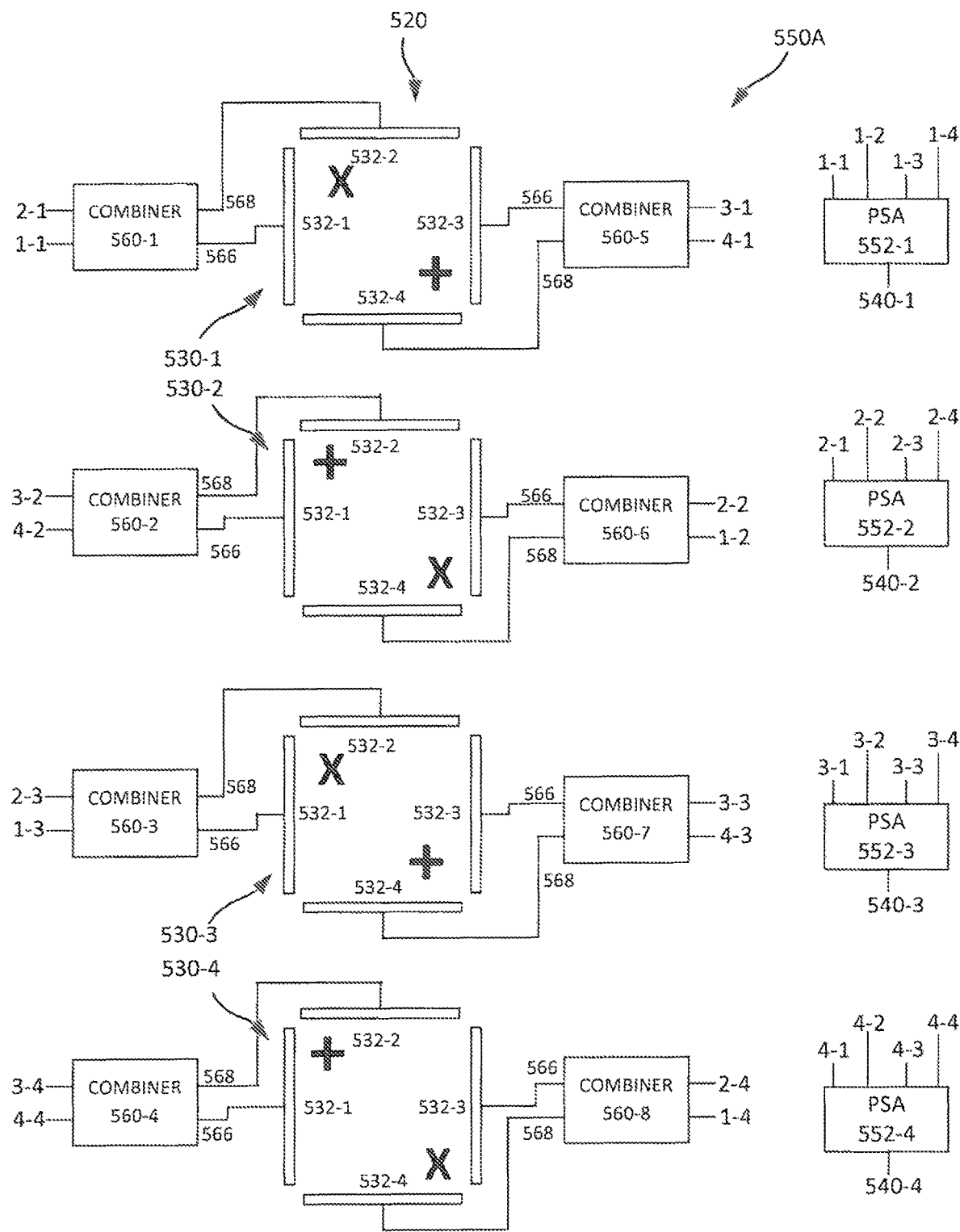
FIG. 15 is a schematic view of a modified version of the base station antenna of FIG. 14A that includes a modified feed network.

It will also be appreciated that numerous modifications may be made to linear array 520 without departing from the scope of the present invention. For example, FIG. 15 illustrates an alternative feed network 550A that could be used in place of feed network 550 of FIG. 14B. In feed network 550A, four-port combiners 560-1, 560-3, 560-5 and 560-7 may be coupled to radiating elements 530-1 and 530-3 in the exact same manner as shown in FIG. 14B. Accordingly, further description of this portion of feed network 550A will be omitted. However, four-port combiners 560-2, 560-4, 560-6 and 560-8 are coupled to radiating elements 530-2 and 530-4 in a different manner. In particular, as shown in FIG. 15, the first output port 566 of four-port combiner 560-2 is coupled to the first dipole radiator 532-1 (i.e., the "left" dipole radiator) of box dipole radiating element 530-2, and the second output port 568 of four-port combiner 560-2 is coupled to the second dipole radiator 532-2 (i.e., the "top" dipole radiator) of box dipole radiating element 530-2. Likewise, the first output port 566 of four-port combiner 560-6 is coupled to the third dipole radiator 532-3 of box dipole radiating element 530-2 (i.e., the "right" dipole radiator), and the second output port 568 of four-port combiner 560-6 is coupled to the fourth dipole radiator 532-4 of box dipole radiating element 530-2 (i.e., the "bottom" dipole radiator). As can also be seen in FIG. 15, four-port combiners 560-4 and 560-8 are coupled to the dipole radiators 532 of box dipole radiating element 530-4 in the same manner. Such a configuration may also generate the desired antenna beams having +/−45° polarizations, and may form a shared linear array having a larger horizontal aperture that narrows the azimuth beamwidth of the resultant antenna beams. However, the location of the phase centers for each radiating element (which again are shown using enlarged "x" and "+" symbols) differ from that shown in FIG. 14D. The vertical separation between the phase centers of adjacent radiating units in the array 520 will not, however, be uniform as was the case in the embodiment of FIGS. 14A-14B. This may degrade the performance of the array in some applications FIG. 16A is a perspective view of a log periodic dipole box dipole radiating element 600 according to embodiments of the present invention that may be used, for example, to implement each of the box dipole radiating elements 530 included in the base station antenna 500 of FIGS. 14A-14D. FIGS. 16B and 16C are top and bottom views, respectively of one of the log periodic dipole radiators included in the log periodic dipole box dipole radiating element 600 of FIG. 16A.

As shown in FIG. 16A, the log periodic dipole box dipole radiating element 600 includes four log periodic dipole radiators 610-1 through 610-4 that are mounted to extend forwardly from reflector 610 in a generally rectangular arrangement. In the depicted embodiment, each log periodic dipole radiator 610 is implemented on a respective printed circuit board 620. Each printed circuit board 620 may comprise a dielectric layer 622 that has first and second metallization layers 624, 626 formed on either side thereof. In other embodiments, the printed circuit boards 620 may be omitted and the log periodic dipole radiators 610 may be implemented as, for example, sheet metal log periodic dipole radiators.

FIGS. 16B and 16C illustrate the first and second metallization layers 624, 626 that are formed on the two major surfaces or "sides" of the dielectric layer 622 of log periodic dipole radiator 610-4. Each of the other log periodic dipole radiators 610-1 through 610-3 may have the same configuration. Referring to FIG. 16B it can be seen that the first metallization layer 624 includes a forwardly-extending conductive trace 630 that extends generally perpendicularly to the plane defined by the reflector 110. A plurality of conductive segments 632 extend at right angles from the forwardly-extending conductive trace 630. The conductive segments 632 may extend generally in parallel to each other and may all extend from a first side of forwardly-extending conductive trace 630. For radiating element 610-2, each of the conductive segments 632 extends rightwardly. Each conductive segments 632 is electrically connected to the forwardly-extending conductive trace 630. A solder mask 634 is formed over a portion of the first metallization layer 624. The solder mask 634 includes a central opening that exposes the forwardly-extending conductive trace 630. A coaxial feed cable (see FIG. 16A) that couples RF signals to and from log periodic dipole radiator 610-4 may have its cable jacket removed and the outer conductor of this coaxial feed cable may be soldered to the forwardly-extending conductive trace 630. The solder mask 634 may ensure that the outer conductor of the coaxial feed cable is only electrically connected to the conductive segments 632 through the forwardly-extending conductive trace 630. Since the conductive segments 632 are electrically connected to the conductive trace 630, the conductive segments 632 may be maintained at ground potential.

Referring to FIG. 16C it can be seen that the second metallization layer 626 includes a forwardly-extending conductive trace 640 that extends generally perpendicularly to the plane defined by the reflector 110. A plurality of conductive segments 642 extend at right angles from the forwardly-extending conductive trace 640. The conductive segments 642 may extend generally in parallel to each other and may all extend from a first side of forwardly-extending conductive trace 640. For radiating element 610-4, each of the conductive segments 642 extends leftwardly. Each conductive segment 642 is electrically connected to the forwardly-extending conductive trace 640. As shown in FIG. 16A, the center conductor of the coaxial feed cable that couples RF signals to and from log periodic dipole radiator 610-4 is soldered to the upper end of the forwardly-extending conductive trace 640 (after passing through a via in the dielectric substrate 622). Since the conductive segments 642 are electrically connected to the conductive trace 640, the conductive segments 642 are electrically connected to the center conductor of the coaxial feed cable.

The conductive segments 632 and 642 may act as dipole radiators. The conductive segments 632 and 642 have varying lengths and hence which conductive segment tends to radiate in response to an RF feed signal will depend on the frequency of the RF feed signal. In an example embodiment, the longest conductive segments 632 and 642 may be approximately one quarter a wavelength corresponding to the frequency at the lower edge of the operating frequency band for the box dipole radiating element 600, and the shortest conductive segments 632 and 642 may be approximately one quarter a wavelength corresponding to the frequency at the upper edge of the operating frequency band for the box dipole radiating element 600.

While straight conductive segments 632, 642 are depicted in FIGS. 16A-16C, embodiments of the present invention are not limited thereto. For example, in other embodiments, the conductive segments could be meandered, have oval shapes, comprise loops, etc.

Figure 17:
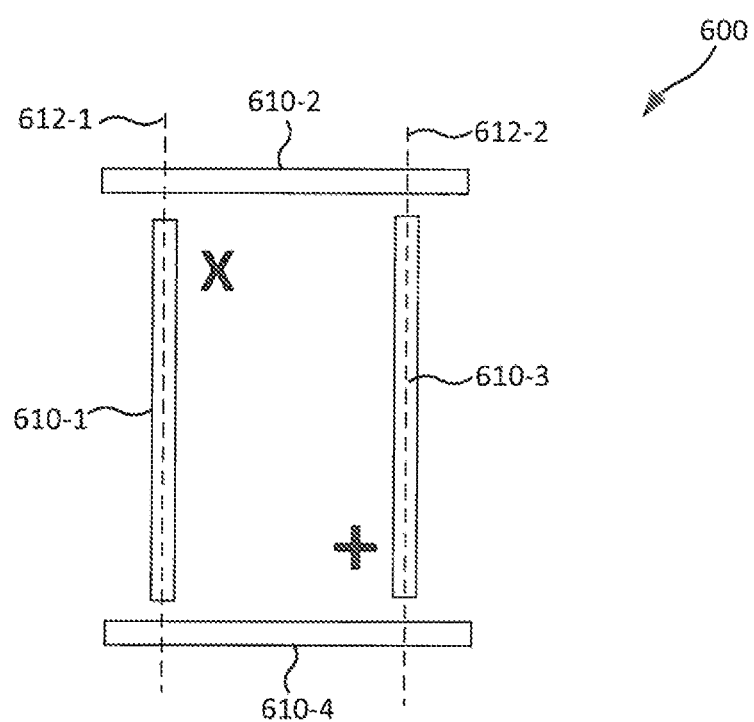
FIG. 17 is a schematic front view of a box-style radiating element in which the left and right radiators are inset toward the center of the radiating element.

Referring again to FIG. 16A, log periodic dipole radiators 610-1 and 610-3 are spaced apart from each other and extend in parallel to each other. Likewise, log periodic dipole radiators 610-2 and 610-4 are spaced apart from each other and extend in parallel to each other, and are rotated ninety degrees with respect to log periodic dipole radiators 610-1 and 610-3. As a result, log periodic dipole radiators 610-1 through 610-4 form a box dipole radiating element 630 having a generally rectangular shape. As shown in FIG. 16A, log periodic dipole radiators 610-1 and 610-3 may optionally be inset toward the center of box dipole radiating element 630. FIG. 17 is a schematic front view of a box-style radiating element 600 which better illustrates how the left and right radiators can be inset toward the center of the radiating element. As shown in FIG. 17, the left log periodic dipole radiator 610-1 may extend along a first vertical axis 612-1, and the right log periodic dipole radiator 610-3 may extend along a second vertical axis 612-2. These first and second vertical axes 612-1, 612-2 may each intersect both the top log periodic dipole radiator 610-2 and the bottom log periodic dipole radiator 610-4.

Figure 18:
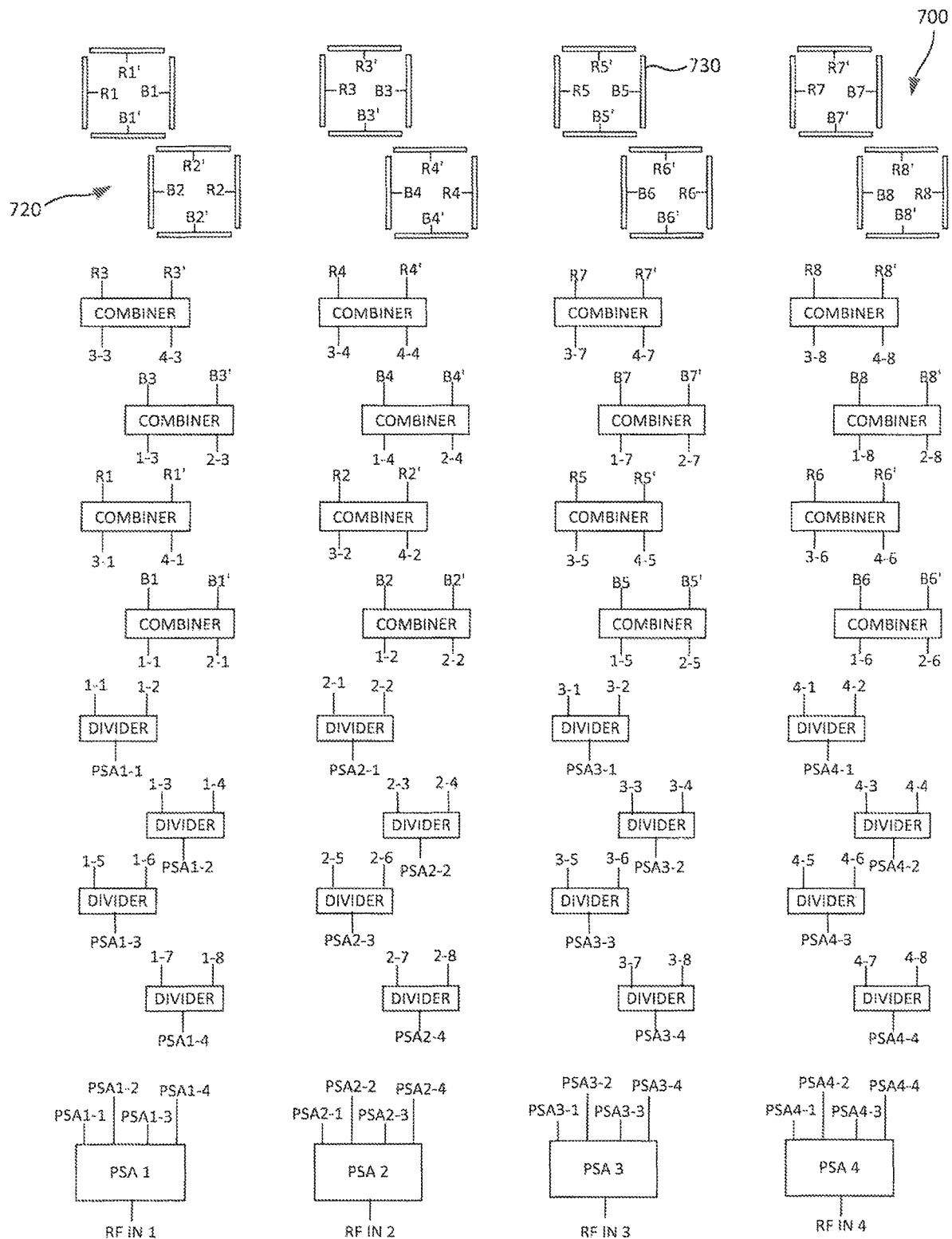
FIG. 18 is a block diagram of a feed network and linear array of a base station antenna according to further embodiments of the present invention.

FIG. 18 is a block diagram of a feed network and linear array of a base station antenna 700 according to further embodiments of the present invention. The base station antenna 700 is similar to the base station antenna 500 of FIG. 14B, except that the base station antenna 700 includes a shared linear array 720 that has eight radiating elements 730 as opposed to the four radiating elements 530 included in shared linear array 520. As cab be seen, in order to feed the additional radiating elements 730 a total of sixteen power dividers ("divider") are added to the feed network that split each output of the phase shifter assemblies PSA1 through PSA4 into two sub-components. These power dividers may be implemented, for example, as Wilkinson power dividers. Eight additional four-port combiners are also added that are coupled to the four additional radiating elements 730. The interconnections between the various elements are shown in FIG. 18. Note that in FIG. 18 the interconnections between the various feed network elements and the connections between the feed network and the radiating elements 730 are not shown using lines but instead are shown by labelling the inputs and outputs of each of the elements.

It will be appreciated that a wide variety of different types of dipole radiators can be used in the shared arrays according to embodiments of the present invention. The dipole radiators can be "cloaked" dipoles (such as the dipole radiators of FIG. 6A, for example) that are designed to not impact the antennas beams formed by near-by radiating elements that operate in other frequency bands or can be conventional, non-cloaked dipole radiators. A wide variety of different four-port combiners can be used in addition to the example four-port combiners illustrated in FIGS. 5A-5C. It will also be appreciated that box-style radiating elements that use radiators other dipole radiators can be used in any of the embodiments disclosed herein, as well as non-box-style radiating elements that have horizontal and vertically disposed radiators that are configured to radiate slant +/−45° polarized radiation.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A base station antenna, comprising:
   first through fourth radio frequency ("RF") ports;
   a plurality of radiating elements that each includes a first radiator, a second radiator, a third radiator and a fourth radiator;
   a first combiner having a first input that is coupled to the first RF port, a second input that is coupled to the second RF port, a first output that is coupled to the first radiator of a first of the radiating elements and a second output that is coupled to the second radiator of the first of the radiating elements; and
   a second combiner having a first input that is coupled to the third RF port, a second input that is coupled to the fourth RF port, a first output that is coupled to the third radiator of the first of the radiating elements and a second output that is coupled to the fourth radiator of the first of the radiating elements,
   wherein each of the radiating elements comprises a box radiating element.

2. The base station antenna of claim 1, wherein the plurality of radiating elements are arranged as a first linear array of radiating elements.

3. The base station antenna of claim 2, wherein the first combiner is one of a plurality of first combiners, and each first combiner has a first input that is coupled to the first RF port, a second input that is coupled to the second RF port, a first output that is coupled to the first radiator of a respective one of the radiating elements in the first linear array and a second output that is coupled to the second radiator of a respective one of the radiating elements in the first linear array, and wherein the second combiner is one of a plurality of second combiners, and each second combiner has a first input that is coupled to the third RF port, a second input that is coupled to the fourth RF port, a first output that is coupled to the third radiator of a respective one of the radiating elements in the first linear array and a second output that is coupled to the fourth radiator of a respective one of the radiating elements in the first linear array.

4. The base station antenna of claim 3, further comprising:
   a first phase shifter assembly having an input port that is coupled to the first RF port and having a plurality of output ports that are coupled to the respective first inputs of the first combiners;
   a second phase shifter assembly having an input port that is coupled to the second RF port and having a plurality of output ports that are coupled to the respective second inputs of the first combiners;
   a third phase shifter assembly having an input port that is coupled to the third RF port and having a plurality of output ports that are coupled to the respective first inputs of the second combiners; and
   a fourth phase shifter assembly having an input port that is coupled to the fourth RF port and having a plurality of output ports that are coupled to the respective second inputs of the second combiners.

5. The base station antenna of claim 4, further comprising:
   a second plurality of radiating elements that are arranged as a second linear array of radiating elements, each of the second plurality of radiating elements including a first radiator, a second radiator, a third radiator and a fourth radiator;
   a plurality of third combiners that each have a first input that is coupled to the first RF port, a second input that is coupled to the second RF port, a first output that is coupled to the first radiator of a respective one of the radiating elements in the second linear array and a second output that is coupled to the second radiator of a respective one of the radiating elements in the second linear array, and
   a plurality of fourth combiners that each have has a first input that is coupled to the third RF port, a second input that is coupled to the fourth RF port, a first output that is coupled to the third radiator of a respective one of the radiating elements in the second linear array and a second output that is coupled to the fourth radiator of a respective one of the radiating elements in the second linear array.

6. The base station antenna of claim 1, wherein each first radiator, each second radiator, each third radiator and each fourth radiator is a center-fed radiator.

7. A base station antenna, comprising:
   an array of box-style radiating elements, each box-style dipole radiating element including a top radiator, a bottom radiator, a left radiator and a right radiator; and
   a feed network that is coupled to the array,
   wherein the feed network is configured to couple a first radio frequency ("RF") source to the left radiator of a first of the box-style radiating elements and to couple the first RF source to the right radiator of a second of the box-style radiating elements.

8. The base station antenna of claim 7, wherein the feed network is further configured to couple a second RF source to the left radiator of the first of the box-style radiating elements, and to couple the second RF source to the right radiator of the second of the box-style radiating elements.

9. The base station antenna of claim 8, wherein a first port of a four port coupler is coupled to the first RF source, a second port of the four port coupler is coupled to the second RF source, a third port of the four port coupler is coupled to the left radiator of the first of the box-style radiating elements, and a fourth port of the four port coupler is coupled to one of the top radiator or the bottom radiator of the first of the box-style radiating elements.

10. The base station antenna of claim 8, wherein the feed network is configured to couple the first RF source to the respective left radiators of a first half of the box-style radiating elements and to couple the first RF source to the right radiators of a second half of the box-style radiating elements.

11. The base station antenna of claim 10, wherein each box-style radiating element in the first half of the box-style radiating elements is directly adjacent at least one of the box-style radiating elements in the second half of the box-style radiating elements.

12. The base station antenna of claim 7, wherein the feed network is further configured to couple the right radiator of the first of the box-style radiating elements to a third RF source, and to couple the left radiator of the second of the box-style radiating elements to the third RF source.

13. The base station antenna of claim 12, wherein the feed network is further configured to couple the right radiator of the first of the box-style radiating elements to a fourth RF source, and to couple the left radiator of the second of the box-style radiating elements to the fourth RF source.

14. The base station antenna of claim 7, wherein the left radiator and one of the top radiator and the bottom radiator of the first of the box-style radiating elements together form a first radiator unit, and the right radiator and the other of the top radiator and the bottom radiator of the first of the box-style radiating elements together form a second radiator unit.

15. The base station antenna of claim 14, wherein a first phase center of the first radiator unit is horizontally offset from a second phase center of the second radiator unit.

16. The base station antenna of claim 7, wherein the first of the box-style radiating elements is directly adjacent the second of the box-style radiating elements.

17. The base station antenna of claim 7, wherein the top radiator, the bottom radiator, the left radiator and the right radiator each comprise a log periodic dipole radiator.

18. A base station antenna, comprising:
a reflector;
a box dipole radiating element mounted to extend forwardly from the reflector, the box dipole radiating element including a left log periodic dipole radiator, a top log periodic dipole radiator, a right log periodic dipole radiator, and a bottom log periodic dipole radiator.

19. The base station antenna of claim 18, wherein the left log periodic dipole radiator, the top log periodic dipole radiator, the right log periodic dipole radiator and the bottom log periodic dipole radiator each comprises a printed circuit board having a dielectric substrate, a first metallization layer on a first side of the dielectric substrate and a second metallization layer on a second side of the dielectric substrate.

20. The base station antenna of claim 19, wherein the first metallization layer includes a first forwardly-extending conductive trace and a plurality of additional conductive traces that extend from and are electrically connected to the first forwardly-extending conductive trace.

21. The base station antenna of claim 20, wherein the second metallization layer includes a second forwardly-extending conductive trace and a plurality of second additional conductive traces that extend from and are electrically connected to the second forwardly-extending conductive trace, the second additional conductive traces extending in an opposite direction from the first additional conductive traces.

* * * * *